US012014663B2

(12) United States Patent
Zhang et al.

(10) Patent No.: US 12,014,663 B2
(45) Date of Patent: Jun. 18, 2024

(54) DARK MODE DISPLAY INTERFACE PROCESSING METHOD, ELECTRONIC DEVICE, AND STORAGE MEDIUM

(71) Applicant: HUAWEI TECHNOLOGIES CO., LTD., Guangdong (CN)

(72) Inventors: Yundie Zhang, Shenzhen (CN); Mengdi Liu, Beijing (CN); Aibing Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 51 days.

(21) Appl. No.: 17/631,344

(22) PCT Filed: Aug. 5, 2020

(86) PCT No.: PCT/CN2020/107067
§ 371 (c)(1),
(2) Date: Jan. 28, 2022

(87) PCT Pub. No.: WO2021/027649
PCT Pub. Date: Feb. 18, 2021

(65) Prior Publication Data
US 2022/0284844 A1 Sep. 8, 2022

(30) Foreign Application Priority Data
Aug. 9, 2019 (CN) .......................... 201910736679.3

(51) Int. Cl.
*G09G 3/20* (2006.01)
(52) U.S. Cl.
CPC ....... *G09G 3/20* (2013.01); *G09G 2320/0613* (2013.01); *G09G 2320/066* (2013.01);
(Continued)

(58) Field of Classification Search
CPC ............ G09G 3/20; G09G 2320/0613; G09G 2320/066; G09G 2320/0666;
(Continued)

(56) References Cited

U.S. PATENT DOCUMENTS 10,223,777 B2 * 3/2019 Baymar ............... G06V 30/413
10,319,116 B1 * 6/2019 C .......................... G09G 5/377
(Continued)

FOREIGN PATENT DOCUMENTS

CN 105094759 A 11/2015
CN 105208223 A 12/2015
(Continued)

OTHER PUBLICATIONS

Translation of CN105511717 via EPO, acessed via the web on May 11, 2023. (Year: 2016).*
(Continued)

*Primary Examiner* — Antonio A Caschera
(74) *Attorney, Agent, or Firm* — WOMBLE BOND DICKINSON (US) LLP

(57) ABSTRACT

A method for: obtaining a first display interface including a plurality of elements, which includes a first background element and a first element displayed on it through superimposing; determining a target processing manner corresponding to each of the plurality of elements, which is used to adjust at least one of brightness, chrominance, and contrast of the element; processing each of the plurality of elements in the target processing manner, to obtain a rendering parameter of each element; and rendering each of the plurality of elements, to display a second display interface, wherein a second background element in the second display interface corresponds to the first background element, a second element in the second display interface corresponds to the first element, black contrast of the second element is (Continued)

different from that of the second background element, and brightness of the second element is greater than brightness of the second background element.

20 Claims, 26 Drawing Sheets

(52) U.S. Cl.
    CPC ............... *G09G 2320/0666* (2013.01); *G09G 2320/0686* (2013.01); *G09G 2340/12* (2013.01); *G09G 2340/14* (2013.01); *G09G 2354/00* (2013.01)

(58) Field of Classification Search
    CPC ....... G09G 2320/0686; G09G 2340/12; G09G 2340/14; G09G 2354/00; G06T 2200/24
    See application file for complete search history.

(56) References Cited

U.S. PATENT DOCUMENTS

| | | | |
|---|---|---|---|
| 11,107,258 B2* | 8/2021 | Loughry | .......... H04N 21/42202 |
| 2013/0088523 A1 | 4/2013 | Wu | |
| 2016/0188552 A1 | 6/2016 | Wang et al. | |
| 2016/0246475 A1 | 8/2016 | Garcia et al. | |
| 2016/0322022 A1 | 11/2016 | Cai | |

FOREIGN PATENT DOCUMENTS

| | | |
|---|---|---|
| CN | 105511717 A | 4/2016 |
| CN | 106201257 A | 12/2016 |
| CN | 106484396 A | 3/2017 |
| CN | 106921784 A | 7/2017 |
| CN | 107038037 A | 8/2017 |
| CN | 107861675 A | 3/2018 |
| CN | 108108367 A | 6/2018 |
| CN | 109388452 A | 2/2019 |
| CN | 110609722 A | 12/2019 |
| JP | 2016095173 A | 5/2016 |
| WO | 2019095392 A1 | 5/2019 |

OTHER PUBLICATIONS

Translation of CN107038037 via EPO, acessed via the web on May 11, 2023. (Year: 2017).*

* cited by examiner

DARK MODE DISPLAY INTERFACE PROCESSING METHOD, ELECTRONIC DEVICE, AND STORAGE MEDIUM

This application is a National Stage of International Patent Application No. PCT/CN2020/107067 filed on Aug. 5, 2020, which claims priority to Chinese Patent Application No. 201910736679.3, filed on Aug. 9, 2019. Both of the aforementioned applications are hereby incorporated by reference in their entireties.

TECHNICAL FIELD

This application relates to the field of computer technologies, and in particular, to a dark mode display interface processing method, an electronic device, and a storage medium.

BACKGROUND

More electronic devices such as a mobile phone participate in people's lives. When a user uses a mobile phone in a relatively dark light environment, if content displayed on a display interface of the mobile phone is relatively bright, eyes of the user are irritated, and visual fatigue is likely to be caused for the user.

An electronic device usually displays content based on default or defined theme colors. Color parameters of these theme colors are usually fixed. Therefore, when a user uses the electronic device in a relatively dark light environment, for example, when the user uses a mobile phone to browse an information list in a quilt, screen brightness usually can be reduced only by adjusting a backlight level of a display of the electronic device. However, this adjustment is for the entire screen, and therefore content displayed on the entire screen is relatively dark. This also causes a decrease in contrast between the displayed content to a degree, causing a difficulty for the user in recognizing the content displayed on the screen. Therefore, how to meet a requirement of a user for using an electronic device in a relatively dark light environment becomes a technical problem to be urgently resolved in this field.

SUMMARY

This application provides a dark mode display interface processing method, an electronic device, and a storage medium, to provide a dark mode display interface to meet a requirement of a user for using an electronic device in relatively dark light.

According to a first aspect, this application provides a dark mode display interface processing method. When switching an electronic device from a normal mode to a dark mode, or switching a display interface in the dark mode, it is preferred to obtain a to-be-displayed first display interface, where the first display interface includes a plurality of elements, the plurality of elements include a first background element and a first element displayed on the first background element through superimposing, the first background element includes at least one of a graphic and an image, and the first element includes at least one of a text, a graphic, and an image; determine a target processing manner corresponding to each of the plurality of elements, where the target processing manner is used to adjust at least one of brightness, chrominance, and contrast of the element, the target processing manner is associated with attribute information of the element, and the attribute information includes at least one of type information, color information, size information, layer information, and location information; process each of the plurality of elements in the target processing manner, to obtain a rendering parameter of each element; and render each of the plurality of elements based on the rendering parameter, to display a second display interface, where a second background element in the second display interface corresponds to the first background element, a second element in the second display interface corresponds to the first element, black contrast of the second element is different from black contrast of the second background element, and brightness of the second element is greater than brightness of the second background element.

In this way, in this application, each element that needs to be displayed on the to-be-displayed first display interface is obtained, and each element is independently processed and adjusted, so that it can be ensured that each element has relatively good recognizability and readability in the dark mode display interface. Therefore, after a rendering parameter suitable for viewing in a relatively dark environment is obtained after processing, provided that real-time rendering and display are performed based on the rendering parameter, a display interface of the electronic device can present a relatively dark display effect. In this process, in this solution, only a rendering parameter of a background of the electronic device is adjusted. Therefore, no front-end or third-party adaptation is required, so that a dark mode display requirement of any front-end design can be met. This also reduces a third-party development difficulty to a degree.

A processing manner of the element in this application may include foreground color processing, background color processing, sub-backboard processing, backboard processing, foreground picture processing, or background picture processing.

In this application, the type information is used to indicate a type of the element; the color information is used to indicate color composition of the element; the size information is used to indicate a size of the element; the layer information is used to indicate whether the element is located at a top layer of display layers; and the location information is used to indicate whether the element extends from the top or the bottom in an opposite direction. These pieces of information may be obtained from a system or a renderer of the electronic device, without an additional software/hardware design.

In one embodiment, the brightness of the second element is [30, 70]; and the brightness of the second background element is less than or equal to 30.

In one embodiment, in the second display interface, the black contrast of the second element is 2.2:1 to 15.7:1.

In one embodiment, for any one of the plurality of elements displayed on the first display interface, if a type of the element is a text, the element is processed by using a foreground color.

In one embodiment, for any one of the plurality of elements displayed on the first display interface, if a type of the element is a graphic, based on types of graphics, a line and a rectangle are used as first-type graphics, and a circle, an arc, a point, and a path are used as second-type graphics; and a corresponding size interval is designed for each type of image, so that a corresponding target processing manner is determined based on size information of the graphic. A range of a first size interval is not exactly the same as a range of a second size interval. The target processing manner of the graphic includes foreground color processing, background color processing, sub-backboard processing, or backboard processing.

In one embodiment, for any one of the plurality of elements displayed on the first display interface, if the element is an image, the element may be processed in the following plurality of manners: if type information of the element indicates that the element is an image, color information of the element indicates that the element includes a single color, and a size of the element belongs to a third size interval, determining that a target processing manner of the element is foreground color processing; if type information of the element indicates that the element is an image, color information of the element indicates that the element includes at least two colors, and a size of the element belongs to the third size interval, determining that a target processing manner of the element is foreground picture processing; if type information of the element indicates that the element is an image, location information of the element indicates that the element extends from the top or the bottom in an opposite direction, and a size of the element belongs to a fourth size interval, determining that a target processing manner of the element is sub-backboard processing; if type information of the element indicates that the element is an image, location information of the element indicates that the element does not extend from the top or the bottom in an opposite direction, and a size of the element belongs to the fourth size interval, determining that a target processing manner of the element is backboard processing; if type information of the element indicates that the element is an image, color information of the element indicates that the element includes a single color, and a size of the element belongs to neither the third size interval nor the fourth size interval, determining that a target processing manner of the element is foreground picture processing; or if type information of the element indicates that the element is an image, color information of the element indicates that the element includes at least two colors, and a size of the element belongs to neither the third size interval nor the fourth size interval, determining that a target processing manner of the element is background picture processing, where the fourth size interval is greater than the third size interval.

In one embodiment, for any one of the plurality of elements, determining a target processing manner of the element includes: if type information of the element indicates the element is a third-type graphic, and layer information of the element indicates that the element is located at the top layer of the display layers, determining that the target processing manner of the element is foreground color processing; or if type information of the element indicates the element is a third-type graphic, and layer information of the element indicates that the element is located at a non-top layer of the display layers, determining that the target processing manner of the element is background color processing, where the third-type graphic includes a circle and an arc.

In one embodiment, for any one of the plurality of elements, determining a target processing manner of the element includes: if type information of the element indicates the element is a fourth-type graphic, and layer information of the element indicates that the element is located at the top layer of the display layers, determining a fifth size interval to which a size of the element belongs, and determining, as the target processing manner, a processing manner corresponding to the fifth size interval and location information, where a processing manner corresponding to the fifth size interval includes foreground color processing, background color processing, sub-backboard processing, or backboard processing; or if type information of the element indicates the element is a fourth-type graphic, and layer information of the element indicates that the element is located at a non-top layer of the display layers, determining a sixth size interval to which a size of the element belongs, and determining, as the target processing manner, a processing manner corresponding to the sixth size interval and location information, where a processing manner corresponding to the sixth size interval includes background color processing, sub-backboard processing, or backboard processing, where the fourth-type graphic includes a line, a rectangle, a point, and a path.

In one embodiment, for any one of the plurality of elements, determining a target processing manner of the element includes: if type information of the element indicates the element is an image, and layer information of the element indicates that the element is located at the top layer of the display layers, determining a seventh size interval to which a size of the element belongs, and determining, as the target processing manner, a processing manner corresponding to the seventh size interval and location information, where a processing manner corresponding to the seventh size interval includes foreground picture processing, background picture processing, sub-backboard processing, or backboard processing; or if type information of the element indicates the element is an image, and layer information of the element indicates that the element is located at a non-top layer of the display layers, determining an eighth size interval to which a size of the element belongs, and determining, as the target processing manner, a processing manner corresponding to the eighth size interval and location information, where a processing manner corresponding to the eighth size interval includes background picture processing, sub-backboard processing, or backboard processing.

For any one of the plurality of elements, if color information of the element indicates that the element is displayed in a black transparency gradient, and endpoint transparency of the element is not 0, it is determined that a target processing manner is keeping a rendering parameter of the element unchanged.

For any one of the plurality of elements, if color information of the element indicates that the element is displayed in a white transparency gradient, and endpoint transparency of the element is not 0, it is determined that a target processing manner is transparent processing, where the transparent processing is used to display the element in full transparency.

In the following description, one element is used as an example to describe each target processing manner.

In one embodiment, if the target processing manner of any one of the plurality of elements is foreground color processing, the following processing manner may be included: if an element color of the element is a gray-tone color, obtaining white contrast of the element color, where the white contrast is contrast of any color relative to white; and if the white contrast is greater than or equal to a preset first contrast threshold, performing complementary mapping on the element color to obtain a rendering parameter, where black contrast is contrast of any color relative to black; or if the white contrast is less than the first contrast threshold, reducing brightness of the element color to obtain a rendering parameter.

In one embodiment, the first contrast threshold is 1.1:1.

In one embodiment, if the target processing manner of any one of the plurality of elements is foreground color processing, the following processing manner may be included: if an element color of the element is a bright color, obtaining black contrast of the element color; and if the black contrast is less than a preset second contrast threshold, enhancing the black contrast of the element color to obtain a rendering parameter; if the black contrast is greater than a preset third contrast threshold, reducing brightness of the element color to obtain a rendering parameter; or if the black contrast falls between the second contrast threshold and the third contrast threshold, obtaining a color value of the element as a rendering parameter, where the third contrast threshold is greater than the second contrast threshold.

Further, when the brightness of the element color is reduced, if the black contrast is greater than a preset fourth contrast threshold, the brightness of the element color is reduced based on preset amplitude; or if the black contrast falls between the third contrast threshold and the fourth contrast threshold, the brightness of the element color is adjusted to a preset range, where the fourth contrast threshold is greater than the third contrast threshold.

In one embodiment, the second contrast threshold is 8.9:1, the third contrast threshold is 15.7:1, and the fourth contrast threshold is 19:1; and the preset amplitude is 9, and the preset range is a dark level before 15.7:1.

In one embodiment, if the target processing manner of any one of the plurality of elements is foreground color processing, the following processing manner may be included: if a color of the element is a gradient color of at least one color, processing an endpoint color of the element in the foreground color processing manner, to obtain a rendering parameter of the element; or if the element includes a plurality of colors, using the element as a foreground picture for processing.

In one embodiment, if the target processing manner of any one of the plurality of elements is background color processing, the following processing manner may be included: if chrominance carried in color information of the element is greater than a preset first chrominance threshold, obtaining black contrast of a color of the element; and if the black contrast is greater than a preset fifth contrast threshold, reducing the black contrast of the color of the element to obtain a rendering parameter; if the black contrast is less than a preset sixth contrast threshold, enhancing the black contrast of the color of the element to obtain a rendering parameter; or if the black contrast falls between the fifth contrast threshold and the sixth contrast threshold, obtaining a color value of the element as a rendering parameter, where the fifth contrast threshold is greater than the sixth contrast threshold.

In one embodiment, the first chrominance threshold is 30; and the fifth contrast threshold is 5:1, and the sixth contrast threshold is 2.2:1.

In one embodiment, if the target processing manner of any one of the plurality of elements is background color processing, the following processing manner may be included: if chrominance carried in color information of the element is less than or equal to a preset first chrominance threshold, obtaining black contrast of a color of the element; and if the black contrast is greater than a preset seventh contrast threshold, reducing brightness of the color of the element to obtain a rendering parameter; or if the black contrast is less than or equal to the seventh contrast threshold, mapping the black contrast of the color of the element to a specified black contrast interval to obtain a rendering parameter.

In one embodiment, the seventh contrast threshold is 9:1, and the specified interval is 2.2:1 to 5:1.

In one embodiment, if the target processing manner of any one of the plurality of elements is sub-backboard processing, the following processing manner may be included: if chrominance carried in color information of the element is less than a preset second chrominance threshold, adjusting brightness of a color of the element to a specified brightness interval to obtain a rendering parameter. On the contrary, if chrominance carried in color information of the element is greater than or equal to the preset second chrominance threshold, the following processing manner may be included: if black contrast of a color of the element is less than a preset eighth contrast threshold, enhancing the black contrast of the color of the element to obtain a rendering parameter; if a brightness value of the element is less than a preset first brightness threshold, enhancing brightness of a color of the element to obtain a rendering parameter; or if black contrast of a color of the element is greater than or equal to the eighth contrast threshold, and a brightness value is greater than or equal to the first brightness threshold, obtaining a color value of the element as a rendering parameter.

In one embodiment, the second chrominance threshold is 30, the eighth contrast threshold is 2.2:1, and the first brightness threshold is 10.

In one embodiment, if the target processing manner of any one of the plurality of elements is backboard processing, the following processing manner may be included: if chrominance carried in color information of the element is less than or equal to a preset third chrominance threshold, adjusting brightness of the element to be less than or equal to a second brightness threshold; if chrominance carried in color information of the element is greater than or equal to a preset fourth chrominance threshold, adjusting black contrast of the element to a first contrast interval; or if chrominance carried in color information of the element falls between the third chrominance threshold and the fourth chrominance threshold, adjusting black contrast of the element to a second contrast interval, where the fourth chrominance threshold is greater than the third chrominance threshold, and a value of the first contrast interval is greater than a value of the second contrast interval.

In one embodiment, the third chrominance threshold is 5, and the fourth chrominance threshold is 30; and the second brightness threshold is 15, the first contrast interval is 2.2:1 to 5:1, and the second contrast interval is 0 to 2.2:1.

In one embodiment, if the target processing manner of any one of the plurality of elements is background color processing, backboard processing, or sub-backboard processing, the following processing manner may be included: if the element includes a plurality of colors, using the element as a background picture for processing; or if a color of the element is a gradient color of at least one color, processing an endpoint color of the element in the target processing manner, to obtain a rendering parameter of the element.

In one embodiment, if the target processing manner of any one of the plurality of elements is foreground picture processing or background picture processing, the following processing manner may be included: performing sampling on the element to obtain color data of a plurality of sampling points; determining, based on the color data of the plurality of sampling points, whether an overall brightness level of the element is relatively dark; and if the overall brightness level of the element is relatively dark, obtaining, as a target function, a segment function corresponding to lowest brightness, and processing the element by using the target function, to obtain a rendering parameter of the element; or if the overall brightness level of the element is relatively bright, determining a target function based on the color data, and processing the element by using the target function, to obtain a rendering parameter of the element, where a segment function corresponding to the foreground picture processing is the same as or different from a segment function corresponding to the background picture processing.

In one embodiment, when the target function is determined based on the color data, a relatively bright color and a main color of the element are obtained based on the color data; and then the target function is determined based on the relatively bright color and the main color, where the relatively bright color is the first color that is in colors that are of the plurality of sampling points and that are arranged in descending order of color brightness and that meets a condition that a proportion of a quantity of sampling points corresponding to the color in a total quantity of sampling points reaches a preset first proportion threshold; and the main color is a color that is in the colors of the plurality of sampling points and that meets a condition that a proportion of a quantity of sampling points corresponding to the color in the total quantity of sampling points reaches a preset third proportion threshold, and the third proportion threshold is greater than the first proportion threshold.

Based on this, if the proportion of the relatively bright color is greater than or equal to a preset second proportion threshold, a segment function corresponding to brightness of the relatively bright color is determined as the target function, where the second proportion threshold is greater than the first proportion threshold; if the proportion of the relatively bright color is less than the second proportion threshold, and the main color is empty, a segment function corresponding to brightness of the relatively bright color is determined as the target function; or if the proportion of the relatively bright color is less than the second proportion threshold, and the main color is not empty, the relatively bright color and the main color are processed to obtain a processed color, and a segment function corresponding to the processed color is determined as the target function. The processed color may be obtained in the following manner: performing weighted averaging processing on a color value of the relatively bright color and a color value of the main color to obtain a color value of the processed color.

In addition, the determining, based on the color data of the plurality of sampling points, whether an overall brightness level of the element is relatively dark includes: obtaining, from the plurality of sampling points, a relatively dark sampling point whose color brightness is less than a preset fourth brightness threshold; and if a proportion of a quantity of relatively dark sampling points in a total quantity of sampling points is greater than a preset third proportion threshold, determining that the overall brightness level of the element is relatively dark; or if a proportion of a quantity of relatively dark sampling points in a total quantity of sampling points is less than or equal to the preset third proportion threshold, determining that the overall brightness level of the element is relatively bright.

In this application, mode switching may be performed in a manner in which the user presses a button to trigger the electronic device to receive a mode switching instruction. Alternatively, mode switching may be triggered in a timing manner. In one embodiment, the electronic device is switched from the normal mode to the dark mode in response to receiving a first mode switching instruction and/or when a current moment reaches a preset first switching moment. On the contrary, the electronic device is switched from the dark mode to the normal mode in response to receiving a second mode switching instruction and/or when a current moment reaches a preset second switching moment.

When the electronic device is switched from the dark mode to the normal mode, it is preferred to render each of the plurality of elements based on the color information of the plurality of elements, to display the first display interface.

According to a second aspect, this application provides an electronic device, including one or more sensors, one or more processors, one or more memories, and one or more computer programs. The processors are coupled to the sensors and the memories. The one or more computer programs are stored in the memories. When the electronic device runs, the processors execute the one or more computer programs stored in the memories, to enable the electronic device to perform the method according to any one of the first aspect.

According to a third aspect, this application provides a computer storage medium, including computer instructions. When the computer instructions are run on an electronic device, the electronic device is enabled to perform the method according to any one of the first aspect.

According to a fourth aspect, this application provides a computer program product. When the computer program product runs on an electronic device, the electronic device is enabled to perform the method according to any one of the first aspect.

In conclusion, according to the dark mode display interface processing method, the electronic device, and the storage medium that are provided in this application, each element that needs to be displayed on the to-be-displayed first display interface is obtained, and each element is independently processed and adjusted, so that it can be ensured that each element has relatively good recognizability and readability in the dark mode display interface. Therefore, after a rendering parameter suitable for viewing in a relatively dark environment is obtained after processing, provided that real-time rendering and display are performed based on the rendering parameter, a display interface of the electronic device can present a relatively dark display effect. In this process, in this solution, only a rendering parameter of a background of the electronic device is adjusted. Therefore, no front-end or third-party adaptation is required, so that a dark mode display requirement of any front-end design can be met. This also reduces a third-party development difficulty to a degree.

DESCRIPTION OF EMBODIMENTS

The following describes examples of the embodiments in detail with reference to the accompanying drawings.

Technical solutions provided in this application are applied to an electronic device that has a display function. The electronic device may include but is not limited to a media player, an intelligent terminal, an intelligent wearable device, a smart home appliance device, a virtual reality device, or the like. The media player may include but is not limited to a smart TV, a music player, a video player, an electronic projector, or the like. The intelligent terminal may include but is not limited to a smartphone, a notebook computer, a tablet computer, or the like. The intelligent wearable device may include but is not limited to a smart band, a smartwatch, smart glasses, or the like. The smart home appliance device may include but is not limited to a smart rice cooker, a smart switch, a smart temperature control device, or the like. The virtual display device may include but is not limited to a virtual reality (VR) device, an augmented reality (AR) device, or the like.

Figure 1:
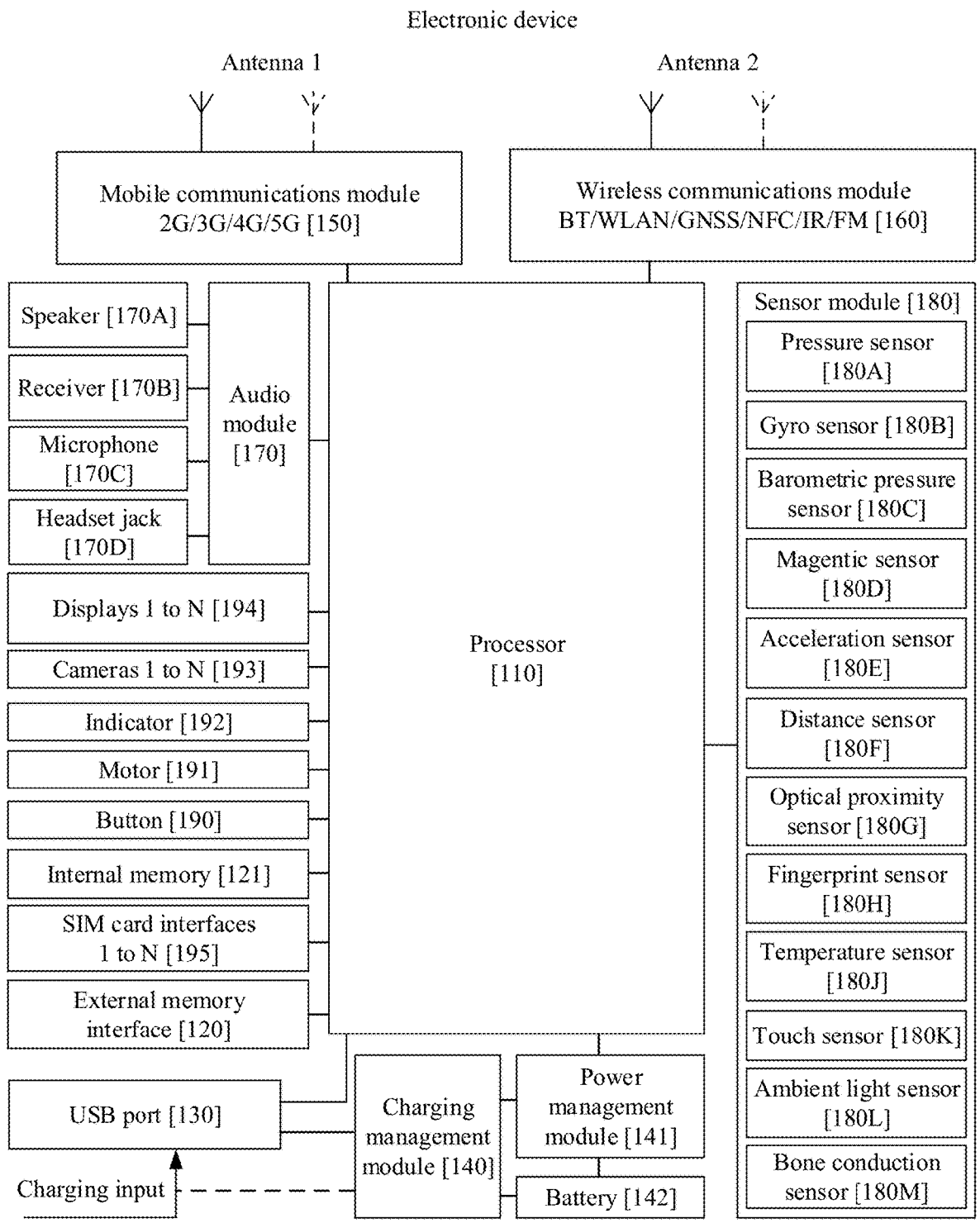
FIG. 1 is a schematic diagram of a structure of an electronic device according to this application.

For example, FIG. 1 is a schematic diagram of a structure of an electronic device.

As shown in FIG. 1, the electronic device may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display 194, a subscriber identification module (SIM) card interface 195, and the like. It may be understood that the structure shown in this embodiment does not constitute a limitation on the electronic device. In some other embodiments of this application, the electronic device may include more or fewer components than those shown in the figure, or some components may be combined, or some components may be split, or there may be different component arrangements. For example, when the electronic device is a smart TV, one or more of the SIM card interface 195, the camera 193, the button 190, the receiver 170B, the microphone 170C, and the headset jack 170D do not need to be disposed in the smart TV. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. In some embodiments, the electronic device may alternatively include one or more processors 110. The controller may be a nerve center and a command center of the electronic device. The controller may generate an operation control signal based on instruction operation code and a time sequence signal, to complete control of instruction fetching and instruction execution. A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, so that efficiency of the electronic device is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like. The USB port 130 is an interface that conforms to a USB standard specification, and may be a mini USB port, a micro USB port, a USB Type C port, or the like. The USB port 130 may be configured to connect to a charger to charge the electronic device, or may be configured to transmit data between the electronic device and a peripheral device, or may be configured to connect to a headset and play audio through the headset.

It may be understood that an interface connection relationship between the modules that is shown in this embodiment of the present invention is merely an example for description, and does not constitute a limitation on the structure of the electronic device. In some other embodiments of this application, the electronic device may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device may be implemented through the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna of the electronic device may be configured to cover one or more communication frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include at least one filter, a switch, a power amplifier, a low noise amplifier, and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transferred to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device with the mobile communications module 150 or another function module.

The wireless communications module 160 may provide wireless communication solutions, applied to the terminal device, that include a wireless local area network (WLAN), Bluetooth, a global navigation satellite system (GNSS), frequency modulation (FM), NFC, an infrared (IR) technology, and the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the electronic device is coupled to the mobile communications module 150, and the antenna 2 is coupled to the wireless communications module 160, so that the electronic device may communicate with a network and another device by using a wireless communications technology. The wireless communications technology may include GSM, GPRS, CDMA, WCDMA, TD-SCDMA, LTE, GNSS, WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device may implement a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, which execute instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the electronic device may include one or N displays 194, where N is a positive integer greater than 1.

The electronic device may implement a photographing function by using the ISP, one or more cameras 193, the video codec, the GPU, one or more displays 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) phototransistor. The photosensitive element converts the optical signal into an electrical signal, and then transfers the electrical signal to the ISP for conversion into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 can play or record videos in a plurality of encoding formats, for example, moving picture experts group (MPEG)-1, MPEG-2, MPEG-3, MPEG-4, and the like.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the second electronic device may be implemented by using the NPU, for example, image recognition, facial recognition, speech recognition, and text understanding.

The external memory interface 120 may be configured to connect to an external memory card, for example, a micro SD card, to extend a storage capability of the electronic device. The external memory card communicates with the processor 110 through the external memory interface 120, to implement a data storage function. For example, data files such as music, a photo, and a video is stored in the external memory card.

The internal memory 121 may be configured to store one or more computer programs, and the one or more computer programs include instructions. The processor 110 may run the instructions stored in the internal memory 121, so that the terminal device performs the voice switching method provided in some embodiments of this application, various function applications, data processing, and the like. The internal memory 121 may include a program storage area and a data storage area. The program storage area may store an operating system. The program storage area may further store one or more applications (such as "Gallery" and "Contacts"). The data storage area may store data (such as a photo and a contact) created during use of the electronic device. In addition, the internal memory 121 may include a high-speed random access memory, and may further include a nonvolatile memory, for example, at least one magnetic disk storage device, a flash memory, and a universal flash storage (UFS). In some embodiments, the processor 110 may run the instructions stored in the internal memory 121 and/or the instructions stored in the memory that is disposed in the processor 110, to enable the terminal device to perform the voice switching method provided in the embodiments of this application, various function applications, and data processing.

The electronic device may implement an audio function such as music playing and recording through the audio module 170, the speaker 170A, the receiver 170B, the microphone 170C, the headset jack 170D, the application processor, and the like. The audio module 170 is configured to convert digital audio information into an analog audio signal output, and is also configured to convert an analog audio input into a digital audio signal. The audio module 170 may further be configured to encode and decode audio signals. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device may listen to music or answer a hands-free call through the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call or sending voice information, a user may make a sound near the microphone 170C through the mouth of the user to input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further recognize a sound source, to implement a directional recording function, and the like.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messaging", an instruction for viewing an SMS message is executed. When a touch operation whose touch operation intensity is greater than or equal to the first pressure threshold is performed on an application icon "Messaging", an instruction for creating an SMS message is executed.

The gyro sensor 180B may be configured to determine a motion posture of the electronic device. In some embodiments, angular velocities of the electronic device around three axes (namely, axes x, y, and z) may be determined by using the gyro sensor 180B. The gyroscope sensor 180B may be configured to implement image stabilization during photographing. For example, when the shutter is pressed, the gyro sensor 180B detects an angle at which the electronic device shakes, and calculates, based on the angle, a distance for which a lens module needs to compensate, so that the lens cancels the shake of the electronic device through reverse motion, to implement image stabilization. The gyroscope sensor 180B may further be used in a navigation scenario, a motion-sensing game scenario, and the like.

The acceleration sensor 180E may detect magnitude of accelerations in various directions (usually on three axes) of the electronic device. When the electronic device is still, a value and a direction of gravity may be detected. The acceleration sensor may further be configured to recognize a posture of the electronic device, and is used in screen switching between a landscape mode and a portrait mode, a pedometer, or another application.

The distance sensor 180F is configured to measure a distance. The electronic device may measure the distance in an infrared or a laser manner. In some embodiments, in a photographing scenario, the electronic device may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device emits infrared light through the light-emitting diode. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device is in a pocket, to avoid an accidental touch.

The fingerprint sensor 180H (also referred to as a fingerprint recognizer) is configured to collect a fingerprint. The electronic device may use a feature of the collected fingerprint to implement fingerprint-based unlocking, application lock access, fingerprint-based photographing, fingerprint-based call answering, and the like. In addition, for other descriptions of the fingerprint sensor, refer to International Patent Application PCT/CN2017/082773 entitled "NOTIFICATION PROCESSING METHOD AND ELECTRONIC DEVICE", which is incorporated herein by reference in its entirety.

The touch sensor 180K may also be referred to as a touch panel. The touch sensor 180K may be disposed on the display 194, and the touch sensor 180K and the display 194 form a touchscreen, which is also referred to as a touch screen. The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button or a touch button. The electronic device may receive a key input, and generate a key signal input related to user settings and function control of the electronic device.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted in the SIM card interface 195 or removed from the SIM card interface 195, to implement contact with or separation from the electronic device. The electronic device may support one or N SIM card interfaces, and N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is also applicable to different types of SIM cards. The SIM card interface 195 is also applicable to an external memory card. The electronic device interacts with a network by using the SIM card, to implement functions such as a call and data communication. In some embodiments, the electronic device uses an eSIM card, namely, an embedded SIM card. The eSIM card may be embedded into the electronic device, and cannot be detached from the electronic device.

The technical solutions provided in this application are used to switch an electronic device from a normal mode to a dark mode. The dark mode may also be referred to as a dark mode, a dark mode, a night mode, a global dark mode, a global night mode, or the like. The normal mode may also be referred to as a light mode, a light color mode, a daytime mode, a lighting mode, an outdoor mode, or the like. A mode name is not specially limited in this application.

Figure 2A:
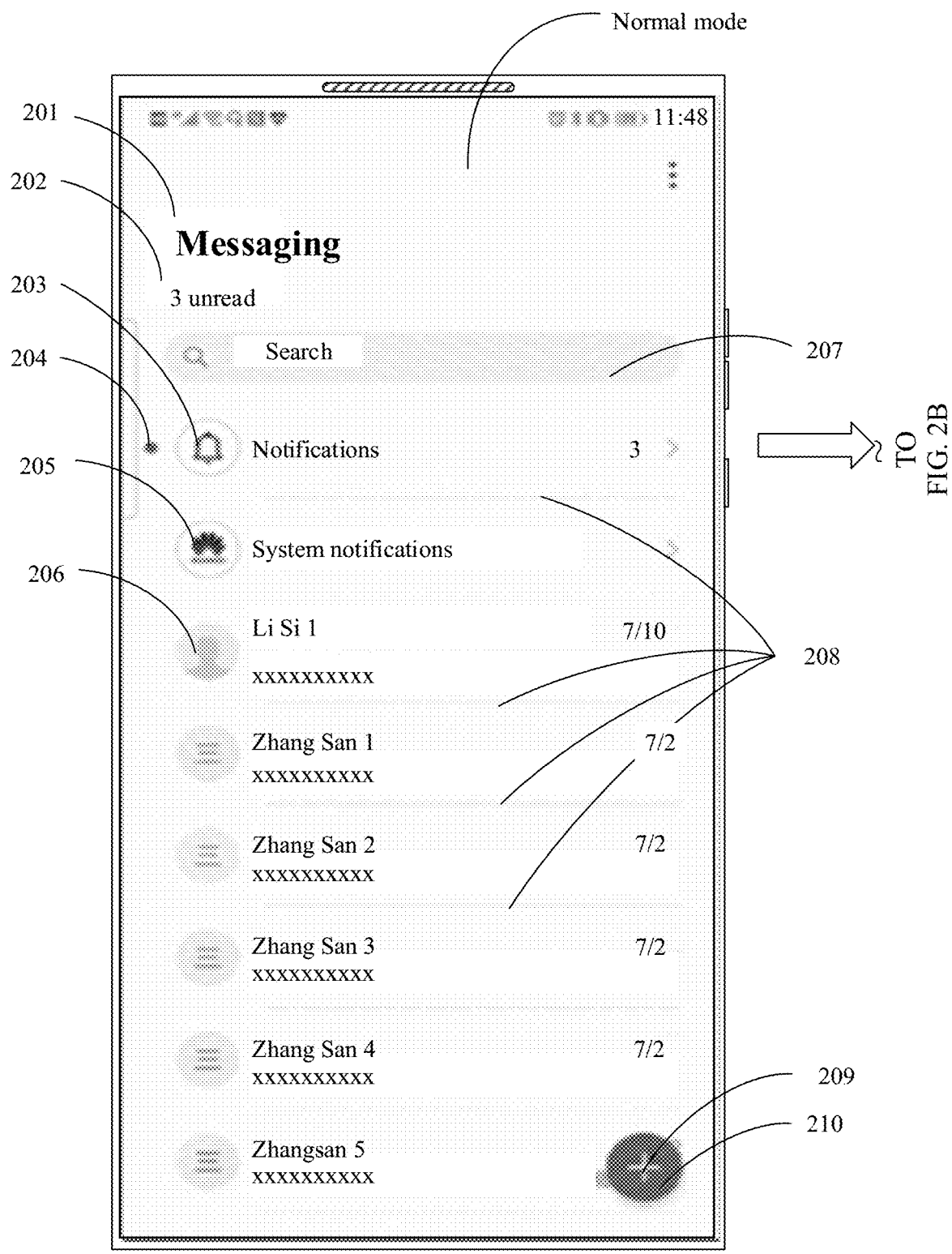
FIG. 2A and FIG. 2B are a schematic diagram of mode switching of an electronic device according to this application.
Figure 2B:
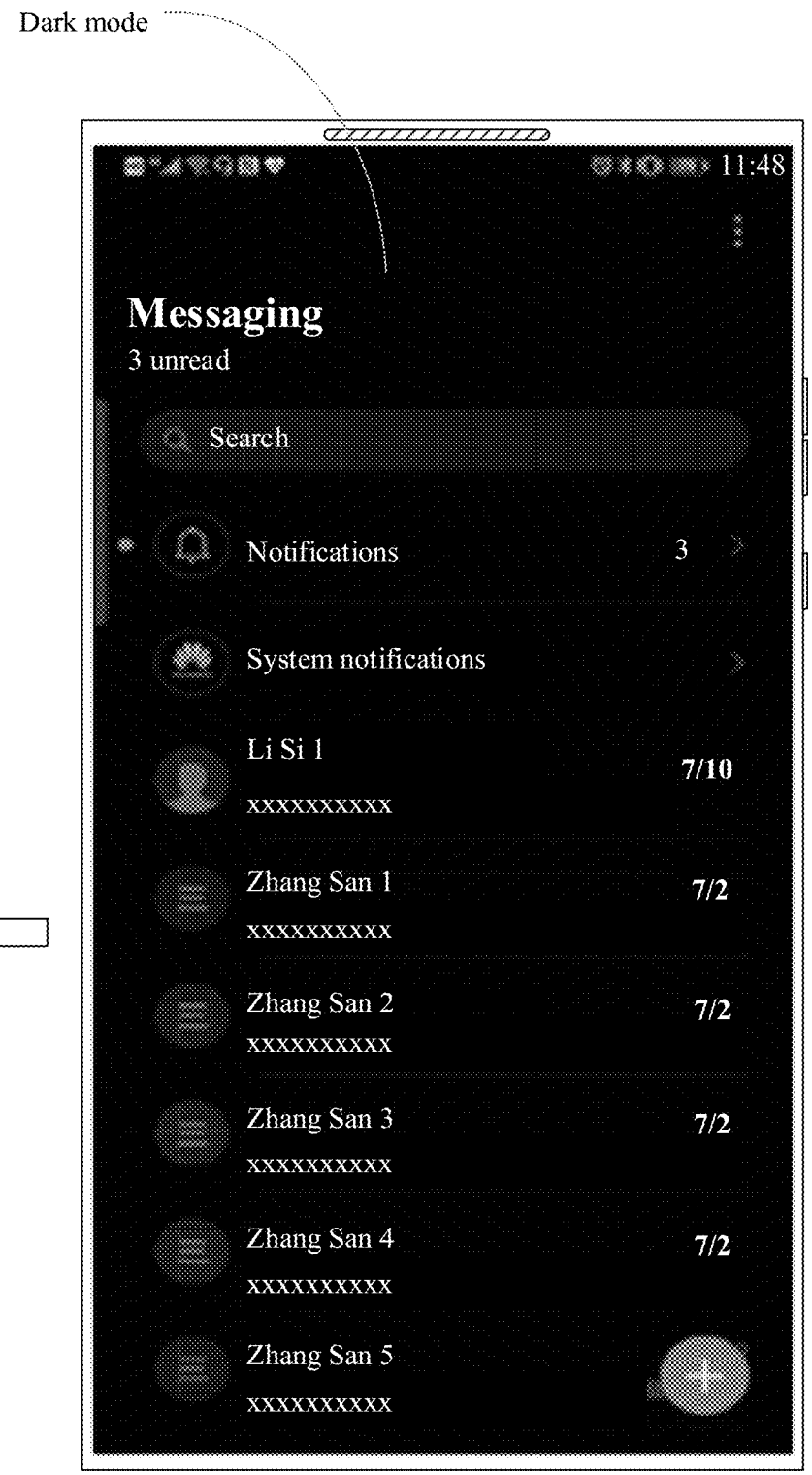

For example, the electronic device is a mobile phone. FIG. 2A and FIG. 2B show a scenario in which the electronic device switches between the normal mode and the dark mode. When the electronic device is in the normal mode, the electronic device displays an information list based on a system preset or default color configuration or a user-defined color configuration. A white background color shown in FIG. 2A is a common default design. This is only used to describe this setting manner, and is not used to limit this application. When the electronic device is in the dark mode, the electronic device presents the information list by using a relatively dark background color, for example, black shown in FIG. 2B. In addition, the information list presented in the dark mode is also processed, so that the information list can be distinguished from the black background color and has a relatively good display effect. It may be understood that in a relatively dark environment, the dark mode helps reduce irritation of content displayed on the electronic device to eyes of a user, and the user also feels more comfortable and has better experience when using the electronic device.

In an actual use scenario of the electronic device, the electronic device may be switched from the normal mode to the dark mode, or may be switched from the dark mode back to the normal mode. It may be understood that when the electronic device is switched from the dark mode to the normal mode, it is preferred to render each element on a display interface in a display manner designed at a front end. Details are not described in this solution. Subsequently, a scenario in which the electronic device is switched from the normal mode to the dark mode is mainly discussed.

The display interface of the electronic device includes various elements. In one embodiment, the element on the display interface may include but is not limited to at least one of a text, a graphic, and an image. Each element is described now with reference to a display interface shown in FIG. 2A.

The text can be displayed on the display interface based on a front-end application or desktop design. According to a system setting (which may be a preset or default system setting, or may be a user-defined setting) of the electronic device, the display interface of the electronic device may be displayed in Chinese, or may be displayed in English or a language of any other country. On a display interface, texts may be displayed in a uniform font and font size, for example, an ebook reading interface; or may be displayed in different fonts and sizes, for example, on the information list interface shown in FIG. 2A, both a text 201 and a text 202 are texts, but font sizes of the texts are clearly different. On a display interface, texts may be displayed in a single color, for example, all the texts are displayed in black; or may be displayed in a plurality of colors, for example, some texts (for example, the text 201) are displayed in black, and some texts (for example, the text 202) are displayed in red. In addition, for any text, the text may alternatively have a monochromatic display or polychromatic display design. For example, a text is displayed in a gradient color of at least two colors.

The graphic may include but is not limited to at least one of a line, a polygon (a rectangle is most common, and the rectangle is used as an example), a circle, an arc, a path, and a point. On a display interface, a graphic may exist and be displayed alone, for example, horizontal lines 208 that are under information and that are used to distinguish between the information on the interface shown in FIG. 2A, and for another example, a dot 204 on a left side of a bell icon 203 in FIG. 2A. Alternatively, at least two graphics may be combined into another element. At least two graphics may constitute another graphic. For example, four lines may constitute a rectangle. A combination of at least two lines may alternatively constitute an icon. For example, on the display interface shown in FIG. 2A, a "+" icon 209 is an icon that includes two lines. For another example, the bell icon 203 in FIG. 2A includes a plurality of lines.

Similar to the text, the graphic is also displayed on the display interface based on a front-end application or desktop design. Each graphic displayed on the display interface may be alternatively displayed in a system default specified or a user-specified color solution. For example, a line may be displayed in a single color such as black, white, or a bright color (such as yellow or red); or may be displayed in a gradient color, for example, displayed in a red and blue gradient color, that is, one end of the line is displayed in red, the other end is displayed in blue, and the middle of the line gradually changes between red and blue. For another example, a line may be displayed in a transparency gradient of a single color (for example, yellow). In this case, one end of the line is transparent, and the other end is yellow. In one embodiment, a single graphic is usually monochromatic or in a gradient color of two colors, and another element including at least two graphics may be polychromatic. For example, three lines constitute a "K"-shaped icon. If one line is red, one line is blue, and the other line is yellow, the presented "K"-shaped icon is polychromatic.

The image may be displayed as a background on the display interface. For example, on the display interface shown in FIG. 2A, a circular background 210 of 209 may include an image. For another example, a large white background displayed when the electronic device is in the normal mode and a large black background displayed when the electronic device is in the dark mode each may include an image. Alternatively, the image may be represented as an icon on the display interface. For example, on the display interface shown in FIG. 2A, an icon 205 on a left side of "system notifications" may include an image, and a portrait icon 206 may also include a user image or a system default image. In one embodiment, the image may have one or more matched colors. For example, the large white background shown in FIG. 2A may be a pure white monochromatic image, and a small background 207 in a search box may be a gray image with white dark stripes. For another example, in the portrait icon 206, a portrait and a portrait background may be displayed in different colors, and further, the portrait may be displayed in a plurality of different matched colors. Details are not described.

Based on different display manners of the elements displayed on the electronic device, during mode switching from the normal mode to the dark mode, respective switching policies need to be separately designed for the elements to meet different presentation requirements of the elements.

Before this, a dark mode switching principle in this application is first described.

When the user uses the electronic device in a relatively dark environment, image brightness in the normal mode is relatively high, making the user feel dazzled. In this case, the user can reduce irritation to eyeballs only by reducing display brightness of a screen or actively changing a display background color of the screen. However, the manner in which the user actively changes the background color is applicable to only some applications (Application, APP) in which the function is designed. For example, the user can change a background color of a text in an ebook APP, but cannot change a background on the information list interface shown in FIG. 2A. If the brightness of the screen is reduced, both brightness of a background and brightness of content displayed on the background on the screen accordingly decrease, and contrast between the content and the background also accordingly decreases. Consequently, a difficulty in recognizing the content by the user is increased, and even the content cannot be recognized in a serious case. This also directly causes eye fatigue of the user and even causes a vision loss, resulting in relatively poor user experience.

Based on this, the dark mode provided in this application is intended to provide comfortable and easily recognized contrast between a dark background and displayed content, so that the user can feel more comfortable when using the dark-mode electronic device in a relatively dark environment, and adapt to a mode conversion requirement of any display interface in the electronic device.

In one embodiment, the contrast is contrast of a color relative to another color. To explore a status of contrast between displayed content and a dark background, this application makes references to a human factor experiment conclusion of the contrast.

A human factor experiment of the contrast is conducted to explore a contrast level at which the user feels comfortable and easily recognizes content. As shown in Table 1, in the human factor experiment, the following four common lighting environments are simulated in a dimmable laboratory: indoor dark lighting (illuminance is 0, backlight levels of an LCD and an OLED are both 13 nit), indoor daily lighting (illuminance is 500, backlight levels of an LCD and an OLED are both 160 nit), outdoor cloudy lighting (illuminance is 4000, a backlight level of an LCD is 317 nit, and a backlight level of an OLED is 220 nit), outdoor sunny lighting (illuminance is 10000, a backlight level of an LCD is 420 nit, and a backlight level of an OLED is 220 nit), and contrast experiments are separately performed in each environment. The contrast test may be divided into three tests. A first test is a subjective evaluation task, that is, a stimulus material (display interfaces with different contrast) is presented to a tested user for a period of time, for example, 500 ms, and then the tested user performs subjective satisfaction evaluation. A second test is a search task. First, a meaningless text in different contrast designs is presented to the tested user, and a search target is given. The tested user searches for the target. Adaptation statuses of the user to different contrast are evaluated based on search duration. A third test is a perception threshold adjustment task. A display interface that displays content is output to the tested user, and the tested user adjusts a display interface color based on a subjective feeling of the user, until contrast in which the user feels comfortable is reached. For each type of lighting environment, a contrast range in which the user feels comfortable is obtained based on the foregoing three contrast experiments.

Table 1 shows a human factor experiment result when the displayed content is a text and the dark mode has a black background. The contrast is represented as X:1, representing a recommended range and a recommended value of the contrast between the displayed content and the background. Contrast in the dark mode is contrast of the text relative to the black background, and contrast in the normal mode is contrast of the text relative to a white background. It may be understood that the recommended range is a contrast range in which a user feels comfortable in the environment, and the recommended value is contrast in which most users feel more comfortable.

TABLE 1

| Lighting environment | Illuminance | Backlight level (unit: nit) | Dark mode Recommended value | Dark mode Recommended range | | Normal mode Recommended value | Normal mode Recommended range | |
|---|---|---|---|---|---|---|---|---|
| Indoor dark lighting | 0 | LCD: 13 OLED: 13 | 8.9:1 | 7.1:1 | 11.3:1 | 11.2:1 | 9.2:1 | 13.3:1 |
| Indoor daily lighting | 500 | LCD: 160 OLED: 160 | 6.4:1 | 4.9:1 | 7.7:1 | 10.4:1 | 8.9:1 | 12.2:1 |
| Outdoor cloudy lighting | 4000 | LCD: 317 OLED: 220 | 6.8:1 | 4.8:1 | 9.0:1 | 10.8:1 | 8.8:1 | 12.8:1 |
| Outdoor sunny lighting | 10000 | LCD: 420 OLED: 220 | 8.0:1 | 6.2:1 | 10.0:1 | 13.4:1 | 11.4:1 | 15.2:1 |

As shown in Table 1, when the user uses the electronic device in the dark mode in the indoor dark lighting, when the contrast between the displayed content and the background falls within a range of 4.8:1 to 11.3:1, the user feels relatively comfortable and easily recognizes the content. In one embodiment, if the electronic device is in a relatively dark light environment, and the electronic device is in the dark mode, when the contrast between the displayed content and the background is about 8.9:1, the user has highest satisfaction.

Figure 3:
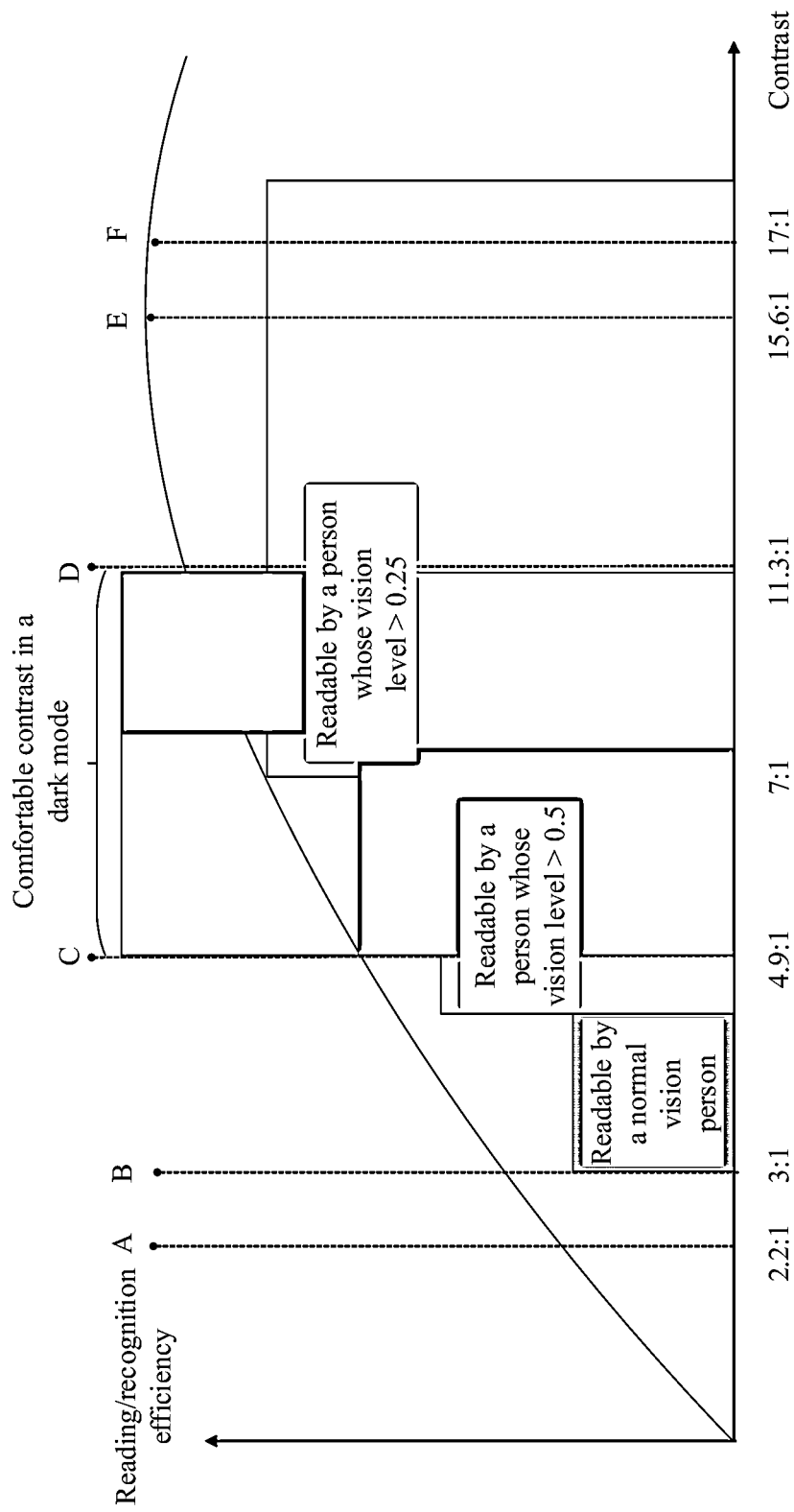
FIG. 3 is a schematic diagram of a human factor experiment result when displayed content is a text and a dark mode is a black background according to this application.

FIG. 3 also shows a human factor experiment result when the displayed content is a text and the dark mode has a black background. In FIG. 3, a horizontal axis is the contrast between the displayed content and the background, and a vertical axis is reading/recognition efficiency of the user. FIG. 3 shows several special values specified in a consistency AA level standard of web content accessibility guidelines (WCAG). The WCAG is web content accessibility guidelines, and is currently followed by both a website and an electronic device such as a mobile phone. As shown in FIG. 3, contrast greater than or equal to 3:1 is a readable contrast range that is of a normal vision person and that is specified in the AA standard of the WCAG. In other words, the contrast greater than or equal to 3:1 can meet a reading requirement of the normal vision person. Contrast greater than or equal to 4.5:1 is a readable contrast range that is of a person whose vision level is greater than 0.5 and that is specified in the AA standard of the WCAG, and the vision level greater than 0.5 is also typical vision of a person about 80 years old, that is, the contrast greater than or equal to 4.5:1 can meet a reading requirement of this visually impaired person. Contrast greater than or equal to 7:1 is a readable contrast range that is of a person whose vision level is greater than 0.25 and that is specified in the AA standard of the WCAG, and greater than 0.25 is also typical vision of a visually impaired person that does not need to use an auxiliary technology, that is, the contrast greater than or equal to 7:1 can meet a reading requirement of this visually impaired person. This application mainly relates to the 4.5:1 standard in AA standard of the WCAG.

In FIG. 3, contrast at a point A is 2.2:1, and is minimum contrast of an active control. That is, when contrast of the active control is greater than 2.2:1, the user has a better recognition effect. In FIG. 3, a point B indicates minimum contrast (3:1) of a text in a large font size, a point C indicates minimum contrast (5:1) of a text in a normal font size, and a point F indicates maximum contrast (17:1) in text contrast. In addition, a range between a point (4.8:1) near the point C in FIG. 3 and a point D in FIG. 3 is 4.8 to 11.3, and is also a comfortable contrast range of the electronic device in the dark mode in Table 1. In addition, a point E in FIG. 3 indicates a maximum range of background contrast, that is, when the background contrast is not greater than 15.6:1, the user feels relatively comfortable.

It may be understood that although the human factor experiment conclusions shown in Table 1 and FIG. 3 are made when the displayed content is a text, the dark mode has a black background, and the normal mode has a white background, these are only possible embodiments, and are not used to limit the protection scope of this application. In one embodiment, human factor experiment conclusions of one or more other pieces of displayed content (or background setting manners) may be alternatively used to determine a comfortable contrast range of a user, and then dark mode switching can be implemented with reference to a subsequent method of this solution.

According to the foregoing human factor experiment conclusions, in this application, when the electronic device is switched to the dark mode, contrast between each element and the background may be adjusted to 8.9:1 or an approximate interval range, to ensure that the user can comfortably use the electronic device in the dark mode.

The contrast is contrast of a color relative to another color, and may be represented as $(L1+a)/(L2+b)$. L1 is brightness of a lighter color in two colors; L2 is brightness of a darker color in the two colors; and a and b are empirical parameters, may be set based on a requirement, and may be the same as or different from each other. In one embodiment, both values of a and b may be 0.5. In this case, contrast=$(L1+0.05)/(L2+0.05)$.

It should be noted that the contrast is a relative concept between two colors. In one embodiment, contrast between two colors cannot be directly adjusted, and the contrast is adjusted by adjusting a color value of at least one of the two colors. Color description manners and color values in the description manners are briefly described now.

As described above, contrast between any two colors is obtained through calculation based on respective brightness of the two colors. For any color, brightness L of the color may be obtained by using an RGB value of the color in an sRGB color space. In one embodiment, the brightness L may be obtained by performing weighted summation on the RGB value. For example, in a possible design, $L=0.2126*R+0.7152*G+0.0722*B$. In an actual scenario, other weights may be designed for R, G, and B. Details are not described.

For any color, the color may be described from a plurality of different color spaces (Color Space, or referred to as color gamut). In chromatics, people establish a plurality of types of color models, and a color is represented by one-dimensional, two-dimensional, three-dimensional, or even four-dimensional spatial coordinates. A color range that can be defined by this coordinate system is a color space. For example, a color may be described by using at least one of an RGB color space, an sRGB color space, a Lab color space, an LCH color space, and an HSV color space.

FIG. 4A to FIG. 4D are schematic diagrams of some color spaces. These color spaces describe a color from different angles by using different color values.

Figure 4A:
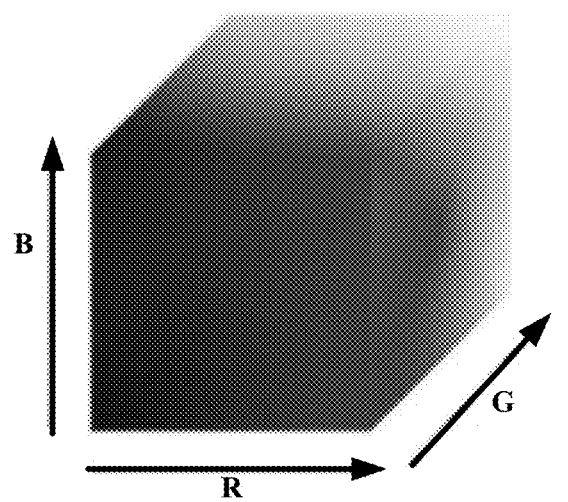
FIG. 4A is a schematic diagram of a structure of a color space used in this application.

FIG. 4A is a schematic diagram of an RGB color space. In the RGB (Red Green Blue) color space, various colors are obtained by changing red (R), green (G), and blue (B) color channels and mutually superimposing the red (R), green (G), and blue (B) color channels. This standard almost includes all colors that can be perceived by human vision, and is one of current most widely used color systems. In other words, R, G, and B values may be used to describe a color.

Figure 4B:
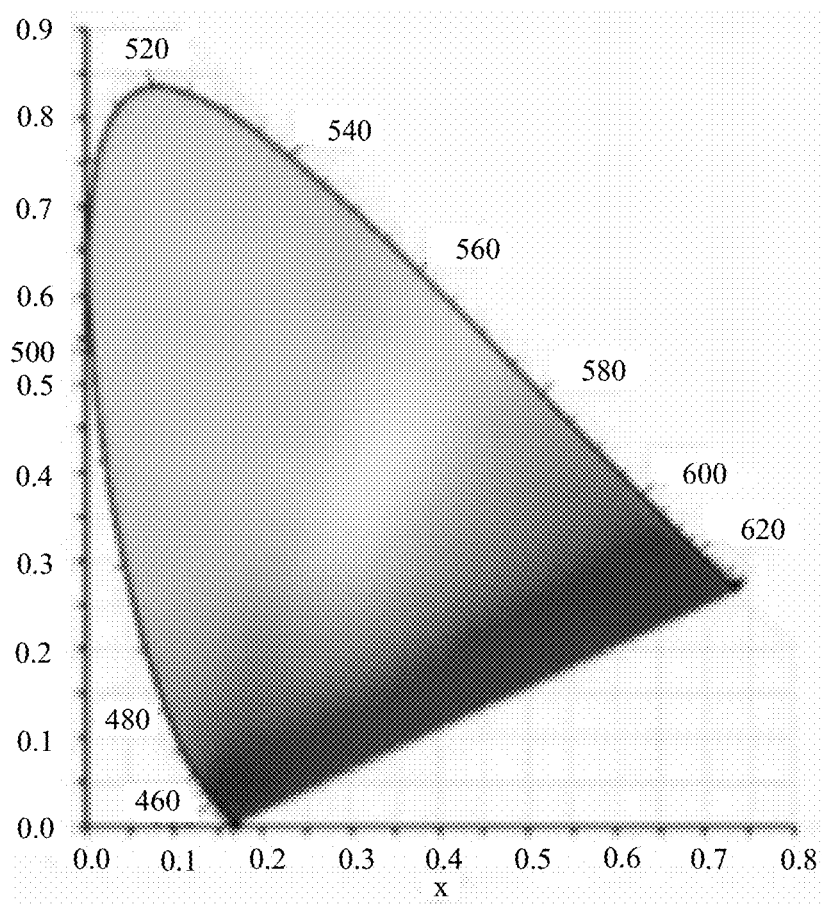
FIG. 4B is a schematic diagram of a structure of a color space used in this application.

FIG. 4B is a schematic diagram of an sRGB color space. The sRGB (standard Red Green Blue) color space is a type of RGB color space. In the color space, based on independent color coordinates, a color can correspond to a same color coordinate system when being used and transmitted by different devices, without being affected by respective different color coordinates of these devices. In the sRGB color space, a color is described by using standard R, G, and B values.

Figure 4C:
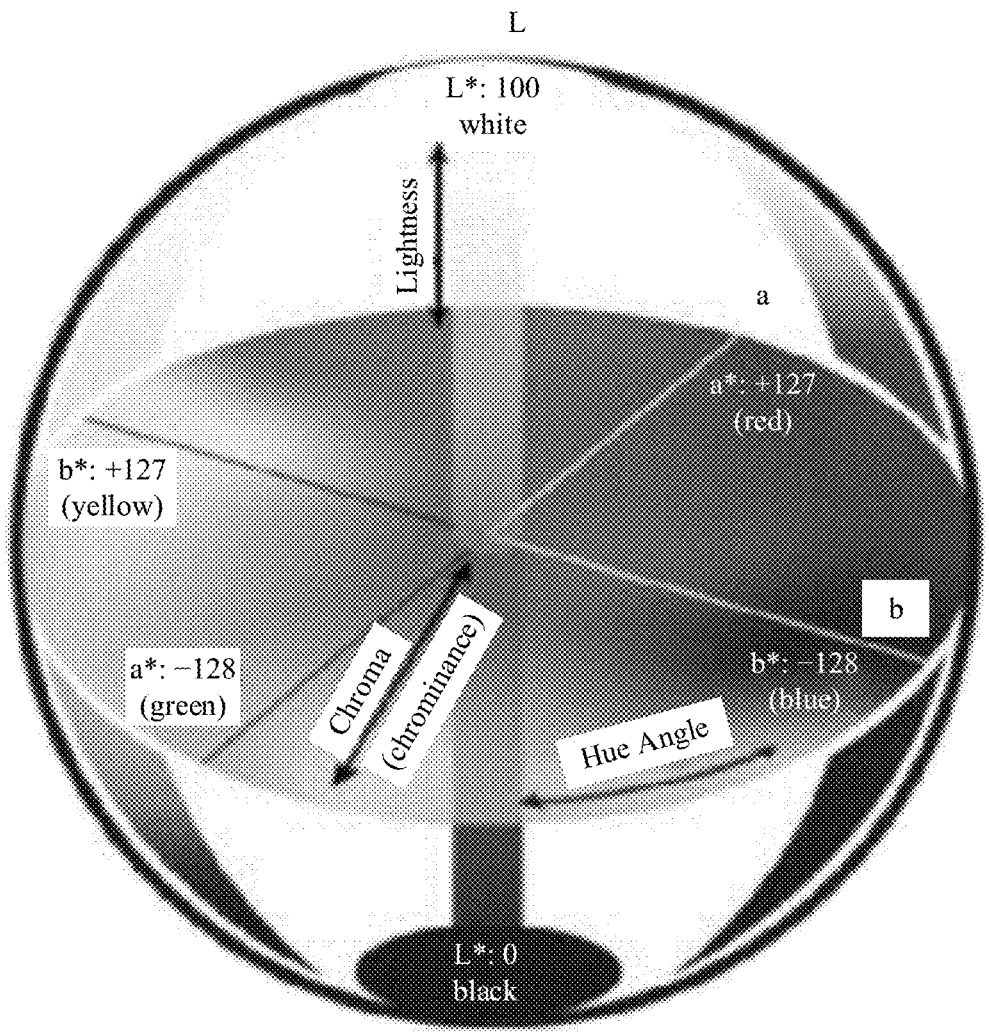
FIG. 4C is a schematic diagram of a structure of a color space used in this application.

FIG. 4C is a schematic diagram of a Lab color space. The Lab (or represented as L*a*b) color space is established based on human eye perception, and is also established based on a theory that one color cannot be both blue and yellow. Therefore, in the Lab color space, a single value is used to describe each of red/green and yellow/blue features. L (or L*) represents lightness (that is, brightness), a (or a*) represents a red/green value, and b (or b*) represents a yellow/blue value. Therefore, in the Lab color space, a color may be described by using L, a, and b values.

An LCH (or represented as L*C*H) color space and the Lab color space are similar color spaces, and have a same representation form but have different definitions. In the LCH space, L (or L*) represents a lightness value, C (or C*) represents chrominance (that is, saturation), and H (or H*) represents cylindrical coordinates of a hue angle value. Therefore, in the LCH color space, a color may be described by using L and C. The LCH space and the Lab space each have a relatively small error with human eye perception, and also have relatively consistent representations in different hues.

Figure 4D:
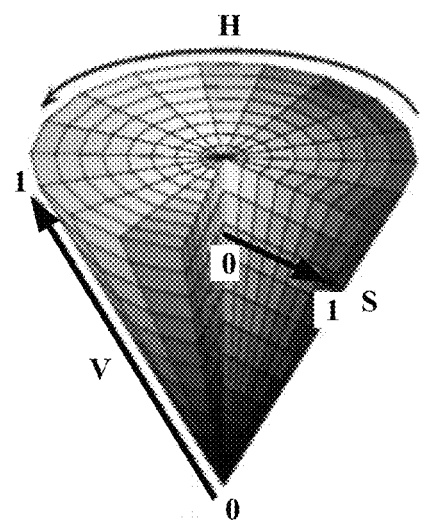
FIG. 4D is a schematic diagram of a structure of a color space used in this application.

FIG. 4D is a schematic diagram of an HSV color space. As shown in FIG. 4D, HSV (Hue, Saturation, Value) is a color space created based on an intuitive color characteristic, and is also referred to as a color space constructed based on a hexcone model (Hexcone Model). In the HSV color space, a color is described by using H to represent a hue (Hue), S to represent saturation (Saturation, that is, chrominance), and V to represent lightness (Value, that is, brightness).

Any color may be described by using one or more of the color spaces shown in FIG. 4. It should be noted that when a color is described by using the foregoing color spaces, same color indices in the color spaces have a same value. For example, for any determined color, L in the Lab color space, L in the LCH color space, and V in the HSV color space all represent brightness and have a same value. Therefore, in an actual scenario, contrast between two colors may be calculated by using L in the foregoing manner, or contrast may be obtained by using RGB values of two colors. A contrast obtaining manner is not specially limited in this application.

In addition, the values of the color spaces may be converted. As described above, brightness L may be calculated by using an RGB value. Similarly, a color may be determined by using brightness L and chrominance C, to obtain an RGB value of the color. A conversion process between the color spaces is not specially limited in this application. Details are also not described herein.

In conclusion, during dark mode switching, if contrast adjustment is required, the contrast adjustment may be implemented by adjusting a brightness L value of a color. The brightness L value may be adjusted by adjusting at least one of color values such as an R value, a G value, a B value, and a C value.

In this application, when the electronic device needs to be switched from the normal mode to the dark mode, each element displayed on a current page and attribute information of each element may be obtained from a system, for example, rendering data in a renderer, and for another example, a view (view) control in an Android system. The attribute information includes at least one of type information, size information, color information, and location information. The type information is used to indicate a type of the element, that is, indicate whether the element is a text, a graphic (further, indicate a type of the graphic), or an image. The size information is used to describe a size of the element, for example, may be described by using a horizontal size and a vertical size in a screen coordinate system. The color information is used to describe color composition of the element (for example, indicate whether the element is monochromatic or polychromatic) and a color value. The location information is used to describe whether the element extends from the top or from the bottom. Extension from the top (in an opposite direction) is downward extension from the top. In this case, an upper edge of the element overlaps an upper edge of a display, that is, the element and the display are consistent in coordinate value in a vertical direction. Extension from the bottom (in an opposite direction) is upward extension from the bottom. In this case, a lower edge of the element overlaps a lower edge of the display.

Therefore, a processing manner corresponding to each element may be determined based on the attribute information of each element (at least one of the type information, the size information, the color information, and the location information).

In one embodiment, the processing manner in this application may include but is not limited to at least one processing manner in foreground color processing, foreground picture processing, background color processing, background picture processing, sub-backboard processing, and backboard processing.

In one embodiment, if the processing manner corresponding to each element may be determined based on the attribute information of each element, for any one of a plurality of elements displayed on a first display interface, a processing manner of each element may be determined in the following manner. For ease of description, in this application, a display interface of the electronic device in the normal mode is referred to as the first display interface, and a display interface of the electronic device in the dark mode is referred to as a second display interface.

Table 2 shows processing manners corresponding to an element in different scenarios.

TABLE 2

|  | Element |  | Processing manner |
|---|---|---|---|
| Text |  |  | Foreground color |
| Graphic | Line Rectangle | A width is less than 86 unit pixels, and a height is less than 86 unit pixels | Foreground color |
|  |  | A width falls between 86 unit pixels and 97% of a screen width, and a height falls between 4 and 86 unit pixels |  |
|  |  | A width falls between 86 unit pixels and 97% of the screen width, and a height is less than 4 unit pixels | Background color |
|  |  | A width falls between 86 unit pixels and 97% of the screen width, and a height is greater than 86 unit pixels |  |
|  |  | A width is greater than or equal to 97% of the screen width, and the element extends from the top or the bottom | Sub-backboard |
|  |  | A width is greater than or equal to 97% of the screen width, and the element does not extend from the top or the bottom | Backboard |
|  | Circle Arc point Path | A width is less than 140 unit pixels, and a height is less than 140 unit pixels | Foreground color |
|  |  | A width falls between 86 unit pixels and 97% of the screen width | Background color |
|  |  | A width is greater than or equal to 97% of the screen width, and the element extends from the top or the bottom | Sub-backboard |

TABLE 2-continued

| | Element | | Processing manner |
|---|---|---|---|
| Image | | A width is greater than or equal to 97% of the screen width, and the element does not extend from the top or the bottom | Backboard |
| | Monochromatic icon | A width is less than 140 unit pixels, and a height is less than 140 unit pixels, and the element is monochromatic | Foreground color |
| | Another icon | A width is less than 140 unit pixels, and a height is less than 140 unit pixels | Foreground picture |
| | Sub-backboard | A width is greater than or equal to 97% of the screen width, and the element extends from the top or the bottom | Sub-backboard |
| | Backboard | A width is greater than or equal to 97% of the screen width, and the element does not extend from the top or the bottom | Backboard |
| | Monochromatic picture | | Background color |
| | Another picture | | Background picture |
| Others | Shadow Black mask | The element is displayed in a black transparency gradient, and transparency of four corners is not 0 | Keep a rendering parameter unchanged |
| | White mask | The element is displayed in a white transparency gradient, and transparency of four corners is not 0 | Transparent processing |

The unit pixel in Table 2 is a size of one pixel when the current screen width is 1440 pixels. It may be learned that the screen width of 1440 pixels is a common configuration of a mobile phone. However, for other electronic devices such as a display and a tablet computer, widths of these electronic devices each are not 1440 pixels. Therefore, when dark modes of these electronic devices are implemented by using this solution, conversion may be performed based on the definition of the unit pixel. In addition, in Table 2, the width is a horizontal size of the element in a screen coordinate system, and a height is a vertical size of the element in the screen coordinate system. For example, for the horizontal lines 208 used to distinguish between the information in the display interface shown in FIG. 2A, in the processing manners shown in Table 2, a width is a horizontal size of the line, and a height is a vertical size of the line.

In an example scenario, as shown in Table 2, after any element on the current display interface is obtained, if it is determined, based on an attribute of the element, that the element is a text, it may be determined that a processing manner corresponding to the element is foreground color processing. In other words, for any one of the plurality of elements displayed on the first display interface, if a type of the element is a text, the element is processed by using a foreground color.

In another example scenario, after any element on the current display interface is obtained, if it is determined, based on an attribute of the element, that the element is a line, size information of the line is further obtained. As shown in Table 2, a processing type of the element may be determined based on the size information of the element. If a width (horizontal length) of the line is less than 86 unit pixels and a height (vertical width) of the line is less than 86 unit pixels, the line is relatively short and may be processed based on a foreground color. If a width of the line falls between 86 unit pixels and 97% of the screen width, and a height of the line falls between 4 and 86 unit pixels, the line is relatively long but relatively narrow and may also be used as a foreground for color processing. However, if a width of the line falls between 86 unit pixels and 97% of the screen width, and a height (vertical width) of the line is less than 4 unit pixels or greater than 86 unit pixels, that is, when the line is very narrow or wide, the line may be used as a background for color processing. Alternatively, if the line is relatively long in a horizontal direction of the display, and a width of the line reaches at least 97% of the screen width, if it is determined, based on location information, that the line downward extends from the top (a top bar) or upward extends from the bottom (a bottom bar or a bottom card), the line may be used as a sub-backboard for processing. In addition, for another case in which a width reaches at least 97% of the screen width, but the line does not extend from the top or the bottom, backboard processing is performed on the line. It may be understood that when a line has a relatively large width (vertical size), an appearance of the line is the same as an appearance of a rectangular box. Therefore, processing of a rectangle is consistent with the processing manner of the line.

Figure 5:
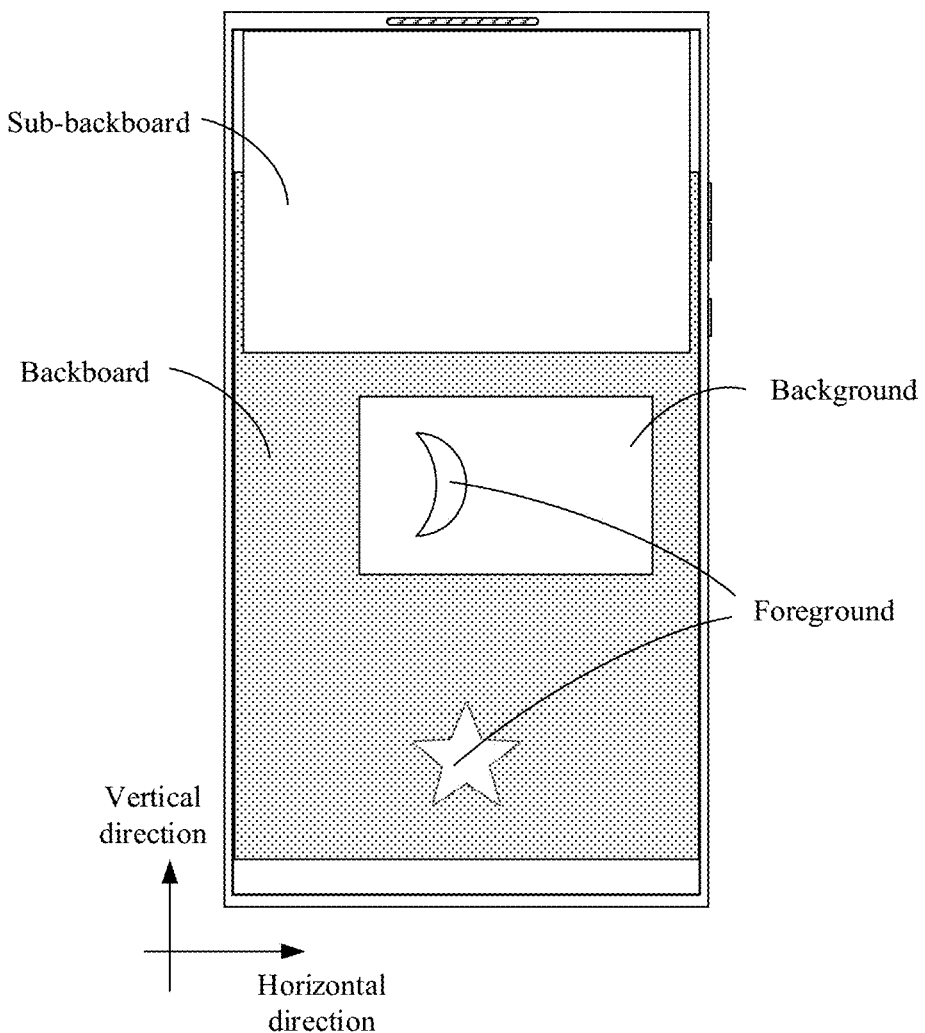
FIG. 5 is a schematic diagram of elements on a display interface of an electronic device according to this application.

For ease of understanding this difference, FIG. 5 is a schematic diagram of elements on a display interface. As shown in FIG. 5 and Table 2, for any line or rectangle, in terms of a horizontal direction, a horizontal size of each of a foreground and a background is less than a horizontal size of each of a sub-backboard and a backboard. A horizontal size of the foreground may be the same as or different from a horizontal size of the background, and a horizontal size of the sub-backboard may also be the same as or different from a horizontal size of the backboard. For example, the horizontal size of the sub-backboard may be larger, smaller, or the same as the horizontal size of the backboard. In addition, in a scenario shown in FIG. 5, the sub-backboard downward extends from the top of the display of the electronic device. In this case, an upper edge of the sub-backboard overlaps an upper edge of the display. It may be understood that when the sub-backboard upward extends from the bottom of the electronic device, a lower edge of the sub-backboard overlaps a lower edge of the display. Therefore, in an actual scenario, the sub-backboard may also be referred to as a "top bar", or a "bottom bar" or a "bottom card". The horizontal size of the backboard is also at least 97% of the screen display width. FIG. 5 shows a case in which the horizontal size of the backboard is greater than the horizontal size of the sub-backboard. In an actual scenario, the horizontal sizes of the backboard and the sub-backboard are not limited to this design, and the backboard and the sub-backboard may have a same horizontal size or different horizontal sizes.

However, different from the sub-backboard, the backboard has no location limitation, and may be located at any location on the display interface. FIG. 5 shows a case in which the backboard is in contact with neither the top of the display interface nor the bottom of the display interface. In an actual scenario, the backboard is not limited to this design. For example, the backboard may be filled in an entire display region. In addition, as shown in FIG. 5, the elements may overlap or be in contact with each other. This is related to a front-end design of the electronic device. This is not specially limited in this application. In this application, based on a size of a line or a rectangle, different dark mode processing is performed on such an image element, as described in Table 2.

In another example scenario, as shown in Table 2, after any element on the current display interface is obtained, if it is determined, based on an attribute of the element, that the element is a circle: if a size of the circle is relatively small, for example, both a width and a height of the circle are less than 86 unit pixels as described in Table 2, the circle is used as a foreground for color processing; if a size of the circle is relatively large, for example, a width of the circle is greater than 97% of the screen width, it is further determined, based on location information, whether the circle extends from the bottom or the top in an opposite direction; and if yes, the circle is used as a sub-backboard for processing; or if no, the circle is used as a backboard for processing; or if a size of the circle falls between 86 unit pixels and 97% of the screen width, the circle is used as a background for color processing. Similarly, when a circle is reduced to a particular size, the circle is represented as a point on the display interface; and when a point is expanded to a particular size, the point is represented as a circle on the display interface. Therefore, the circle and the point may also be processed by using a same policy. In addition, an arc and a path are also processed based on the policy.

In conclusion, for any one of the plurality of elements displayed on the first display interface, if a type of the element is a graphic, based on types of graphics, a line and a rectangle are used as first-type graphics, and a circle, an arc, a point, and a path are used as second-type graphics; and a corresponding size interval is designed for each type of image, so that a corresponding target processing manner is determined based on size information of the graphic. A range of a first size interval is not exactly the same as a range of a second size interval. The target processing manner of the graphic includes foreground color processing, background color processing, sub-backboard processing, or backboard processing. In an example scenario shown in Table 2, the rectangle and the line are used as first-type graphics, and a total of six first size intervals are designed; and for the second-type graphic, a total of four second size intervals are designed. A quantity of first size intervals is different from a quantity of second size intervals. A size range of a first size interval may be the same as a size range of a second size interval. For example, in Table 2, a first size interval and a second size interval that correspond to the sub-backboard processing are the same as each other. Alternatively, a size range of a first size interval may be different from a size range of a second size interval. For example, in Table 2, first size intervals and a second size interval that correspond to the background color processing have different designs.

For images, the images may be classified into three types based on sizes of the images: an icon, a backboard, and a picture. As shown in Table 2, a size of the icon is the smallest, a width of the icon is usually less than 140 unit pixels, and a height of the icon is less than 140 unit pixels; a horizontal size of the backboard and a horizontal size of the sub-backboard are larger, and a width of the backboard and a width of the sub-backboard are usually greater than 97% of the screen width, where the sub-backboard is an element extending from the bottom or the top; and another image may be considered as a picture. That is, for any image, a horizontal size of an icon is the smallest, a horizontal size of the image is the second smallest, a horizontal size of the backboard and a horizontal size of the sub-backboard (the horizontal size of the backboard may be the same as or different from the horizontal size of the sub-backboard) are larger. As described above, the picture may have one or more colors. Therefore, in addition to distinguishing between the icon, the sub-backboard, the backboard, and the picture based on the sizes, it further needs to determine, based on element colors, whether color composition of the icon, the sub-backboard, the backboard, and the picture is monochromatic or polychromatic. The icon is used as an example. A monochromatic icon may be any icon in a single color, and the monochromatic icon may be used as a foreground for color processing. Other icons may include a plurality of types, for example, a transparent icon, a polychromatic icon, and a gradient icon. In this case, considering that other icons may have a plurality of manners, these images are used as foreground pictures for processing.

As shown in Table 2, in a design, for any one of the plurality of elements displayed on the first display interface, if the element is an image, the element may be processed in the following plurality of manners: if type information of the element indicates that the element is an image, color information of the element indicates that the element includes a single color, and a size of the element belongs to a third size interval (a width is less than 140 unit pixels, and a height is less than 140 unit pixels), determining that a target processing manner of the element is foreground color processing; if type information of the element indicates that the element is an image, color information of the element indicates that the element includes at least two colors, and a size of the element belongs to the third size interval, determining that a target processing manner of the element is foreground picture processing; if type information of the element indicates that the element is an image, location information of the element indicates that the element extends from the top or the bottom in an opposite direction, and a size of the element belongs to a fourth size interval (a width is greater than or equal to 97% of the screen width), determining that a target processing manner of the element is sub-backboard processing; if type information of the element indicates that the element is an image, location information of the element indicates that the element does not extend from the top or the bottom in an opposite direction, and a size of the element belongs to the fourth size interval, determining that a target processing manner of the element is backboard processing; if type information of the element indicates that the element is an image, color information of the element indicates that the element includes a single color, and a size of the element belongs to neither the third size interval nor the fourth size interval, determining that a target processing manner of the element is foreground picture processing; or if type information of the element indicates that the element is an image, color information of the element indicates that the element includes at least two colors, and a size of the element belongs to neither the third size interval nor the fourth size interval, determining that a target processing manner of the element is background picture processing, where the fourth size interval is greater than the third size interval.

In an actual processing scenario, there are two special elements: a shadow (or referred to as a black transparent mask) and a white mask that are shown in Table 2. In an actual scenario, the shadow is a black gradient effect. In addition, for example, the shadow is a rectangle, and transparency of four vertexes of the shadow is not 0. In this case, it is preferred to keep an original status, without a need to perform additional processing on the black shadow. The white mask is opposite to the shadow and is a white gradient effect. The white mask is usually set on a picture or a text to generate a white transparency gradient effect. During dark mode processing, foreground color processing is performed on the text, if a white mask is superimposed on a processed text, viewing by the user may be affected. Therefore, transparent processing may be performed on the white mask, that is, the entire white mask is made transparent (transparency Alpha=0 is made). In this way, impact of the white mask on recognition and reading by the user is avoided.

It may be understood that the shadow and the white mask each may include a graphic, or may include an image. Therefore, after any element on the current display interface is obtained, if color information of the element meets a color design of a shadow or a white mask, a rendering parameter of the shadow is kept unchanged, and transparent processing is performed on the white mask. That is, for any element in the plurality of elements, if color information of the element indicates that the element is displayed in a black transparency gradient, and endpoint transparency of the element is not 0, it is determined that a target processing manner is keeping a rendering parameter of the element unchanged; or if color information of the element indicates that the element is displayed in a white transparency gradient, and endpoint transparency of the element is not 0, it is determined that a target processing manner is transparent processing, where the transparent processing is used to display the element in full transparency. Another element may be processed in a manner shown in Table 2.

In one embodiment, for an electronic device that uses an Android system, in addition to providing attribute information of each element for a user, a view control in the Android system may further provide a view recognition result. For any element, in addition to including the attribute information (type information, size information, color information, and location information) of the element, the view recognition result further includes layer information of the element. The layer information is used to indicate whether the element is located at a top layer of display layers.

Table 3 shows processing manners corresponding to another element in different scenarios.

TABLE 3

| Element | Layer information of the element | Attribute information of the element | Processing manner |
| --- | --- | --- | --- |
| Text | | | Foreground color |
| Circle Arc | Located at the top layer | | Foreground color |
| | Located at a non-top layer | | Background color |
| Rectangular Line Path | Located at the top layer | A width is less than 140 unit pixels, and a height is less than 140 unit pixels | Foreground color |
| | | A width is less than 97% of a screen width | Background color |
| | | A width is greater than or equal to 97% of the screen width, and the element extends from the top or the bottom | Sub-backboard |
| | | A width is greater than or equal to 97% of the screen width, and the element does not extend from the top or the bottom | Backboard |
| | Located at a non-top layer | A width is less than 97% of the screen width | Background color |
| | | A width is greater than or equal to 97% of the screen width, and the element extends from the top or the bottom | Sub-backboard |
| | | A width is greater than or equal to 97% of the screen width, and the element does not extend from the top or the bottom | Backboard |
| Image | Located at the top layer | A width is less than 140 unit pixels, and a height is less than 140 unit pixels | Foreground picture |
| | | A width is less than 97% of the screen width | Background picture |
| | | A width is greater than or equal to 97% of the screen width, and the element extends from the top or the bottom | Sub-backboard |
| | | A width is greater than or equal to 97% of the screen width, and the element does not extend from the top or the bottom | Backboard |
| | Located at a non-top layer | A width is less than 97% of the screen width | Background picture |
| | | A width is greater than or equal to 97% of the screen width, and the element extends from the top or the bottom | Sub-backboard |

TABLE 3-continued

| Element | Layer information of the element | Attribute information of the element | Processing manner |
|---|---|---|---|
| | | A width is greater than or equal to 97% of the screen width, and the element does not extend from the top or the bottom | Backboard |

As shown in Table 3, because the view recognition result includes the layer information of the element and information such as a size and a color of the element, it may be directly determined, based on a view recognition result obtained in real time, processing to be performed on each element.

As described above, the text is used as a foreground element, and foreground color processing is performed on the text. Details are not described herein.

In Table 3, the circle and the arc are used as third-type graphics. For the third-type graphic, a processing manner may be directly determined based on layer information that is of the element and that is carried in a view recognition result. As shown in Table 3, a graphic displayed at the top layer of the display layers is considered as a foreground element for foreground color processing; and a circle or an arc graphic located at a non-top layer of the display layers is considered as a background element for background color processing.

In Table 3, the rectangle, the line, the path, and the like are used as fourth-type graphics. For the fourth-type graphic, a processing manner is mainly selected from foreground color processing, background color processing, backboard processing, and sub-backboard processing manners. These processing manners are related to a size of the element. Therefore, one embodiment further should be determined with reference to the size of the element based on a layer relationship of the element. As shown in Table 3, for any such graphic element, if the element is located at the top layer of the display layers, classification processing is performed according to a principle that a size of a foreground is the smallest, a size of a background is the second smallest, a size of a sub-backboard is the third smallest, and a size of a backboard is the largest; or if the element is located at a non-top layer of the display layers, this case does not relate to foreground color processing, classification processing is performed according to a principle that in terms of horizontal size, a horizontal size of a sub-backboard and a horizontal size of a backboard are greater than 97% of the screen width, and a horizontal size of a background is the smallest, the horizontal size of the sub-backboard is the second smallest, and the horizontal size of the backboard is the largest.

If type information of the element indicates the element is a fourth-type graphic, and layer information of the element indicates that the element is located at the top layer of the display layers, a fifth size interval to which a size of the element belongs is determined, and a processing manner corresponding to the fifth size interval (Table 3 shows four fifth size intervals) and location information is determined as a target processing manner, where a processing manner corresponding to the fifth size interval includes foreground color processing, background color processing, sub-backboard processing, or backboard processing; or if type information of the element indicates the element is a fourth-type graphic, and layer information of the element indicates that the element is located at a non-top layer of the display layers, a sixth size interval (Table 3 shows three sixth size intervals, and details are not described again) to which a size of the element belongs is determined, and a processing manner corresponding to the sixth size interval and location information is determined as a target processing manner, where a processing manner corresponding to the sixth size interval includes background color processing, sub-backboard processing, or backboard processing.

In this processing manner, a processing manner of the image is similar to the processing manner of the graphic such as a rectangle, a line, or a path. A difference lies in that foreground and background processing for the image are processing performed based on a foreground picture and a background picture, and the foreground and background processing for the image are processing performed based on a foreground color and a background color. That is, for any one of the plurality of elements, determining a target processing manner of the element includes: if type information of the element indicates the element is an image, and layer information of the element indicates that the element is located at the top layer of the display layers, a seventh size interval (Table 3 shows four seventh size intervals) to which a size of the element belongs is determined, and a processing manner corresponding to the seventh size interval and location information is determined as the target processing manner, where a processing manner corresponding to the seventh size interval includes foreground picture processing, background picture processing, sub-backboard processing, or backboard processing; or if type information of the element indicates the element is an image, and layer information of the element indicates that the element is located at a non-top layer of the display layers, an eighth size interval (Table 3 shows three eight size intervals: a width is less than 97% of the screen width; and a width is greater than or equal to 97% of the screen width) to which a size of the element belongs is determined, and a processing manner corresponding to the eighth size interval and location information is determined as the target processing manner, where a processing manner corresponding to the eighth size interval includes background picture processing, sub-backboard processing, or backboard processing. For details, refer to Table 3. No additional details are described.

In an actual scenario, a dark mode processing manner of each element may be determined in any one of the foregoing embodiments.

It should be noted that the foregoing embodiments shown in Table 2 and Table 3 are merely example possible designs. When this solution is actually used, the size information for classifying the foregoing elements may further have an approximate variation design. For example, for the width of the backboard and the width of the sub-backboard, in addition to being designed as 97%, the widths may be set to 95%, 99%, or the like. For another example, for the 86 unit pixels in Table 2 or Table 3, 90 unit pixels, 80 unit pixels, or the like may be set instead. No exhaustive description is provided. That is, a size threshold (or endpoints of a size interval) for classifying the elements is not limited in this application, provided that size thresholds (or size intervals)

respectively corresponding to processing manners are customized based on an actual requirement.

A manner of performing dark mode processing on each element is now described in detail with reference to a scenario.

It should be noted that the following processing is processing an original color value of the element in the normal mode, to obtain a dark mode rendering parameter of the element in the dark mode. In a dark mode processing process, after the dark mode rendering parameter is obtained in the following manner, the element is rendered in real time based on the dark mode rendering parameter, and a rendered element is output to the display, to implement switching from the normal mode to the dark mode.

It may be understood that when the electronic device is switched from the normal mode to the dark mode, a dark mode image can be displayed on the display provided that dark mode processing is performed on each element displayed on a current display interface, the element is rendered in real time based on a processed dark mode rendering parameter, and a rendered element is output. When the electronic device is in a dark mode state, for any display interface in the electronic device, for example, when the electronic device is switched from a display interface to another display interface, for another example, when the electronic device slides a display interface for display (for example, a user finger upward slides the display interface to enable content of the display interface to downward extend), dark mode processing needs to be performed on a displayed image. In other words, when the electronic device is in the dark mode, regardless of content displayed on the electronic device, each time an image is displayed, dark mode processing needs to be performed on each element in the image, the element is rendered in real time based on a processed dark mode rendering parameter, and a rendered element is output.

In addition, an example in which the normal mode has a white background and the dark mode has a black background is used for description in this application. Therefore, in Table 4 and a subsequent description process, white contrast is contrast of a color of an element relative to a white (background), and black contrast is contrast of a color of an element relative to a black (background). It may be understood that in one embodiment, a background of the normal mode may have a plurality of other designs. In addition to the black background, another dark background may be designed for the dark mode. In this case, white contrast may be contrast of a color of an element relative to a background color of the normal mode, and black contrast may be contrast of a color of an element relative to a background color of the dark mode.

(1) Foreground Color Processing

The foreground color processing is mainly for a text and a graphic and image (monochromatic icon) with relatively small sizes. In addition, colors of these elements are relatively single, and these elements mainly include a monochromatic foreground and a gradient foreground. For example, if the text is a foreground, a pure black text is a monochromatic foreground, and a text in a red and black gradient color and a text in a red transparency gradient are gradient foregrounds. During actual processing, monochromatic foregrounds may further be classified into a gray-tone foreground and a bright-color foreground. For example, a gray, black, or white text, icon, graphic, and the like are all gray-tone foregrounds, and a color of the bright-color foreground has relatively high chrominance, for example, a yellow, red, or green foreground.

Table 4 shows a processing manner of the foreground color processing in this application.

First, color processing for the gray-tone foreground is described.

Figure 6:
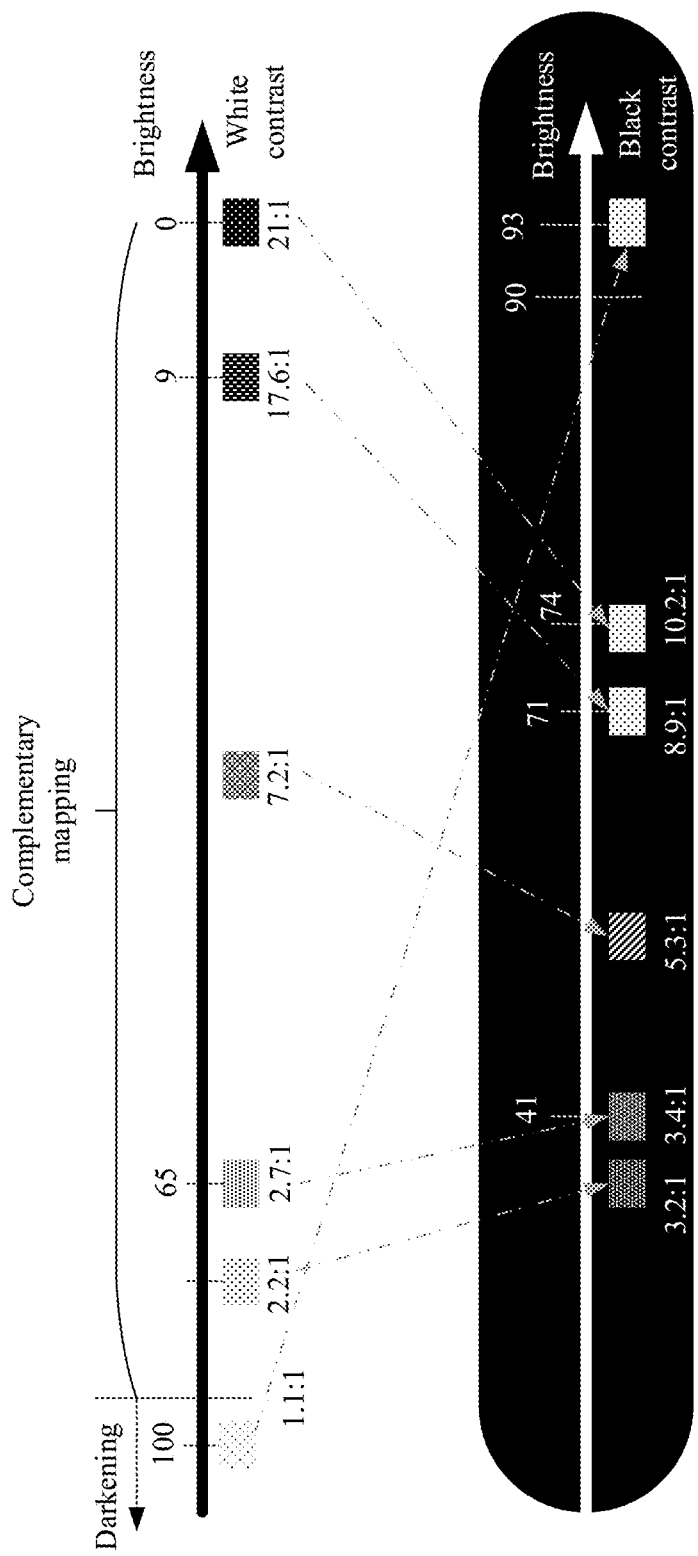
FIG. 6 is a schematic diagram of an element processing manner according to this application.

The gray-tone foreground is mainly a black, white, or gray foreground. As shown in Table 4, in this application, color processing is mainly performed on the gray-tone foreground based on white contrast of the gray-tone foreground. In this case, refer to FIG. 6. FIG. 6 is a schematic diagram of color processing of a gray-tone foreground.

On a display interface, a contrast range is usually 0:1 to 21:1. If white contrast is 0:1, the gray-tone foreground is white; or if white contrast is 21:1, the gray-tone foreground is black. On the contrary, if black contrast is 0:1, the gray-tone foreground is black; or if black contrast is 21:1, the gray-tone foreground is white. Therefore, to display the gray-tone foreground on the screen, during switching to the dark mode, that is, switching from a white background to a black background, complementary mapping processing needs to be performed on the gray-tone foreground to obtain a dark mode color corresponding to the gray-tone foreground. If L0 is used to represent brightness of an original color of the gray-tone foreground, and L1 is used to represent brightness of the dark mode color, a complementary mapping relationship may be represented as L1=–L0.

TABLE 4

| | Attribute information of an element | | Specific processing manner |
|---|---|---|---|
| Foreground color | Gray-tone foreground | White contrast is greater than or equal to 1.1:1 | Perform complementary mapping, for example, L1 = 74 − 0.54L0 |
| | | White contrast is less than 1.1:1 (ultra-bright foreground) | Perform darkening |
| | Bright-color foreground | Black contrast falls between 0 and 8.9:1 | Enhance the contrast, for example, enhance the contrast to 5:1 to 8.9:1 |
| | | Black contrast falls between 8.9:1 and 15.7:1 | Keep a rendering parameter unchanged |
| | | Black contrast falls between 15.7:1 and 19:1 | Perform darkening, to adjust the contrast to a dark level before 15.7:1 |
| | | Black contrast is greater than 19:1 (bright-color ultra-bright foreground) | Perform darkening, for example, L1 = L0 − 9 |
| | | Brightness L0 is less than 30 | Reduce chrominance (saturation), for example, C1 = 1/3C0 |

TABLE 4-continued

| Attribute information of an element | | Specific processing manner |
|---|---|---|
| Gradient-color foreground | The element is displayed in a white transparency gradient, and transparency of four corners is not 0 (white mask) | Transparent processing |
| | The element is displayed in a black transparency gradient, and transparency of four corners is not 0 (black transparent mask or shadow) | Keep a rendering parameter unchanged |
| | Another gradient of at least one color | Separately process colors of two ends of the gradient according to a monochromatic rule, and then perform a gradient |

Based on this, in this application, it is further considered that, according to the human factor experiment conclusion, a contrast range in which the user feels comfortable in the dark mode is about 8.9:1. Therefore, in this application, based on this, when performing complementary mapping on a gray background, the gray-tone foreground is further mapped to a preset target black contrast segment (for example, a segment around 8.9:1). In this case, a complementary mapping relationship may be represented as L1=a−b*L0, where values of a and b relate to a target black contrast segment range.

In one embodiment, the values of a and b may be constructed only through mapping between two colors. For example, as shown in FIG. 6, white contrast of 2.2:1 may be mapped to black contrast of 3.2:1, and white contrast of 21:1 may be mapped to black contrast of 10.2:1. Therefore, based on the mapping between the two colors, it is determined that a is 74 and b is 0.54, that is, in this case, a complementary mapping relationship may be represented as L1=74−0.54L0. It may be understood that during actual implementation of this solution, a complementary mapping relationship may be constructed by using any two colors, and the target segment may be preset based on a requirement. For example, maximum contrast in the target segment may be 8.9:1. For another example, a minimum value in the target segment may be 5:1.

Based on the foregoing complementary mapping relationship, complementary mapping may be performed on any gray-tone foreground to obtain a dark mode color corresponding to the gray-tone foreground, and black contrast of the dark mode color falls within the target segment range. This ensures that the user can comfortably and conveniently perform reading. As shown in FIG. 6, a color whose white contrast is 2.7:1 may be mapped to a color whose black contrast is 3.4:1, a color whose white contrast is 7.2:1 may be mapped to a color whose black contrast is 5.3:1, and a color whose white contrast is 17.6:1 may be mapped to a color whose black contrast is 8.9:1.

Therefore, when a gray-tone foreground is enabled to be in the dark mode, a dark mode rendering parameter (R, G, and B values) can be obtained provided that color space conversion is performed on brightness of a dark mode color. Therefore, the gray-tone foreground displayed in the dark mode can be obtained provided that the gray-tone foreground is rendered based on the dark mode rendering parameter.

In addition, it is considered that when white contrast is relatively low, for example, when the white contrast ratio is less than 1.1:1, a gray-tone foreground is very bright or even close to pure white. In this case, on the display interface, the gray-tone foreground is usually an ultra-bright foreground located on a bright-color background.

If an ultra-bright foreground is processed in a complementary mapping manner, a near-white foreground in a bright-color background is processed into a near-black foreground in a bright-color background. This processing manner is feasible. However, it is more user-friendly to keep a display manner of an original front-end interface as far as possible during mode switching of the ultra-bright foreground. Therefore, this application further provides an additional processing manner for this ultra-bright foreground: darkening processing. That is, brightness L of the ultra-bright foreground is reduced, but C and H are kept unchanged, to keep a color relationship between the ultra-bright foreground and a background of the ultra-bright foreground without irritating the eyes.

In this case, if L0 is still used to represent brightness of an original color of a gray-tone foreground, and L1 is still used to represent brightness of a corresponding dark mode color in the dark mode, L0 and L1 may meet the following relationship: L1=L0−d, where d is used to indicate brightness reduction amplitude. In an example scenario, L1=L0−90. In addition, the darkening processing is alternatively implemented in another manner. This is subsequently described in detail.

Figure 7A:
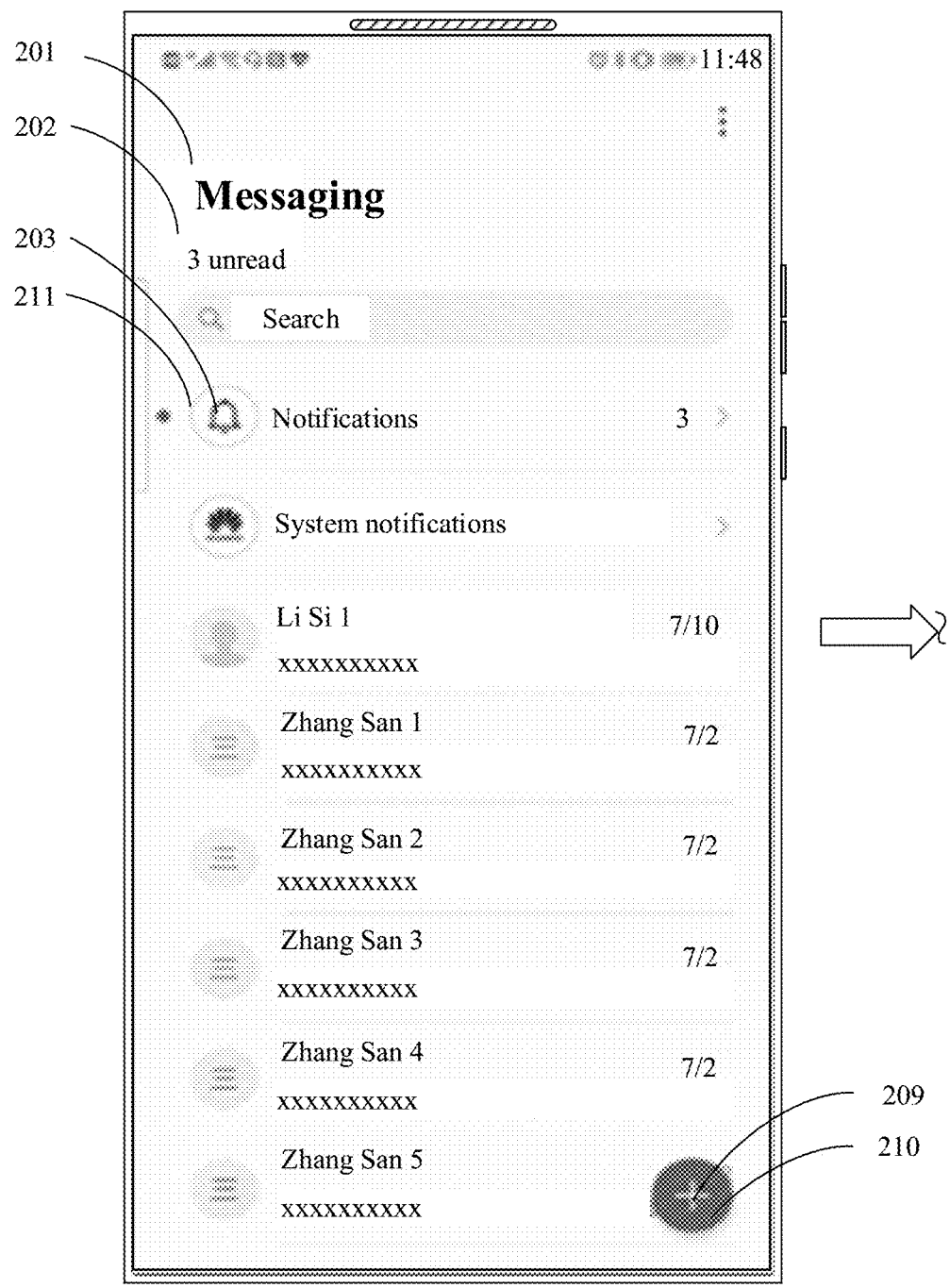
FIG. 7A and FIG. 7B are another schematic diagram of mode switching of an electronic device according to this application.
Figure 7B:
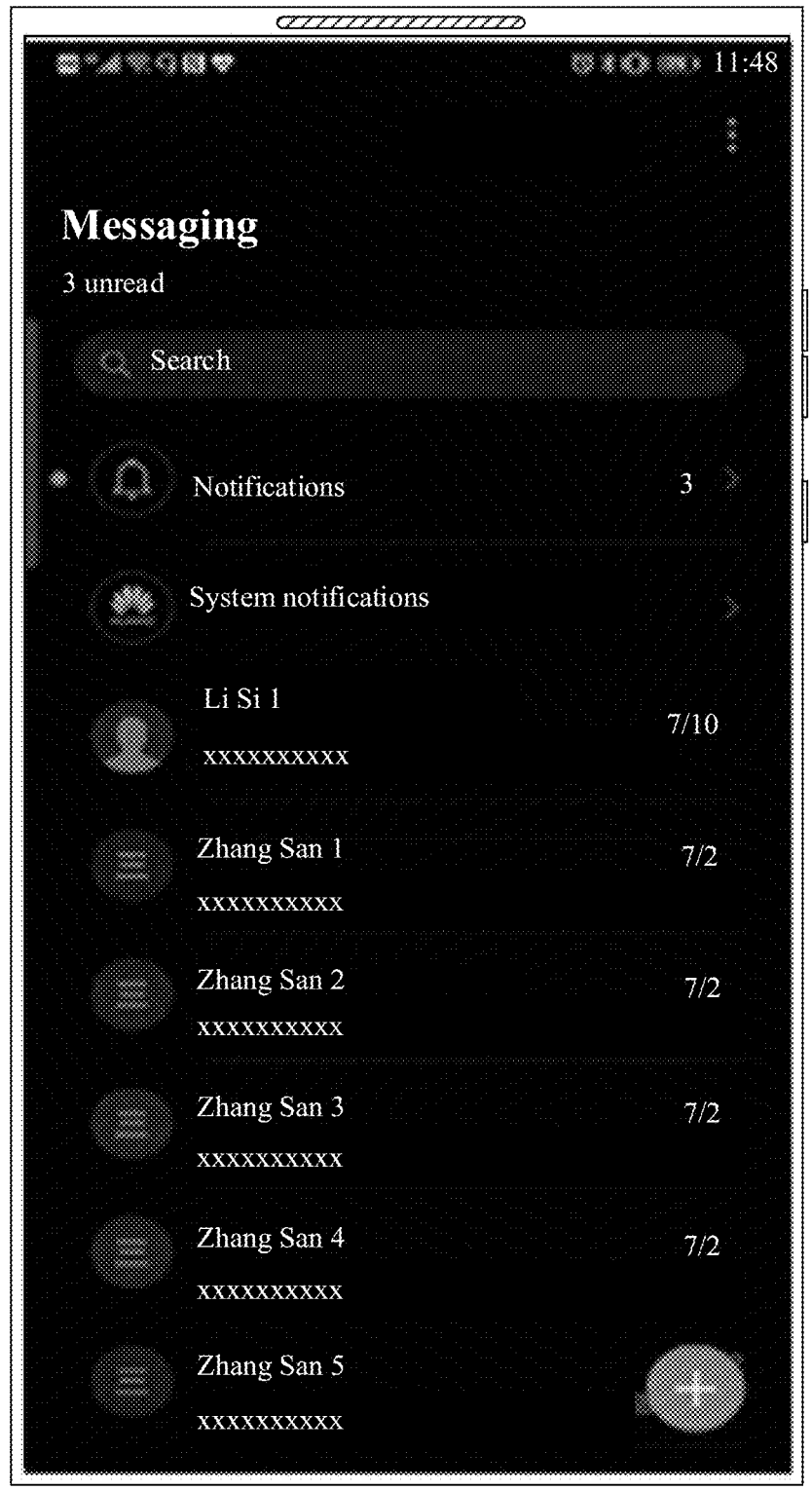

FIG. 7A and FIG. 7B are a schematic diagram of a color processing effect of a gray-tone foreground according to this application.

For each gray-tone foreground on a display interface of the electronic device, for example, black texts (such as a text 201 and a text 202) in different font sizes, a bell icon 203 (a black graphic), and a gray circle 211 that are shown in FIG. 7A, complementary mapping is performed on the elements according to Table 4 and FIG. 6, so that the texts and the bell graphic are mapped from back to a gray tone, and gray mapping is also performed on the gray circle. When the electronic device is in the dark mode, contrast between each gray-tone foreground and a black background falls with the foregoing target segment, for ease of reading and recognition by the user, thereby improving user experience and reading comfort.

In addition, in a scenario shown in FIG. 7A, an ultra-bright foreground displayed on a colored background (circle) further exists. An icon 209 ("+") is an ultra-bright foreground located on a bright-color circular background 210. A design for the ultra-bright foreground is different from a design for another gray-tone foreground. When the electronic device is in the dark mode, the "+" is still in a whitish color, and only brightness of the "+" is reduced from 100 to 92 compared with the "+" in the normal mode. In this case, a color relationship between the ultra-bright foreground icon 209 and the bright-color background 210 of the ultra-bright foreground icon 209 is still retained, so that the user can clearly know, without distinguishing, that the icon is the same as the icon in the normal mode, for ease of use.

In conclusion, if the target processing manner of any one of the plurality of elements is foreground color processing, the following processing manner may be included: if an element color of the element is a gray-tone color, obtaining white contrast of the element color, where the white contrast is contrast of any color relative to white; and if the white contrast is greater than or equal to a preset first contrast threshold, performing complementary mapping on the element color to obtain a rendering parameter, where black contrast is contrast of any color relative to black; or if the white contrast is less than the first contrast threshold, reducing brightness of the element color to obtain a rendering parameter. For example, in one embodiment shown in Table 4, the first contrast threshold is 1.1:1.

Second, color processing for the bright-color foreground is described.

As shown in the foregoing Table 2 or Table 3, the bright-color foreground is a foreground in a single bright color, and may include a bright-color text, a bright-color graphic, and a bright-color icon (an image with a relatively small size). Referring to Table 4, in this application, color processing is mainly performed on the bright-color foreground based on black contrast of the bright-color foreground. In this case, refer to FIG. 5. FIG. 5 is a schematic diagram of color processing of a bright-color foreground.

Figure 8:
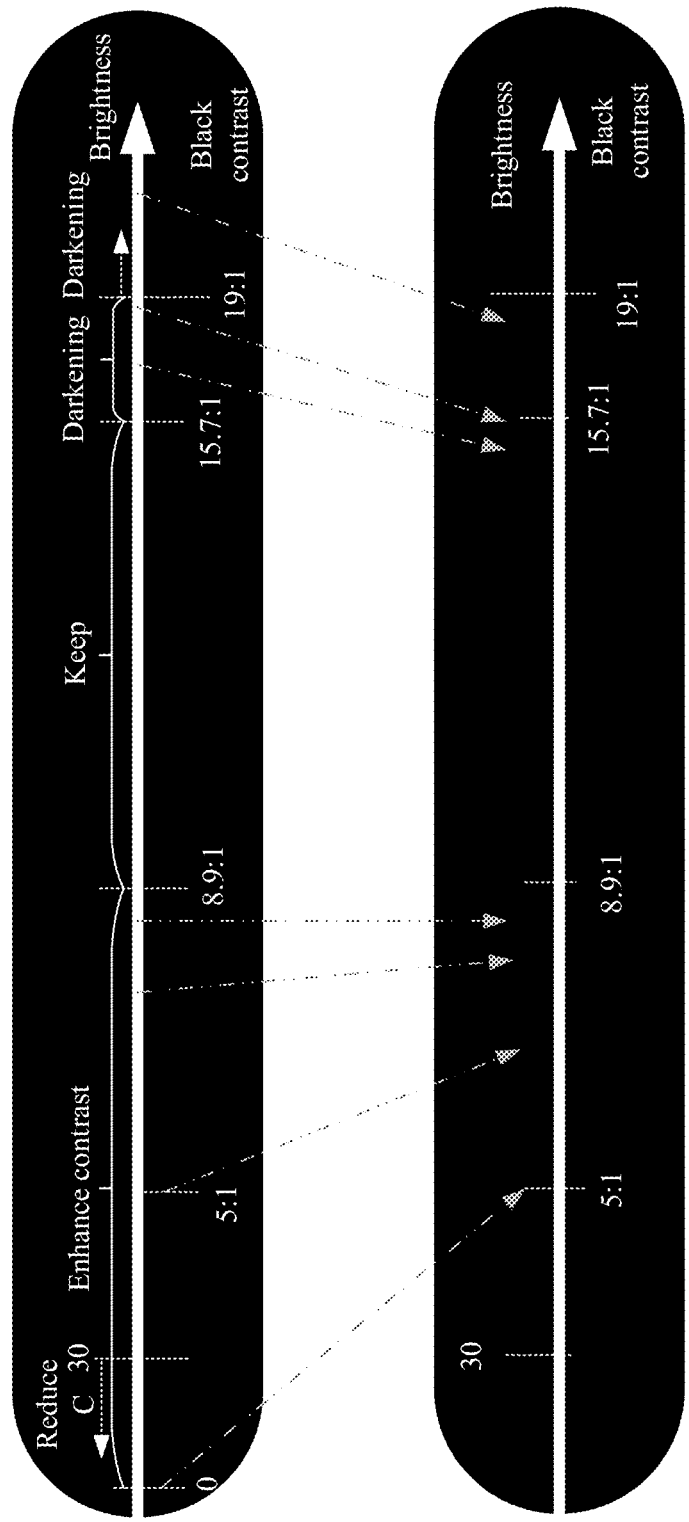
FIG. 8 is a schematic diagram of another element processing manner according to this application.

As shown in Table 4 and FIG. 8, in this application, the black contrast of the bright-color foreground is segmented with reference to the human factor experiment conclusion, and different processing is performed on bright-color foregrounds falling within different contrast ranges.

When black contrast of a bright-color foreground falls within a range of 0 to 8.9:1, there is no clear contrast between the bright-color foreground and a black background, causing inconvenience for reading by the user. Therefore, contrast enhancement processing can be performed on the bright-color foreground.

In one embodiment, the black contrast of the bright-color foreground may be mapped from 0 to 8.9:1 to 5:1 to 8.9:1. During one embodiment of this mapping, a manner similar to the foregoing complementary mapping may be alternatively used, that is, dark mode colors respectively corresponding to two colors are first determined, and then a mapping relationship between an original color and a dark mode color is constructed. For example, in a scenario shown in FIG. 8, a color whose black contrast is 0 may be mapped to a dark mode color whose black contrast is 5:1; and a color whose black contrast is 8.9:1 is unchanged, and contrast of the color in the normal mode is the same as contrast of the color in the dark mode. Based on this, a mapping relationship between original color brightness L0 and dark mode color brightness L1 may be determined.

When black contrast of a bright-color foreground falls between 8.9:1 and 15.7:1 (including the endpoints), there is relatively clear contrast between the bright-color foreground and a black background. In addition, the contrast range also conforms to the human factor experiment conclusion, and is a contrast range in which the user feels relatively comfortable. Therefore, it is preferred to keep an original status, without a need to perform another processing on this bright-color foreground. For example, for a yellow text displayed on the display, if contrast between yellow of the text and a black background is 10:1, and is just contrast in which the user feels comfortable, it is preferred to render the yellow text based on an original color value of the yellow, without a need to perform additional processing on the yellow text.

If black contrast of a bright-color foreground is greater than 15.7:1, it indicates that the bright-color foreground is excessively bright. Therefore, darkening processing is performed on the bright-color foreground.

The darkening processing may be implemented in the foregoing darkening processing manner, that is, according to L1=L0−d (a value of d may be preset, and a darkening degree may be the same as or different from a darkening degree of the foregoing gray-tone foreground).

Figure 9:
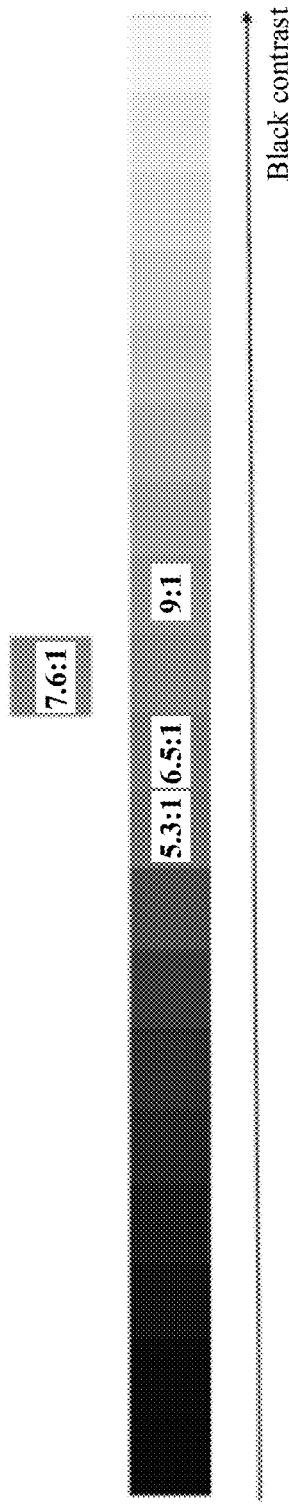
FIG. 9 is a schematic diagram of color levels used in this application.

Alternatively, a previous dark-level color corresponding to an initial color value may be obtained as a dark mode color based on a color level. For example, FIG. 9 is a schematic diagram of color levels. As black contrast is enhanced, color brightness of the color level gradually enhances. In this case, if black contrast of a bright-color foreground in an electronic device is 7.6:1, black contrast of a neighboring dark-level color is 6.5:1, and black contrast of a neighboring bright-level color is 9:1, during darkening processing, the color corresponding to 6.5:1 may be used as a dark mode color of the bright-color foreground. On the contrary, if brightening processing needs to be performed, the color corresponding to 9:1 may be used as a dark mode color of the bright-color foreground. In addition, during the darkening processing, contrast corresponding to the dark mode color and contrast corresponding to an initial color of the bright-color foreground in the normal mode are separated from each other by at least one color level. That is, in addition to using the neighboring dark-level color as the dark mode color, a dark-level color (a color corresponding to 5.3:1 in FIG. 9) separated by at least one color level from the initial color may be alternatively used as the dark mode color.

When black contrast of a bright-color foreground is greater than 19.1:1, the bright-color foreground may be a bright-color ultra-bright foreground on a black background. Processing in this case is similar to the foregoing processing manner of the ultra-bright foreground, that is, darkening processing is performed on the bright-color ultra-bright foreground, to reduce brightness of the bright-color ultra-bright foreground, to avoid irritation of the bright-color ultra-bright foreground to the eyeballs of the user. In this case, the darkening processing may be performed on the bright-color foreground in any one of the foregoing manners. For example, as shown in Table 4, brightness L0 of an original color may be reduced by 9, to obtain brightness L1 of a dark mode color.

It should be noted that processing manners in the segment of 15.7:1 to 19:1 and the segment greater than 19:1 are not specially limited in this application. In the two segments, a same processing manner may be used, or different processing manners may be separately used for darkening processing, for example, the embodiments shown in Table 4. When a same processing manner is used, this may be implemented by presetting a brightness attenuation degree (d value) or presetting several attenuation color levels, or mapping brightness of a color to a relatively low brightness interval in the foregoing mapping manner. In addition, a manner and a degree of the darkening processing of the bright-color foreground may be the same as or different from a manner and a degree of the darkening processing of the gray-tone foreground. That is, the darkening processing of the gray-tone foreground may also be implemented in a color level manner. Details are not described.

In addition, in this application, a special case is further considered. That is, when brightness of a bright-color foreground is relatively small, for example, as shown in Table 4 and FIG. 8, when L0 is less than 30, saturation of the bright-color foreground may be relatively high. In this case, additional chrominance reduction processing needs to be performed on the bright-color foreground. A reduction manner may include: reduction amplitude (assumed as f) is preset, where chrominance C0 of an original color and chrominance C1 of a dark mode color meet C1=C0−f; or a reduction ratio (assumed as e) may be preset, where chrominance C0 of an original color and chrominance C1 of a dark mode color meet C1=e*C0. Values of e and f may be customized. For example, Table 3 shows a possible design: C1=⅓C0, that is, chrominance of the bright-color foreground is reduced to ⅓ of original chrominance, to reduce irritation of the high-chrominance bright-color foreground to the eyeballs of the user.

Figure 10A:
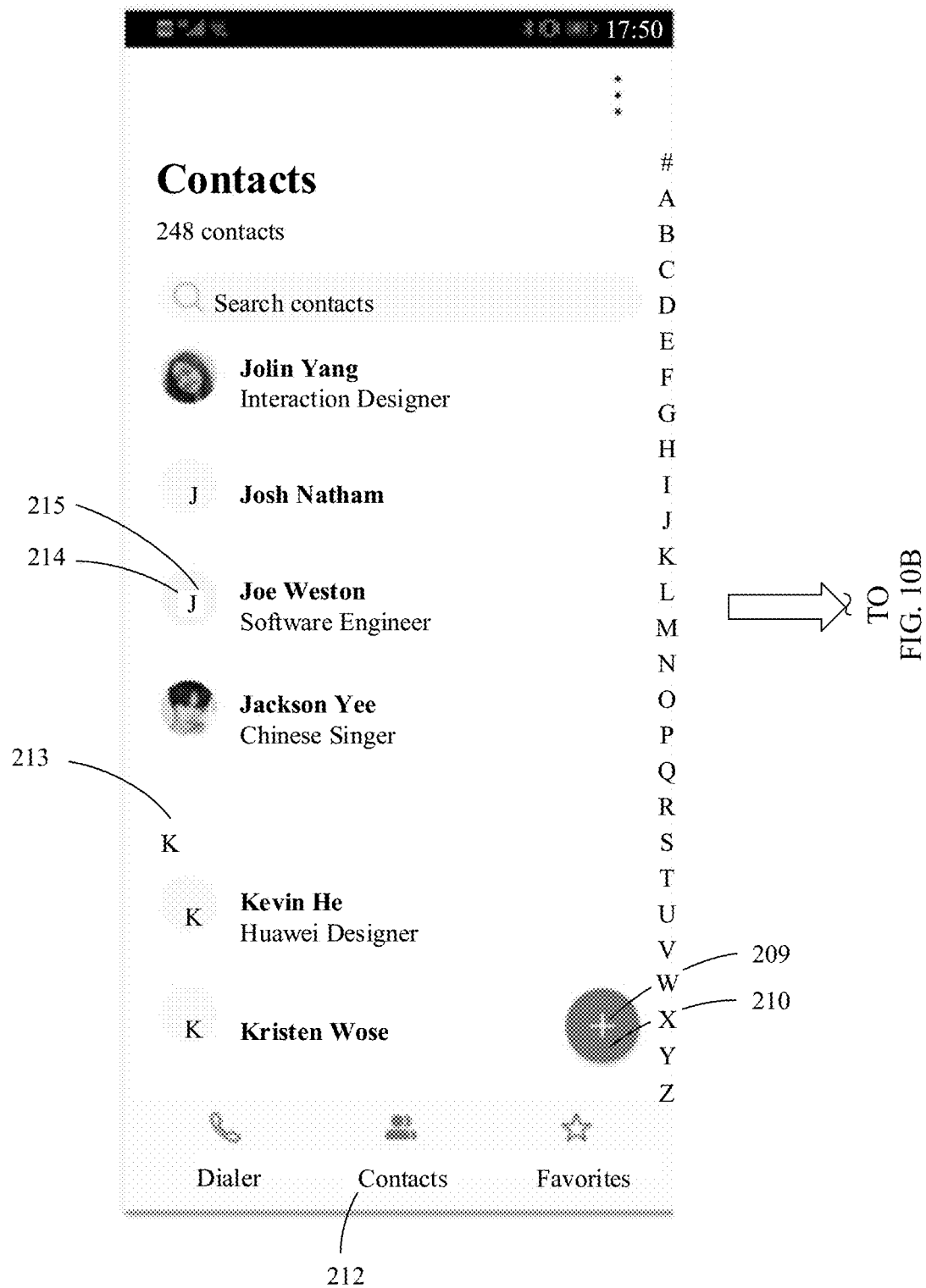
FIG. 10A and FIG. 10B are another schematic diagram of mode switching of an electronic device according to this application.
Figure 10B:
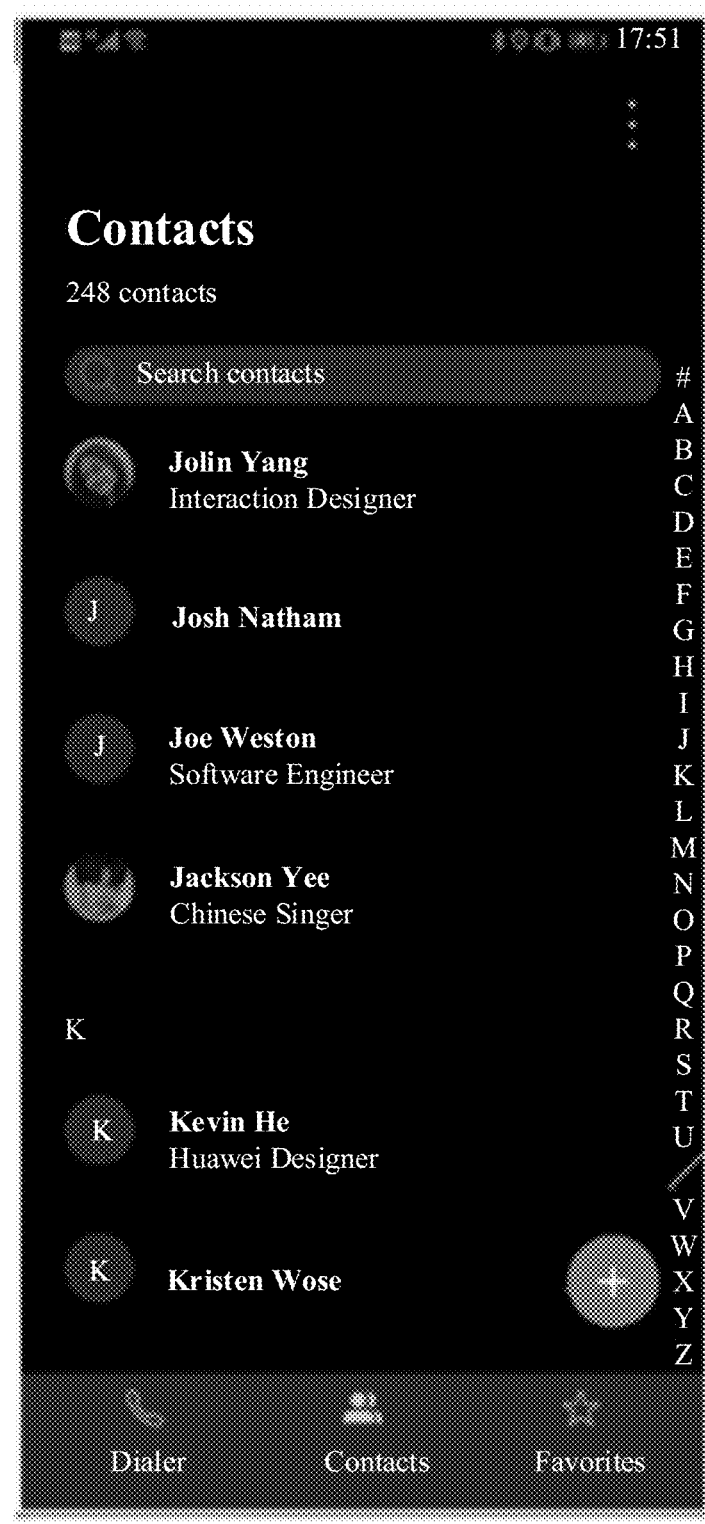

FIG. 10A and FIG. 10B are a schematic diagram of a color processing effect of a bright-color foreground according to this application. A display interface shown in FIG. 10A includes a plurality of bright-color foregrounds, for example, a contacts icon 212, a bright-color circular background 210 on which an icon 209 ("+") is located, a bright-color text 213 ("K"), a bright-color graphic 215 on which a text 214 ("J") is located that are marked in FIG. 10A. These bright-color foregrounds have different black contrast, and therefore are processed in different manners. As shown in FIG. 10A, if black contrast of the text 213 ("K") falls within the foregoing preset range, it is preferred to keep original contrast and an original color, without a need to perform additional processing on the text 213 ("K"). Because the black contrast falls within an appropriate range, in a dark mode scenario shown in a right-side figure in FIG. 10B, the text 213 ("K") still has appropriate contrast, so that the text 213 ("K") neither irritates the eyes nor affects watching and reading by the user. However, darkening processing is performed on both the circular background 210 and the bright-color graphic 215 to different degrees. In addition, black contrast of the contacts icon 212 in FIG. 10A is relatively low. Therefore, contrast enhancement processing is performed on the contacts icon 212, that is, the contrast of the contacts icon 212 is enhanced from original 5.6:1 to 7.45:1, so that the contacts icon 212 can still be easily recognized in a dark background, for ease of watching and reading by the user.

In conclusion, if the target processing manner of any one of the plurality of elements is foreground color processing, and an element color of the element is a bright color, black contrast of the element color is obtained; and if the black contrast is less than a preset second contrast threshold, the black contrast of the element color is enhanced to obtain a rendering parameter; if the black contrast is greater than a preset third contrast threshold, brightness of the element color is reduced to obtain a rendering parameter; or if the black contrast falls between the second contrast threshold and the third contrast threshold, a color value of the element is obtained as a rendering parameter, where the third contrast threshold is greater than the second contrast threshold.

Further, when the brightness of the element color is reduced, if the black contrast is greater than a preset fourth contrast threshold, the brightness of the element color is reduced based on preset amplitude; or if the black contrast falls between the third contrast threshold and the fourth contrast threshold, the brightness of the element color is adjusted to a preset range, where the fourth contrast threshold is greater than the third contrast threshold.

For example, in the embodiment shown in Table 4, the second contrast threshold is 8.9:1, the third contrast threshold is 15.7:1, and the fourth contrast threshold is 19:1; and the preset amplitude is 9, and the preset range is a dark level before 15.7:1.

In addition, a text, a graphic, an image, or the like may alternatively relate to a gradient color design. Therefore, this application further provides a processing manner of a gradient color.

As shown in Table 4, the gradient color relates to a white transparency gradient and a black transparency gradient. In this case, according to the manner described in Table 2, directly, a transparent processing manner is performed on a white mask, and a rendering parameter is kept unchanged for a black transparent mask or a shadow. Subsequent background color processing, backboard processing, or the like may also relate to a shadow or a white mask. Details are not described.

In addition, the gradient color may be related to a gradient of at least one color. It may be understood that, in a design of a page element, usually, an endpoint color is set, and the element is gradually changed between at least one endpoint color according to a preset (default or user-selected) gradient rule. A line is used as an example. When a gradient of the line is designed, usually, only endpoint colors of two ends of the line are designed, and then gradient processing is performed according to a preset gradient rule. Based on this, it is preferred to process endpoint colors of a gradient foreground according to the foregoing rule of the gray-tone foreground or the bright-color foreground, to obtain dark mode colors respectively corresponding to the gradient color endpoint colors, and then gradient processing and rendering are performed on the gradient foreground according to the preset gradient rule.

In one embodiment, if a foreground element is displayed in a transparency gradient of one color, in this scenario, it is preferred to process the color in the foregoing manner to obtain a dark mode color corresponding to the color, and perform a transparency gradient on the dark mode color according to a preset gradient rule of the color. In one embodiment, a foreground element is displayed in a gradient of at least two colors. Therefore, it is preferred to separately process the two colors and then perform gradient processing. Details are not described.

In conclusion, if the target processing manner of any one of the plurality of elements is foreground color processing, and a color of the element is a gradient color of at least one color, an endpoint color of the element is processed in the foreground color processing manner, to obtain a rendering parameter of the element; or if the element includes a plurality of colors, the element is used as a foreground picture for processing.

(2) Background Color Processing

As shown in Table 2 or Table 3, the background color processing is mainly for some images or graphics with relatively large sizes. In addition, colors of these elements are relatively single. Therefore, only dark mode processing needs to be performed on the colors of these background elements.

Table 5 shows a processing manner for a background element in this application.

TABLE 5

| | Attribute information of an element | | Specific processing manner |
|---|---|---|---|
| Background color | High-chrominance background | C0 is greater than 30, and black contrast is greater than 5:1 | Reduce the contrast, for example, reduce the contrast to 5:1 |
| | | C0 is greater than 30, and black contrast falls between 2.2:1 and 5:1 (including the endpoints) | Keep a rendering parameter unchanged |
| | | C0 is greater than 30, and black contrast is less than 2.2:1 | Enhance the contrast, for example, adjust the contrast to 2.2:1 |
| | Low-chrominance background | C0 is less than or equal to 30, and black contrast is greater than 9:1 | Perform darkening, for example, L1 = 0.7 * (L0 − 70) |
| | | C0 is less than or equal to 30, and black contrast is less than or greater than 9:1 | Map the contrast to a specified interval, for example, map the contrast to an interval between 2.2:1 to 5:1 |
| | Gradient background | Gradient of at least one color | Separately process colors of two ends of the gradient according to a monochromatic rule, and then perform a gradient |

As shown in Table 5, in this application, classification processing is performed on different backgrounds based on chrominance of the background elements. C0 is a chrominance value of the element in the normal mode.

First, a background element whose C0 value is greater than 30 is used as a high-chrominance background for processing. The C0 value may be alternatively represented as a square root of a sum of squares of an a value and a b value in the Lab color space. For the high-chrominance background, an objective is to enable, through processing on a basis of keeping color consistency, the background to have contrast suitable for viewing.

As shown in Table 5, based on color composition of an element, if the element is in a bright color and black contrast of the element is greater than 5:1 (or white contrast of the element is less than 2.3:1), it indicates that the high-chrominance background is slightly bright. In this case, the contrast of the high-chrominance background can be reduced, so that the background is not brighter than a foreground to some degree, for ease of watching and use by the user. For example, in this case, the black contrast of the high-chrominance bright-color background may be reduced to 5:1, or may be reduced to fall between 2.2:1 and 5:1. In addition, if contrast of the high-chrominance background falls between 2.2:1 and 5:1 (including the endpoints), it indicates that the high-chrominance bright-color background is neither excessively brighter than a black background nor unrecognizable due to excessive darkness, and the black contrast is suitable, for ease of recognition by the user. Therefore, a rendering parameter is kept unchanged. On the contrary, if black contrast of the high-chrominance bright-color background is less than 2.2:1, there is no clear distinguishing between the high-chrominance bright-color background and black, and consequently viewing by the user may be affected. Therefore, the contrast needs to be appropriately enhanced, for example, enhanced to 2.2:1 or to fall between 2.2:1 and 5:1.

Figure 11:
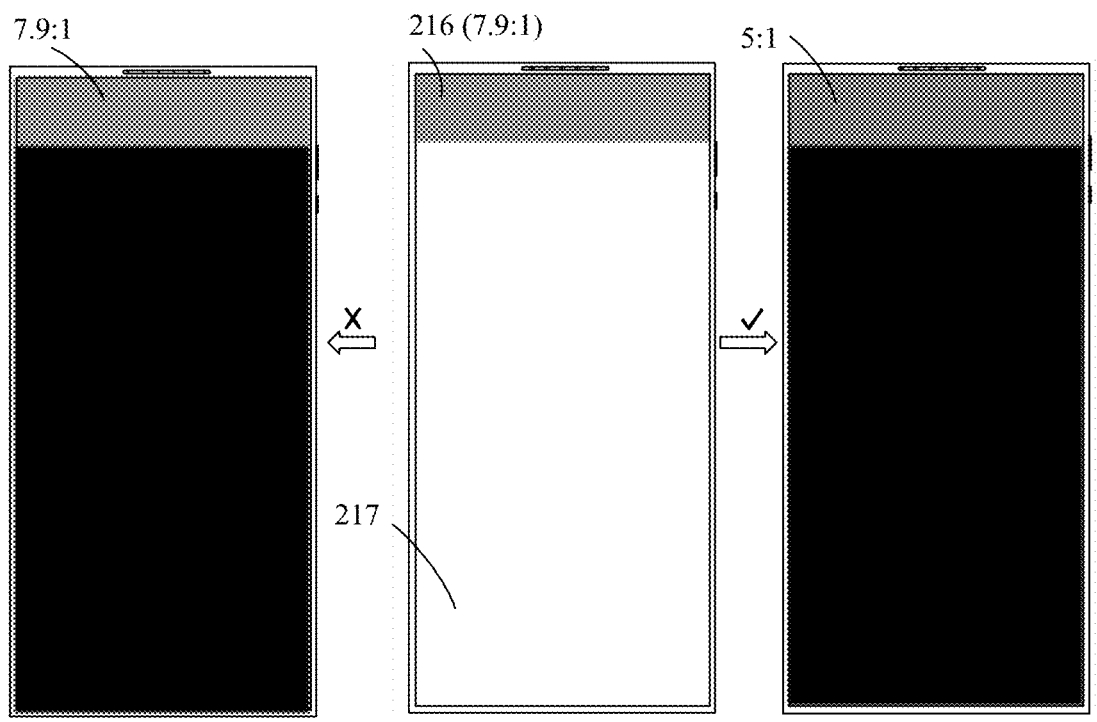
FIG. 11 is another schematic diagram of mode switching of an electronic device according to this application.

FIG. 11 is a background diagram of a display interface of an APP, including a high-chrominance background 216 and a white background (or a white backboard) 217. The high-chrominance background 216 may be a label bar background and may be used to display label bar content, and the white background 217 may be used to display content provided by the APP. It may be understood that the label bar background may be a picture in a single bright color, or may be a graphic in a single bright color, for example, a rectangle or a relatively high line. This is not limited in this application. In addition, herein mainly relates to processing of the background elements. Therefore, the content displayed on the display interface of the APP is omitted in FIG. 11. The omitted content may include at least one of a text, a graphic, and an image.

As shown in FIG. 11, in the normal mode, the label bar background is a high-chrominance background 216, and black contrast of the label bar background is 7.9:1 and is greater than 5:1. During dark mode switching, if complementarity is performed on only the white background, and the label bar background is not processed, the black contrast of the label bar background is still 7.9:1, as shown in a left-side figure in FIG. 11. In this case, a label bar color is brighter than black. This is likely to distract the user, resulting in a decrease in reading efficiency of the user. Therefore, when chrominance of a background element is relatively high, black contrast of the background element may be reduced. As shown in FIG. 11, the black contrast of the high-chrominance background 216 may be reduced to 5:1 (or even less). In this way, the background element is soft in the dark mode, and neither irritates the eyeballs of the user nor excessively distracts the user.

In addition, it should be noted that, 2.2:1 to 5:1 are a black contrast range in which the user feels relatively comfortable and that is obtained based on a human factor experiment, but the values are not used to limit this application. In an actual scenario, it is preferred to preset or customize a comfortable contrast range [I, J] in which a rendering parameter is kept unchanged. It may be understood that if black contrast of a high-chrominance bright-color background is less than I, the contrast is enhanced to I or any value in [I, and J]; or if black contrast of a high-chrominance bright-color background is greater than J, the contrast is reduced to J or any value in [I, and J].

In conclusion, if the target processing manner of any one of the plurality of elements is background color processing, and chrominance carried in color information of the element is greater than a preset first chrominance threshold, black contrast of a color of the element is obtained; and if the black contrast is greater than a preset fifth contrast threshold, the black contrast of the color of the element is reduced to obtain a rendering parameter; if the black contrast is less than a preset sixth contrast threshold, the black contrast of the color of the element is enhanced to obtain a rendering parameter; or if the black contrast falls between the fifth contrast threshold and the sixth contrast threshold, a color value of the element is obtained as a rendering parameter, where the fifth contrast threshold is greater than the sixth contrast threshold.

For example, in the embodiment shown in Table 5, the first chrominance threshold is 30; and the fifth contrast threshold is 5:1, and the sixth contrast threshold is 2.2:1.

Second, a background element whose C0 value (or an expression of a and b in the Lab color space) is less than or equal to 30 is used as a low-chrominance background for processing.

In an actual scenario, the low-chrominance background is usually used to represent a layer relationship. Therefore, when dark mode processing is performed on the low-chrominance background, a brightness (or lightness) relationship between a plurality of low-chrominance backgrounds needs to be noted. Based on this, classification processing may be performed on the low-chrominance backgrounds based on a black contrast difference. For a low-chrominance background whose black contrast is greater than 9:1, darkening processing may be performed on the low-chrominance background, so that the low-chrominance background can meet, in most cases, a requirement that background brightness is less than foreground brightness. This is also more convenient for reading by the user. A darkening manner is not specially limited. The darkening may be performed in the manner shown in Table 5, or the darkening may be performed in a color level manner or the like. In addition, for a low-chrominance background whose black contrast is less than or equal to 9:1, the low-chrominance background may be mapped to a specified range, so that the low-chrominance background is distinguished from a black background (whose black contrast is not 0) and the black contrast falls within a preset comfortable contrast range. For example, black contrast in a range of 0 to 9:1 may be mapped to a specified range of 2.2:1 to 5:1. During one embodiment of this mapping, a mapping relationship may be constructed by using mapping between two specified points, or dark levels may be searched for a dark level closest to K=0.44K0+5. K0 represents black contrast in the normal mode, and K represents black contrast in the dark mode. It may be understood that if K is greater than K0, a minimum color level may be obtained from color levels greater than K as a target color level; or if K is less than K0, a maximum color level may be obtained from color levels less than K as a target color level of the low-chrominance background.

Figure 12:
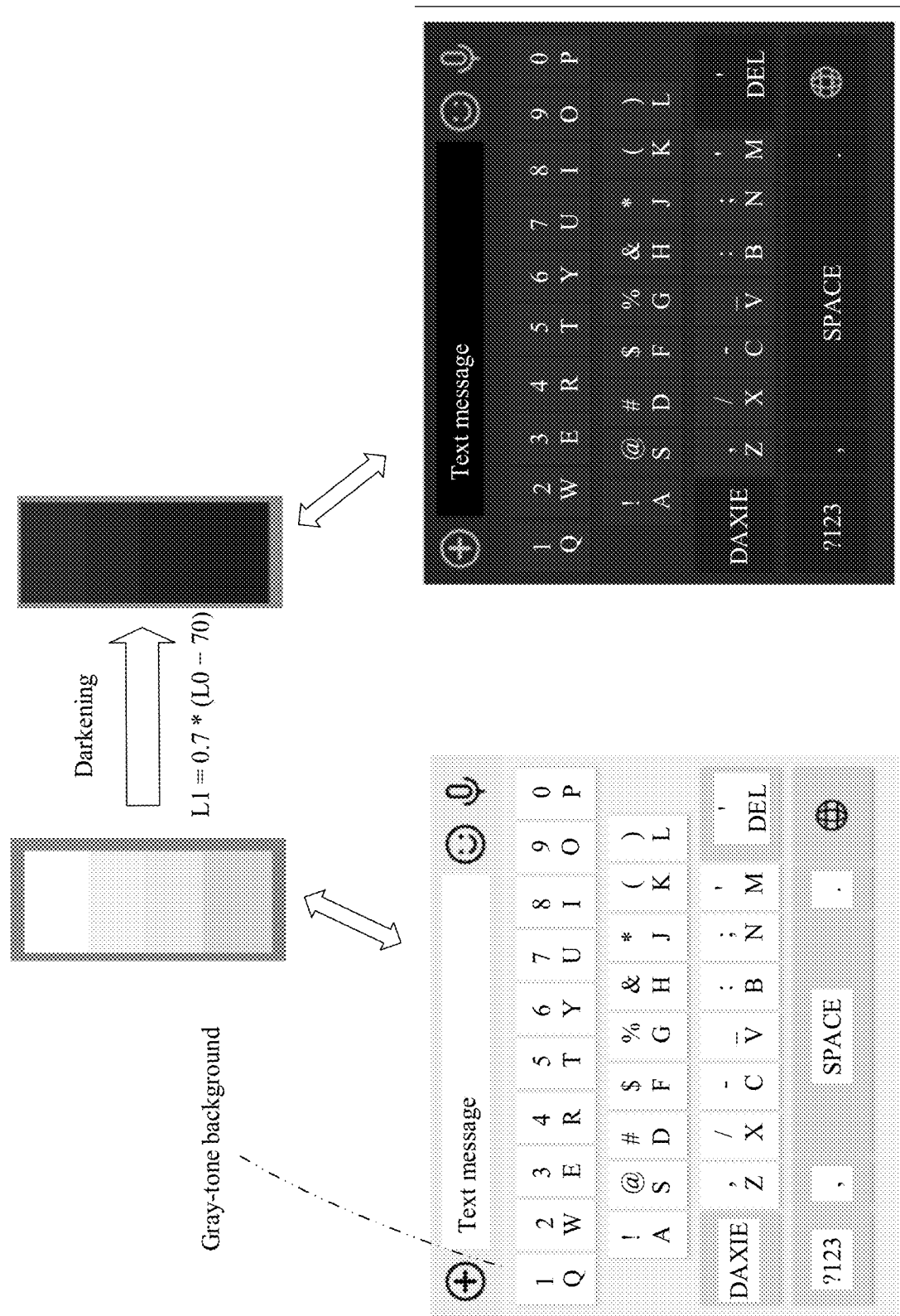
FIG. 12 is another schematic diagram of mode switching of an electronic device according to this application.

In one embodiment, FIG. 12 is a schematic diagram of an input method. The input method relates to backgrounds in four colors. Saturation (C0≤30) of these background colors is relatively low, and the backgrounds are low-chrominance backgrounds. Different from the gray-tone foreground, the low-chrominance background is used to set off a foreground. Therefore, it is preferred to darken the low-chrominance background to meet a low-brightness display requirement of the dark mode, without a need to perform complementarity on the low-chrominance background. As described above, the darkening processing may be performed in the manner shown in Table 5, that is, L=0.7*(L0−70) (parameter values are an example embodiment), may be performed in a manner of mapping to a lower brightness interval, or may be performed in a manner of reducing to a dark level.

In addition, there is another special case. If there is a plurality of low-chrominance backgrounds in one display interface, and white contrast of each low-chrominance background is relatively low, for example, less than 3:1, in this case, these low-chrominance backgrounds may be used to indicate layers. As shown in FIG. 12, each low-chrominance background is used to indicate a different input method identifier. An input keyboard uses a background color, a data box uses another background color, an operation key in the input keyboard uses another background color, and a large background of the input method uses another background color. In this case, during darkening processing, a lightness relationship between the original background colors is kept as far as possible between dark mode colors. That is, during the darkening processing, the plurality of low-chrominance backgrounds are darkened to a same degree. In one embodiment, in FIG. 11, darkening processing is performed in the manner that is L1=0.7*(L0−70), so that a brightness relationship between each background color and a processed dark mode color is kept. In this way, when the user switches the electronic device to the dark mode, it is more convenient for recognition and use by the user.

Figure 13A:
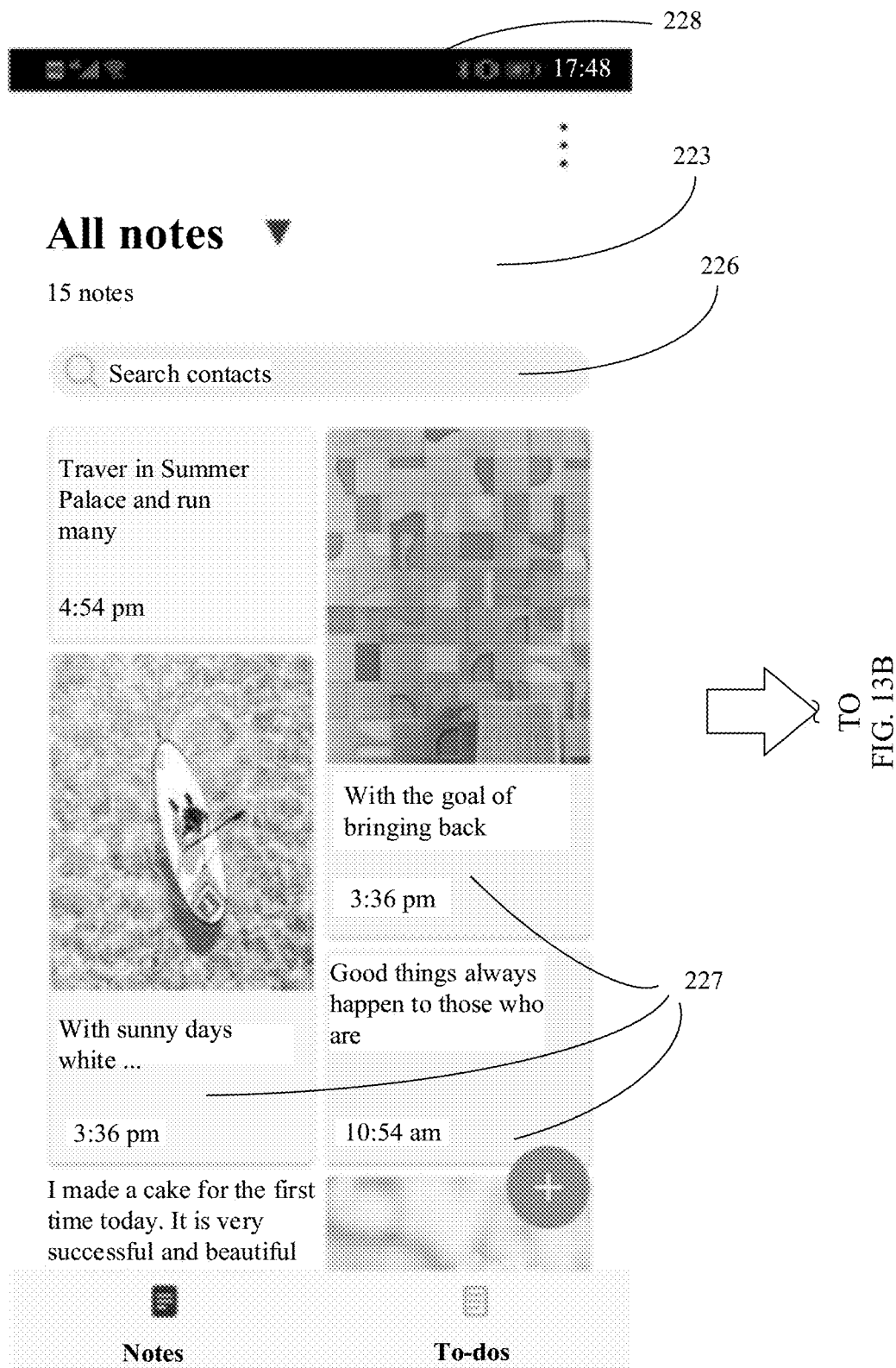
FIG. 13A and FIG. 13B are another schematic diagram of mode switching of an electronic device according to this application.
Figure 13B:
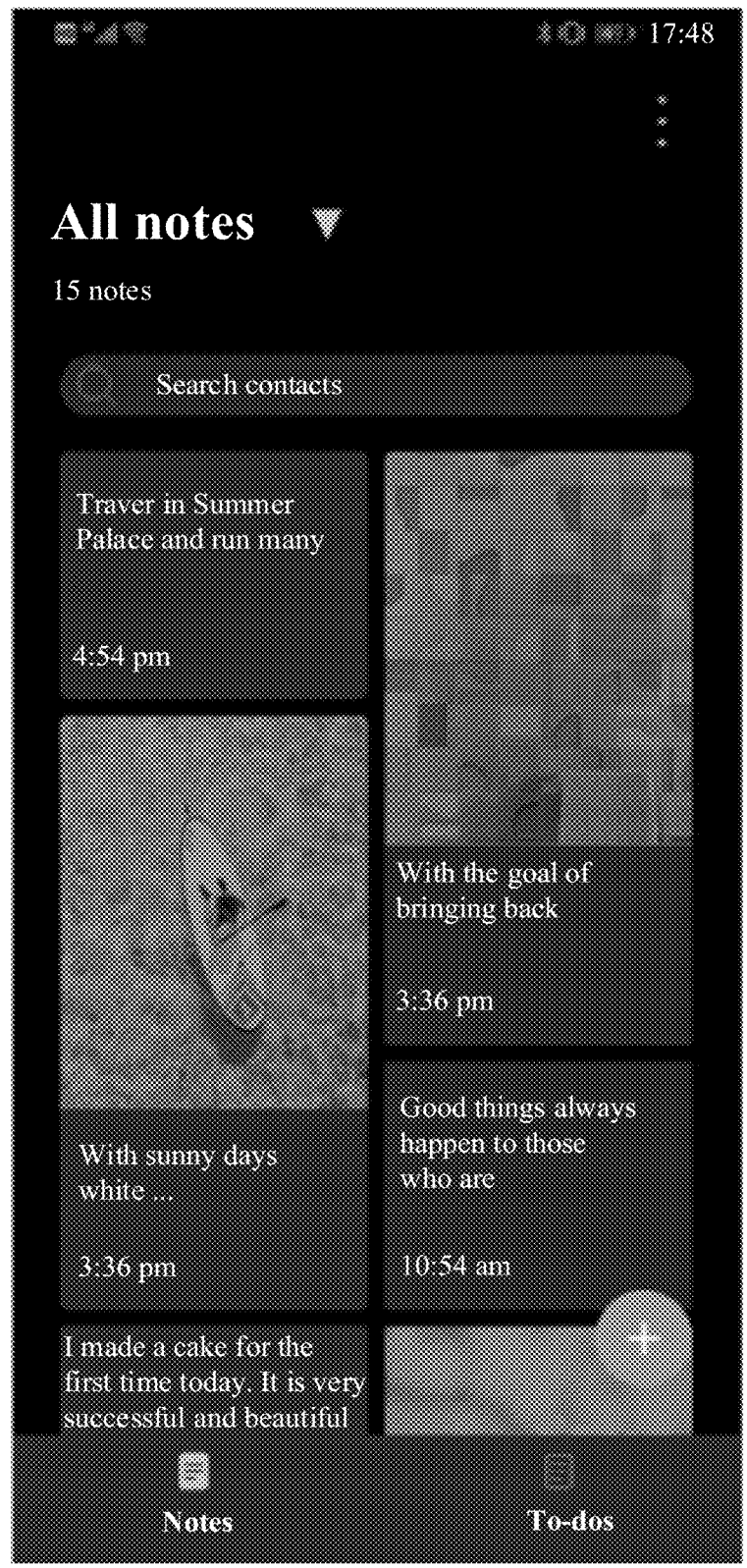

FIG. 13A and FIG. 13B are further a schematic diagram of a low-chrominance background other than an input method. As shown in FIG. 13A, a white backboard 223 displays various texts, graphics, and images. In FIG. 13A, a C0 value of an input box background 226 is relatively low, and the input box background 226 may be used as the foregoing low-chrominance background for color processing. An input box background 226 that is output after being rendered in real time after processing is shown on a right side in FIG. 13B. In the dark mode, there is relatively clear contrast between the input box background 226 and the backboard 223, so that the input box background 226 and the backboard 223 can be clearly distinguished from each other, and the input box background 226 can also be clearly distinguished from a text displayed in the input box in terms of brightness, for ease of use by the user. In addition, FIG. 13A further shows another low-chrominance background, that is, a background 227 of displayed content. There is a small lightness difference between colors of the displayed content. After the background 227 is processed according to the foregoing low-chrominance background processing manner, the background 227 of the content can still retain lightness relationships in the dark mode.

In addition, FIG. 13A further shows a special case. A notification bar background 228 shown in FIG. 13A is displayed as a dark background in the normal mode. In this case, when dark mode processing is performed on the display interface, no additional processing needs to be performed on the notification bar background 228 and content displayed on the notification bar background 228.

In conclusion, if the target processing manner of any one of the plurality of elements is background color processing, the following processing manner may be included: if chrominance carried in color information of the element is less than or equal to the preset first chrominance threshold, black contrast of a color of the element is obtained; and if the black contrast is greater than a preset seventh contrast threshold, brightness of the color of the element is reduced to obtain a rendering parameter; or if the black contrast is less than or equal to the seventh contrast threshold, the black contrast of the color of the element is mapped to a specified black contrast interval to obtain a rendering parameter.

For example, in the embodiment shown in Table 5, the seventh contrast threshold is 9:1, and the specified interval is 2.2:1 to 5:1.

For a gradient background other than a white mask or a shadow, it is preferred to separately process endpoint colors of a gradient color to obtain dark mode colors respectively corresponding to the endpoint colors of the gradient color, and then perform gradient processing and rendering on the gradient background according to a preset gradient rule, according to the manner shown in Table 5.

(3) Sub-Backboard Processing

As shown in Table 2 or Table 3, a sub-backboard may include a graphic or an image whose width is greater than 97% of the screen width in terms of size and that extends from the top or the bottom in an opposite direction, and may also be referred to as a "top bar", or a "bottom bar" or a "bottom card".

For a manner of performing dark mode processing on the sub-backboard element, refer to Table 6.

the specified brightness value may be preset to 15 based on a human factor experiment conclusion. This is not specially limited in this application.

For the high-chrominance sub-backboard, if black contrast of the high-chrominance sub-backboard is relatively low, for example, lower than 2.2:1 as shown in Table 6, considering that a large black background or another dark backboard may still exist behind the sub-backboard, the black contrast of the high-chrominance sub-backboard with the relatively low black contrast may be enhanced, so that the sub-backboard can be distinguished from another element (for example, a dark backboard or a black background). In addition, in this case, a contrast enhancement

TABLE 6

| | Attribute information of an element | | Specific processing manner |
|---|---|---|---|
| Sub-backboard | Low-chrominance sub-backboard | C0 is less than 30 | Adjust brightness of the sub-backboard to a specified value, for example, L = 15 |
| | High-chrominance sub-backboard | C0 is greater than or equal to 30, and black contrast is less than 2.2:1 | Enhance the contrast, for example, enhance the contrast to at least 2.2:1 |
| | | C0 is greater than or equal to 30, and L is less than 10 | Enhance the brightness, for example, enhance L to 10 |
| | | C0 is greater than or equal to 30, and black contrast is greater than or equal to 2.2:1, or L is greater than or equal to 10 | Keep a rendering parameter unchanged |
| | Polychromatic sub-backboard | | Consider the sub-backboard as a background picture for processing |
| | | Gradient-color sub-backboard (gradient of at least one color) | Separately process colors of two ends of the gradient according to a monochromatic rule, and then perform a gradient, or perform background picture processing |

As shown in FIG. 5, the sub-backboard is usually an element whose size is relatively large but less than a size of a backboard. Therefore, when dark mode processing is performed on the sub-backboard element, comparison display statuses of the sub-backboard with a foreground and a backboard need to be noted. In this application, sub-backboard elements are classified into a high-chrominance sub-backboard and a low-chrominance sub-backboard based on plurality of the sub-backboard elements, for separate processing. There is a higher requirement for the backboard element. Backboard elements are classified into a gray-tone backboard and a bright-color backboard based on chrominance of the backboard elements, for separate processing. This is subsequently described in detail. This can ensure distinguishing and recognition between the sub-backboard and the backboard to a degree.

As shown in Table 6, based on comparison between a C0 value and a preset threshold, a sub-backboard whose C0 value is less than the preset threshold (represented as 30 in Table 6. This is a possible design, and is not used to limit this application) is considered as a low-chrominance sub-backboard, and a sub-backboard whose C0 value is greater than or equal to the preset threshold is considered as a high-chrominance sub-backboard.

In this application, a brightness value of the low-chrominance sub-backboard is adjusted to a specified value, so that the low-chrominance sub-backboard has relatively good black contrast and reading comfort. The specified brightness value may be preset based on a requirement. For example, range of the high-chrominance sub-backboard should not be excessively high, to avoid impact caused by over-brightness of the sub-backboard on content reading by the user. During one embodiment, as shown in Table 6, the black contrast may be enhanced to a specified contrast value, or a specified contrast difference may be added to the original black contrast. In addition, a maximum contrast enhancement value may further be preset, to limit a maximum contrast value of the sub-backboard.

Alternatively, if brightness of the high-chrominance sub-backboard is excessively low, additional processing also needs to be performed on the high-chrominance sub-backboard, so that the brightness of the high-chrominance sub-backboard is kept within an appropriate brightness range in which the high-chrominance sub-backboard is conveniently distinguished from another element. As shown in Table 6, brightness of the sub-backboard whose brightness is less than 10 may be adjusted to 10.

In addition to the foregoing two cases, for another high-chrominance sub-backboard, it is preferred to retain an original color for rendering, without additional processing.

In conclusion, if the target processing manner of any one of the plurality of elements is sub-backboard processing: if chrominance carried in color information of the element is less than a preset second chrominance threshold, brightness of a color of the element is adjusted to a specified brightness interval to obtain a rendering parameter. On the contrary, if chrominance carried in color information of the element is greater than or equal to the preset second chrominance threshold, the following processing manner may be included: if black contrast of a color of the element is less than a preset eighth contrast threshold, enhancing the black contrast of the color of the element to obtain a rendering parameter; if a brightness value of the element is less than a preset first brightness threshold, enhancing brightness of a color of the element to obtain a rendering parameter; or if black contrast of a color of the element is greater than or equal to the eighth contrast threshold, and a brightness value is greater than or equal to the first brightness threshold, obtaining a color value of the element as a rendering parameter.

For example, in one embodiment shown in Table 6, the second chrominance threshold is 30, the eighth contrast threshold is 2.2:1, and the first brightness threshold is 10.

In addition, an actual scenario may further relate to a polychromatic sub-backboard. In this application, the polychromatic sub-backboard is considered as a background picture for processing, and an embodiment is described subsequently.

In addition, there is a special case: a gradient-color sub-backboard other than a white mask or a shadow. This application provides two processing manners for the gradient-color sub-backboard. In one manner, it is preferred to separately process endpoint colors of a gradient-color to obtain dark mode colors respectively corresponding to the endpoint colors of the gradient color, and then perform gradient processing and rendering on the gradient-color sub-backboard according to a preset gradient rule, according to the manner shown in Table 6. In the other manner, the gradient-color sub-backboard is considered as a background picture for processing in a polychromatic backboard processing manner.

(4) Backboard Processing

As shown in Table 2 or Table 3, a backboard may include a picture or a graphic with a relatively large size. When dark mode processing is performed on the backboard element, the processing is still performed based on a tone of the backboard. This mainly includes three aspects: a gray-tone backboard, a bright-color backboard, and a polychromatic backboard. Table 7 shows different processing manners of these backboards.

For any element, when it is determined, according to Table 2 or Table 3, that backboard processing needs to be performed on the element, a particular type of the backboard element may further be determined based on the manners shown in Table 7. In one embodiment, as shown in Table 7, it may be determined, based on chrominance of the backboard element and a preset threshold, whether the backboard element is in a gray tone or a bright color, and then a to-be-performed dark mode processing manner is determined.

As described above, C0 may be represented as a square root of a sum of squares of a and b in the Lab color space, where a represents red/green and b represents yellow/blue in the Lab color space.

If a C0 value is less than or equal to 5, the backboard element is a gray-tone element, and may be in any one of black, white, or gray. In this case, during dark mode processing, it is preferred to process the backboard into a dark backboard. The dark backboard may include but is not limited to a black backboard. During processing, different processing may be performed based on brightness of the gray-tone backboard.

In scenarios shown in FIG. 2A and FIG. 2B, FIG. 7A and FIG. 7B, FIG. 10A and FIG. 10B, FIG. 11, and FIG. 13A and FIG. 13B, if a color of a backboard is white, and brightness L0 of the backboard is relatively high and exceeds 85, the backboard is made dark through complementarity, so that the backboard is presented in a relatively dark color. Alternatively, if a color of a backboard is relatively dark, and brightness L0 of the backboard is less than or equal to 15, it is preferred to keep an original rendering parameter unchanged, without a need to perform additional adjustment on the backboard. For example, in FIG. 11, if an APP interface uses, in the normal mode, a black backboard shown on a left side in FIG. 11, in this case, after dark mode switching, a background color of the backboard may not be modified, to obtain a black backboard shown on a right side in FIG. 11. Alternatively, if brightness L0 falls between 15 and 85, the brightness of a backboard may be adjusted to a specified value, for example, L1 may be controlled to be equal to 15.

In addition, in addition to the manner shown in Table 7: L1=100−L0, a manner of making the backboard dark through complementarity may further include: a dark-level color corresponding to a color of the backboard may be searched for and determined based on a color level and based on a preset complementarity degree, to be used as a dark mode color. For example, based on the color levels shown in FIG. 8, a leftmost dark-level color is mapped to a rightmost bright-level color, a second leftmost dark-level color is mapped to a second rightmost bright-level color, and so on. In this case, if a color of a bright-color backboard corresponds to a rightmost third bright level, a dark mode color of the bright-color backboard is a third leftmost dark-level color. Therefore, in the dark mode, the bright-color backboard is rendered based on a color value of the third leftmost dark-level color. For another example, in the color levels shown in FIG. 8, a dark-level color separated by a plurality of (for example, nine) color levels from each bright-level color is used as a dark mode color of the bright-level color.

TABLE 7

| | Attribute information of an element | | Specific processing manner |
|---|---|---|---|
| Backboard | Gray-tone backboard | C0 is less than or equal to 5, and L0 is greater than or equal to 85 | Make the backboard dark (black) through complementarity, for example, L1 = 100 − L0 |
| | | C0 is less than or equal to 5, and L0 is greater than 15 and L0 is less than 85 | Adjust the brightness of the sub-backboard to a specified value, for example, L1 = 15 |
| | | C0 is less than or equal to 5, and L0 is less than or equal to 15 | Keep a rendering parameter unchanged |

TABLE 7-continued

| Attribute information of an element | | Specific processing manner |
|---|---|---|
| Low-chrominance backboard | C0 is greater than 5 and C0 is less than 30, and black contrast is greater than 2.2:1 | Reduce the contrast, for example, reduce the contrast to 2.2:1 or less |
| | C0 is greater than 5 and C0 is less than 30, and black contrast is 0 to 2.2:1 | Keep a rendering parameter unchanged |
| High-chrominance backboard | C0 is greater than 30, and black contrast is less than 2.2:1 | Enhance the contrast, for example, enhance the contrast to at least 2.2:1 |
| | C0 is greater than 30, and black contrast falls between 2.2:1 and 5:1 | Keep a rendering parameter unchanged |
| | C0 is greater than 30, and black contrast is greater than 5:1 | Reduce the contrast, for example, reduce the contrast to 5:1 or less |
| Polychromatic backboard | | Consider the backboard as a background picture for processing |
| | Gradient backboard (gradient of at least one color) | Separately process colors of two ends of the gradient according to a monochromatic rule, and then perform a gradient or perform background picture processing |

In addition, if it is determined, based on a C0 value (or an a value and a b value) and a preset threshold (represented as 5 in Table 7), that the backboard element is a bright-color backboard: in this application, bright-color backboards are further classified into a low-chrominance backboard and a high-chrominance backboard, and as shown in Table 7, a chrominance value C0 of the low-chrominance backboard is less than chrominance of the high-chrominance backboard, and is greater than chrominance of the gray-tone backboard. Based on this, during processing, black contrast of the low-chrominance backboard may be made relatively low, and black contrast of the high-chrominance backboard may be made slightly higher. As shown in Table 7, the black contrast of the low-chrominance backboard is controlled to be 2.2:1 or less, and the black contrast of the high-chrominance backboard is adjusted to fall between 2.2:1 and 5:1. In this way, when the user uses the electronic device in relatively dark light, the bright-color backboard does not excessively irate the eyeballs of the user. This conforms to a human factor experiment conclusion, for ease of viewing and recognition by the user.

In conclusion, if the target processing manner of any one of the plurality of elements is backboard processing, the following processing manner may be included: if chrominance carried in color information of the element is less than or equal to a preset third chrominance threshold, adjusting brightness of the element to be less than or equal to a second brightness threshold; if chrominance carried in color information of the element is greater than or equal to a preset fourth chrominance threshold, adjusting black contrast of the element to a first contrast interval; or if chrominance carried in color information of the element falls between the third chrominance threshold and the fourth chrominance threshold, adjusting black contrast of the element to a second contrast interval, where the fourth chrominance threshold is greater than the third chrominance threshold, and a value of the first contrast interval is greater than a value of the second contrast interval.

For example, in one embodiment shown in Table 7, the third chrominance threshold is 5, and the fourth chrominance threshold is 30; and the second brightness threshold is 15, the first contrast interval is 2.2:1 to 5:1, and the second contrast interval is 0 to 2.2:1.

In addition to the gray-tone backboard and the bright-color backboard, an actual scenario may further relate to a polychromatic backboard. In this application, the polychromatic backboard is considered as a background picture for processing, and an embodiment is described subsequently.

In addition, there is a special case: a gradient backboard other than a white mask or a shadow. This application provides two processing manners for the gradient backboard. In one manner, it is preferred to separately process endpoint colors of a gradient color to obtain dark mode colors respectively corresponding to the endpoint colors of the gradient color, and then perform gradient processing and rendering on the gradient backboard according to a preset gradient rule, according to the manner shown in Table 7. In the other manner, the gradient backboard is considered as a background picture for processing in a polychromatic backboard processing manner.

In addition, if the target processing manner of any one of the plurality of elements is background color processing, backboard processing, or sub-backboard processing, the following processing manner may be included: if the element includes a plurality of colors, using the element as a background picture for processing; or if a color of the element is a gradient color of at least one color, processing an endpoint color of the element in the target processing manner, to obtain a rendering parameter of the element.

(5) Foreground Picture Processing and Background Picture Processing

In this application, a processing manner of a foreground picture is similar to a processing manner of a background picture. Therefore, manners of performing dark mode processing on the pictures are described herein together.

When darkening processing is performed on a picture, an objective of the dark mode processing is to make brightness and black contrast of the picture appropriate, so that the picture neither irritates the eyes due to excessive brightness nor is difficult to recognize due to excessive darkness. Therefore, a brightness interval may be preset for the picture, and different segment functions are separately designed for different brightness intervals. Therefore, for any picture, provided that brightness of the picture falls within a particular brightness interval, a segment function (considered as a target function) corresponding to the brightness interval is used to process the picture, to obtain a dark mode rendering parameter of the picture.

Figure 14:
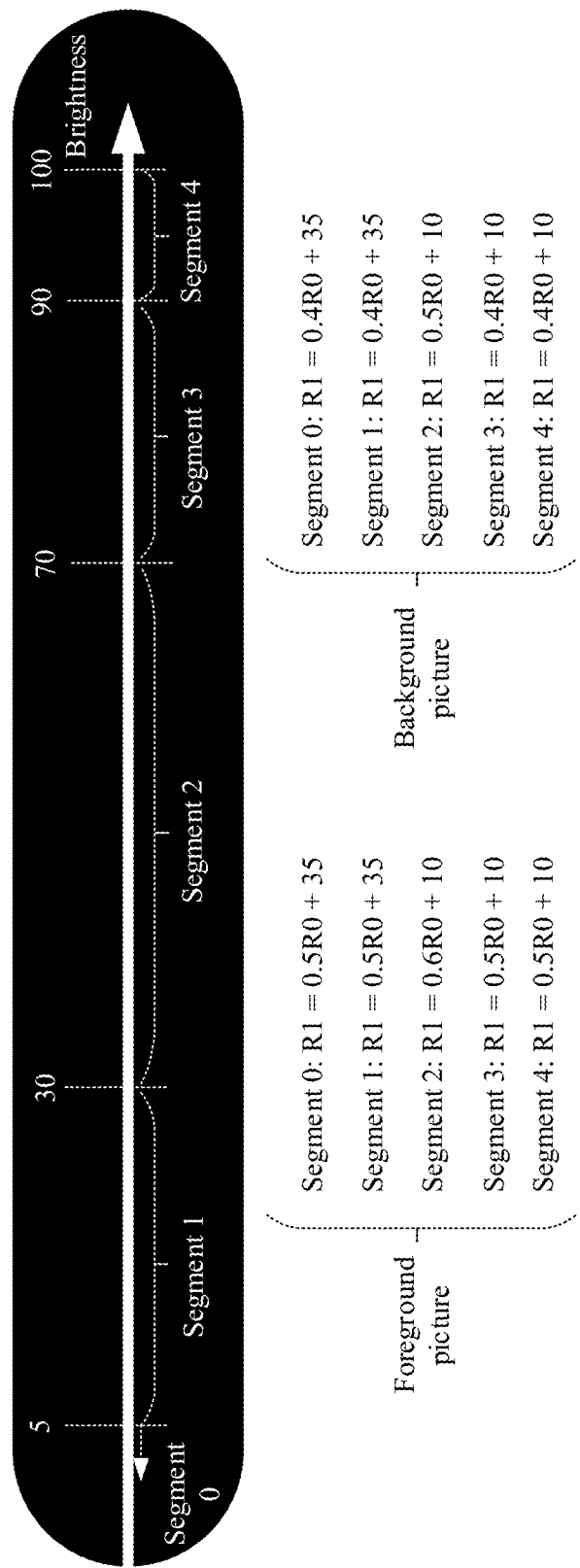
FIG. 14 is a schematic diagram of another element processing manner according to this application.

For example, FIG. 14 shows this case. As shown in FIG. 14, five segments may be preset: a segment 0 to a segment 4, each segment corresponds to one unique brightness interval, and a corresponding segment function is set for each segment. For any segment function, R0 represents an R value (an R value in the RGB color space) of a color in a picture, and R1 represents an R value of a dark mode color corresponding to the color in the picture. For ease of understanding, FIG. 14 shows only segment functions of an R value. In one embodiment, segment functions of a G value, a B value, and an A value (transparency, Alpha) in the RGB color space further needs to be preset. In addition, same segments (for example, segments 0) of pictures of a same type (for example, foreground pictures) may have same segment functions or different segment functions in terms of any two color values in an R value, a G value, a B value, and an A value. This is not specially limited in this application.

In this application, a quantity of brightness interval segments, a range of each brightness interval, an expression of a segment function, and the like may be customized based on an actual scenario. This is not specially limited in this application, and a scenario shown in FIG. 14 is only a possible design. For example, brightness intervals preset in the foreground picture may be the same as or different from brightness intervals in the background picture. FIG. 14 shows an embodiment in which same brightness intervals are used for the foreground picture and the background picture.

However, when same brightness intervals are used for the foreground picture and the background picture, a segment function of the foreground picture and a segment function of the background picture may be designed to be different from each other based on different display requirements of the foreground picture and the background picture. In one embodiment, the foreground picture is an element about which the user may be relatively concerned, and the foreground picture is smaller than the background picture. If display brightness of the foreground picture is excessively dark in the dark mode, viewing and recognition by the user are affected. Therefore, the foreground picture may be processed to be slightly bright in the dark mode. The background picture has a relatively large size, and is mainly used to set off content displayed on the background picture. Therefore, the background picture may be processed to be relatively dark. As shown in FIG. 14, for any segment, a coefficient of R0 in a segment function of the foreground picture is higher than a coefficient of R0 in a segment function of the background picture.

In addition, in the embodiment shown in FIG. 14, processing manners of the foreground picture and the background picture in the five segments meet a relationship that $R1=p*R0+q$, where a value of p is not greater than 1. This is equivalent to a combined processing manner in which an original picture is darkened and then lightened. In one embodiment, whether the foreground picture is darkened or lightened is directly related to brightness of the picture.

Figure 15A:
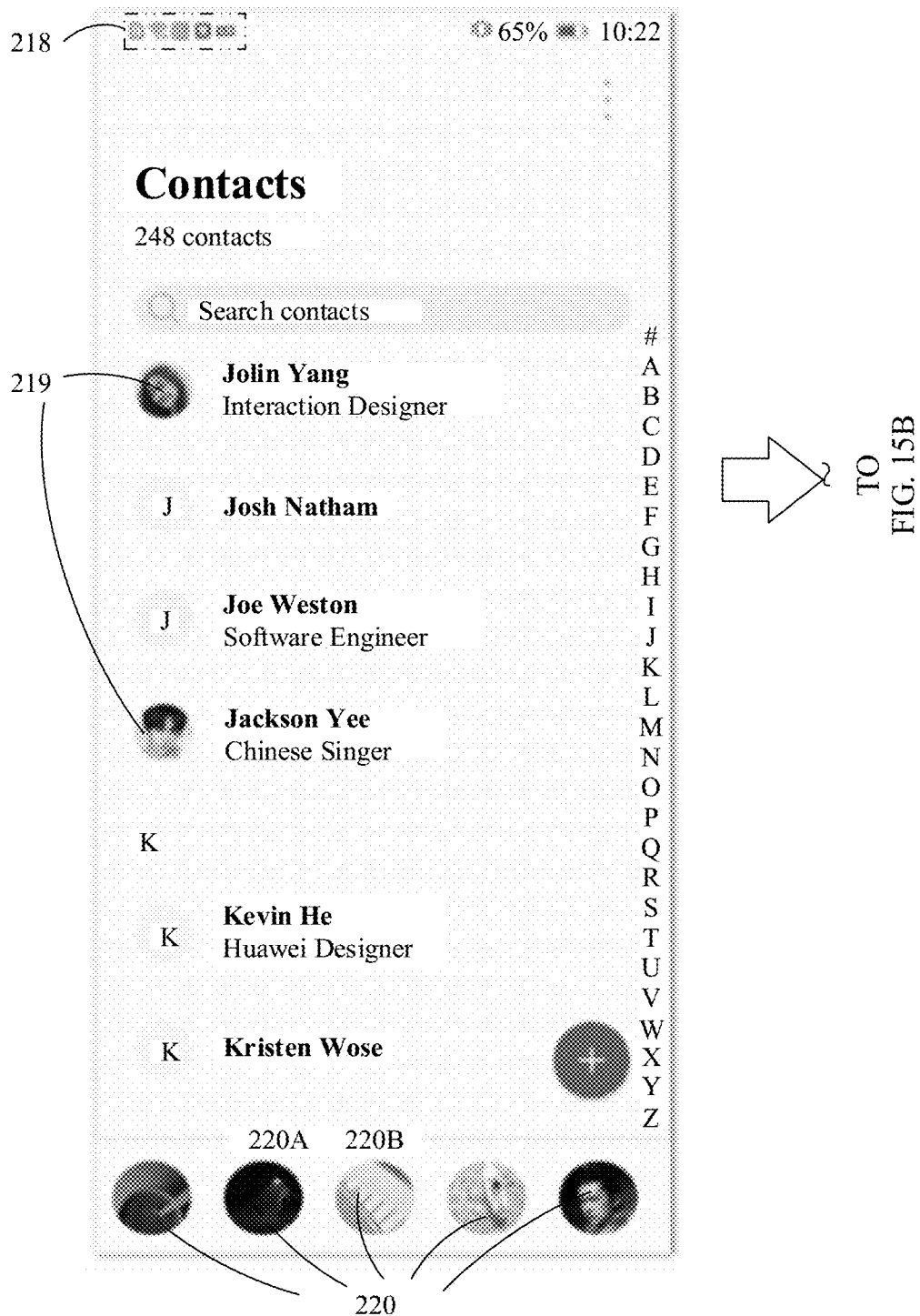
FIG. 15A and FIG. 15B are another schematic diagram of mode switching of an electronic device according to this application.
Figure 15B:

A foreground picture shown in FIG. 15A is used as an example. FIG. 15A and FIG. 15B are a schematic display interface diagram in which an electronic device is switched from a normal mode to a dark mode. FIG. 15A includes a plurality of foreground pictures, including a notification bar icon 218 (one or more, without a quantity limitation), contact portraits 219, and icons 220. An icon 220A is an overall relatively dark foreground picture in the normal mode. When the electronic device is switched to the dark mode, the icon 220A needs to be processed in the manner shown in FIG. 14. If brightness of the icon 220A is relatively low and falls within the segment 0, the foreground picture is processed by using a segment function corresponding to the segment 0. This is equivalent to performing brightening processing on the foreground picture, and brightness of a processed icon 220A is enhanced. After switching to the dark mode, the icon 220A can also be relatively clearly displayed on a black background, for ease of viewing and recognition by the user.

An icon 220B in FIG. 15A is an overall relatively bright foreground picture in the normal mode. When the electronic device is switched to the dark mode, the icon 220B needs to be processed in the manner shown in FIG. 14. If brightness of the icon 220B is relatively low and falls with the segment 4, the foreground picture is processed by using a segment function corresponding to the segment 4. This is equivalent to darkening the foreground picture. After the electronic device is switched to the dark mode, the icon 220B can be relatively clearly displayed on the black background and does not excessively irritate the eyes, for ease of viewing and recognition by the user.

The foregoing manner is also used for other foreground pictures (other icons 220, the contact portraits 219, and the notification bar icon 218) in FIG. 15A, that is, a brightness interval within which brightness of the foreground picture falls is first determined based on the brightness of the foreground picture, a color value of the foreground picture is processed according to a segment function corresponding to the brightness interval, to obtain a dark mode rendering parameter corresponding to the foreground picture, and then the foreground picture is rendered based on the dark mode rendering parameter.

In one embodiment, when a picture is processed according to a determined target function to obtain a dark mode rendering parameter, a color value of each color or each pixel in the picture may be processed according to the target function to obtain a dark mode rendering parameter corresponding to each color or each pixel. In one embodiment, the target function may be represented as a transformation matrix. Provided that an RGBA matrix of the picture is multiplied by the transformation matrix, a dark mod RGBA value of the picture can be obtained, that is, the dark mode rendering parameter can be obtained.

For example, a segment function $R1=0.5R0+35$ corresponding to a segment 0 of a foreground image is a target function, where the segment function is used for all of R, G, B, and A. In this case, the target function of the foreground image may be represented as the following transformation matrix:

$$\begin{bmatrix} 0.5 & 0 & 0 & 0 & 35 \\ 0 & 0.5 & 0 & 0 & 35 \\ 0 & 0 & 0.5 & 0 & 35 \\ 0 & 0 & 0 & 0.5 & 35 \end{bmatrix}$$

In the transformation matrix, the first column represents an R value, the second column represents a G value, the third column represents a B value, the fourth column represents an A value, and the fifth column represents an increment.

For a picture, the picture includes a plurality of pixels, and usually also includes a plurality of colors. Therefore, in this application, color values of a plurality of sampling points are obtained by performing color sampling on the picture, so that a brightness level of the picture is represented by using the color values of the plurality of sampling points, and a target function corresponding to the picture is determined based on this.

Figure 16:
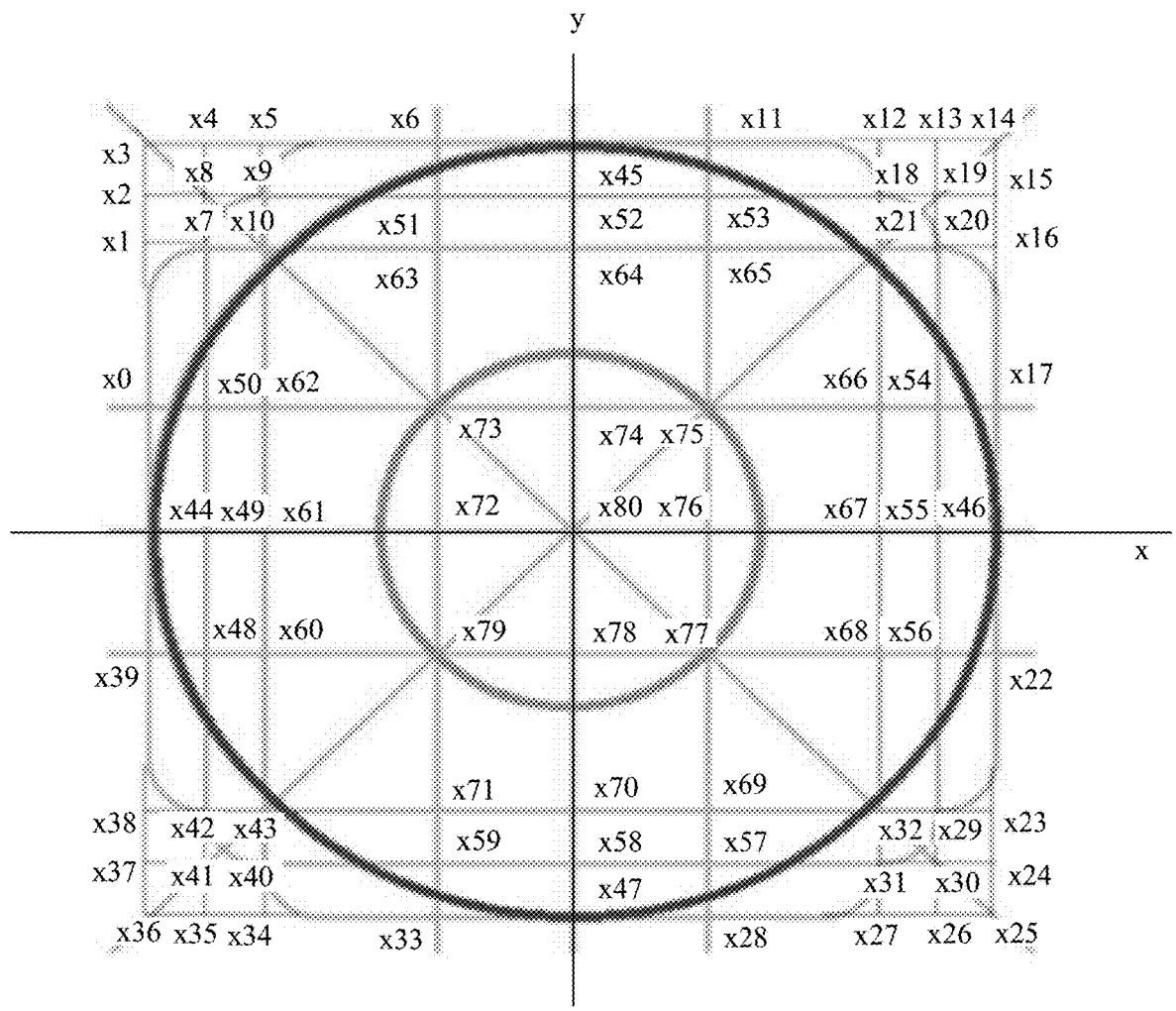
FIG. 16 is a schematic diagram of a sampling mode used in this application.

Sampling may be performed on the picture in a plurality of manners. For example, FIG. 16 shows a sampling structure. In the sampling structure, lines intersect and 81 intersections exist. In this case, all or some of the 81 points may be used to be mapped to a to-be-sampled picture to implement sampling.

In one embodiment, all the 81 sampling points may be used to perform standard sampling on the picture. That is, the sampling structure shown in FIG. 16 is mapped to the to-be-sampled picture, sampling points in the picture that respectively correspond to the 81 intersections in the sampling structure are determined, and color values of the 81 sampling points are collected for subsequent application.

In one embodiment, a part of the sampling structure may be extracted from the sampling structure shown in FIG. 14. For example, a cross-type sampling structure including a straight line on which x is located and a straight line on which y is located in FIG. 14 is extracted, and cross-sampling is performed on the picture by using the 26 points. A sampling process is the same as the foregoing process. That is, the cross-sampling structure shown in FIG. 14 is mapped to the to-be-sampled picture, sampling points in the picture that respectively correspond to the 26 intersections in the sampling structure are determined, and color values of the 26 sampling points are collected for subsequent application.

It may be understood that there may be another sampling manner in the sampling structure shown in FIG. 16, or even in another sampling structure. This is not specially limited in this application.

In the foregoing manner, after sampling is performed on a picture, a segment function corresponding to the picture may be determined in a manner shown in Table 8.

dark mode processing and rendering are separately performed on the elements.

For any picture in the elements, color value sampling may be performed on the picture in any one of the foregoing sampling manners to obtain color data of a plurality of sampling points. Therefore, brightness L0 of each sampling point can be obtained.

A quantity of sampling points whose L0 is less than 5 (relatively dark sampling points for short) is obtained, and a proportion of the quantity of relatively dark sampling points in a total quantity of sampling points is obtained. In this case, as shown in the table, the following design may be provided:

If the proportion of the quantity of relatively dark sampling points in the total quantity of sampling points is greater than a preset third proportion threshold, it is determined that an overall brightness level of the element is relatively dark. As shown in Table 8, the third proportion threshold is 20%. Therefore, if the proportion of relatively dark sampling points is greater than 20%, it indicates that the picture is overall relatively dark. In this case, it may be directly determined that a target function of the picture is a segment function of a preset lowest brightness segment. Then, provided that color conversion is performed on the picture by using the segment function, to obtain a dark mode rendering parameter, and the picture is rendered based on the dark mode rendering parameter, dark mode processing can be implemented on the picture. For example, in FIG. 14, if the proportion of relatively dark sampling points is greater than 20%, it is preferred to use the segment function of the segment 0 (brightness is less than 5) as a target function of the picture, to perform color conversion on the picture.

Alternatively, if the proportion of relatively dark sampling points is less than or equal to 20%, it indicates that the picture is not overall excessively dark. In this case, a target function is determined based on the color data, and the element is processed by using the target function, to obtain a rendering parameter of the element.

In one embodiment, a relatively bright color and a main color of the element are obtained based on the color data, and the target function is determined based on the relatively

TABLE 8

| | Attribute information of an element | | Specific processing manner |
|---|---|---|---|
| Picture | The picture is overall relatively dark (a proportion of a quantity of points whose L0 < 5 in a total quantity is greater than 20%) | | Segment function corresponding to lowest brightness |
| | The picture is not overall excessively dark (a proportion of a quantity of points whose L0 < 5 in a total quantity is less than or equal to 20%) | | Segment function corresponding to N1 |
| | | A relatively bright color N1 occupies a relatively large region (proportion of N1 > 10%) | |
| | | A relatively bright color N1 occupies a relatively small region (3% < proportion of N1 < 10%), and a main color N2 exists | Segment function corresponding to a weighted color of N1 and N2 |
| | | A relatively bright color N1 occupies a relatively small region (3% < proportion of N1 < 10%), and no main color N2 exists | Segment function corresponding to N1 |

When the user switches the electronic device from the normal mode to the dark mode, first, elements in a current display page of the electronic device may be obtained. Then, bright color and the main color. In this application, the relatively bright color is the first color that is in colors that are of the plurality of sampling points and that are arranged in descending order of color brightness and that meets a condition that a proportion of a quantity of sampling points corresponding to the color in the total quantity of sampling points reaches a preset first proportion threshold. For example, in an embodiment shown in Table 8, the first proportion threshold is 3%. For example, for any picture, brightness L0 of sampling points may be sorted. Then, it is determined, in descending order of the L0, whether a proportion of one of colors with relatively high brightness in the sampling points exceeds 3%. If yes, the color is determined as a relatively bright color N1. If the proportion of the color in the sampling points is less than or equal to 3%, determining is performed on a next color, where brightness L0 of the next color is less than that of the current color. For example, if 50 points are collected from a picture and include 10 colors, 10 color values and brightness values exist. If only one point is in a color 1 with highest L0, and a proportion of the color in the sampling points is 1/50 and is less than 3%, the color is skipped. Determining is performed on a color 2 with second highest L0, and if a total of five points in the sampling points are in the color 2, a proportion of the color 2 in the sampling points is 10% and is greater than 3%, and therefore the color 2 can be determined as a relatively bright color N1.

Based on this, as shown in Table 8, the target function may be determined in the following manner.

In a possible scenario, the relatively bright color N1 occupies a relatively large area in the picture. In one embodiment, the proportion of the relatively bright color N1 is greater than or equal to a preset second proportion threshold. In an embodiment shown in Table 8, the second proportion threshold is 10%. It indicates that brightness of the relatively bright color N1 is a most direct impact factor of the picture. Therefore, a segment function corresponding to the brightness of the relatively bright color N1 may be directly used as the target function.

In another possible scenario, the relatively bright color N1 occupies a relatively large area in the picture, for example, a proportion of N1 is greater than 3% but less than 10% in Table 8 (in an actual scenario, thresholds may be customized). In this case, it needs to be further considered whether the picture has a main color N2.

In this application, the main color is a color that is in the colors of the plurality of sampling points and that meets a condition that a proportion of a quantity of sampling points corresponding to the color in the total quantity of sampling points reaches the preset third proportion threshold, and the third proportion threshold is greater than the first proportion threshold. In one embodiment, the third proportion threshold may be 15%. Then, the main color N2 is a color that occupies a relatively large area in the picture. For example, for any color, if a proportion of the color in the sampling points exceeds 15%, the color can be determined as a main color. It may be understood that, in a picture, if none of color proportions of sampling points exceed a preset proportion, for example, 15%, no main color N2 exists in the picture. In addition, when the main color N2 exists, the relatively bright color N1 may be the same as or different from the main color N2.

If the proportion of the relatively bright color is less than the second proportion threshold, and the main color is empty (it indicates that no main color N2 exists), a segment function corresponding to brightness of the relatively bright color is determined as the target function. As shown in Table 8, if no main color N2 exists in the picture, similar to the previous scenario, the relatively bright color N1 is a direct and main impact factor of a display status of the picture. Therefore, a segment function corresponding to the relatively bright color N1 is still used as the target function.

On the contrary, if the proportion of the relatively bright color is less than the second proportion threshold, and the main color is not empty, that is, the main color N2 exists in the picture, the relatively bright color N2 and the main color N2 need to be comprehensively considered to determine the target function. In one embodiment, the relatively bright color and the main color are processed to obtain a processed color, and a segment function corresponding to the processed color is determined as the target function.

In one embodiment, weighted averaging processing may be performed on a color value of the relatively bright color and a color value of the main color to obtain a color value of the processed color. As shown in Table 8, when a proportion of a relatively bright color N1 falls between 3% and 10% and a main color N2 exists, weighted averaging processing may be performed on color values of the relatively bright color N1 and the main color N2, to obtain a weighted color of N1 and N2, and a segment function corresponding to the weighted color is used as a target function. It may be understood that, when the weighted color of N1 and N2 is obtained, weights of N1 and N2 are related to a main consideration factor. If the main color N2 is mainly considered, a larger weight is designed for N2. For example, N2 and N1 may be weighted at a ratio of 2:1 to obtain the weighted color. If the relatively bright color N1 is mainly considered, a larger weight is designed for N1. Alternatively, a same weight may be designed for N1 and N2. Details are not described.

In addition, it should be noted that, in an image, an A value may further exist, that is, there are one or more pixels (or colors) with a transparency design. In this case, when a brightness distribution status of the picture is calculated, the A value needs to be used to convert color values of these pixels (or colors) into brightness values without transparency on a black/white background color, and then the foregoing processing is performed.

Figure 17:
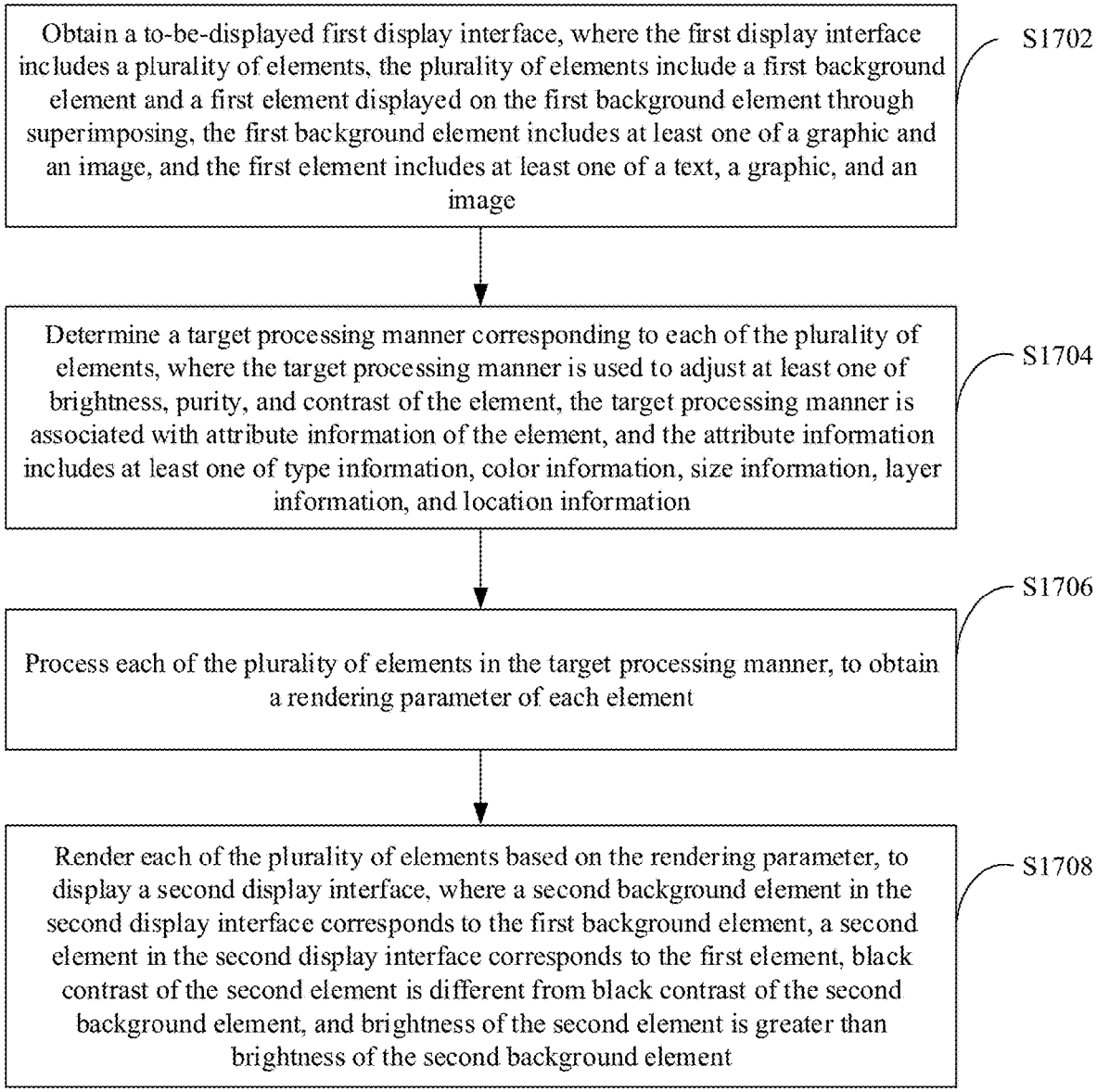
FIG. 17 is a schematic flowchart of a dark mode display interface processing method according to this application.
Figure 18:
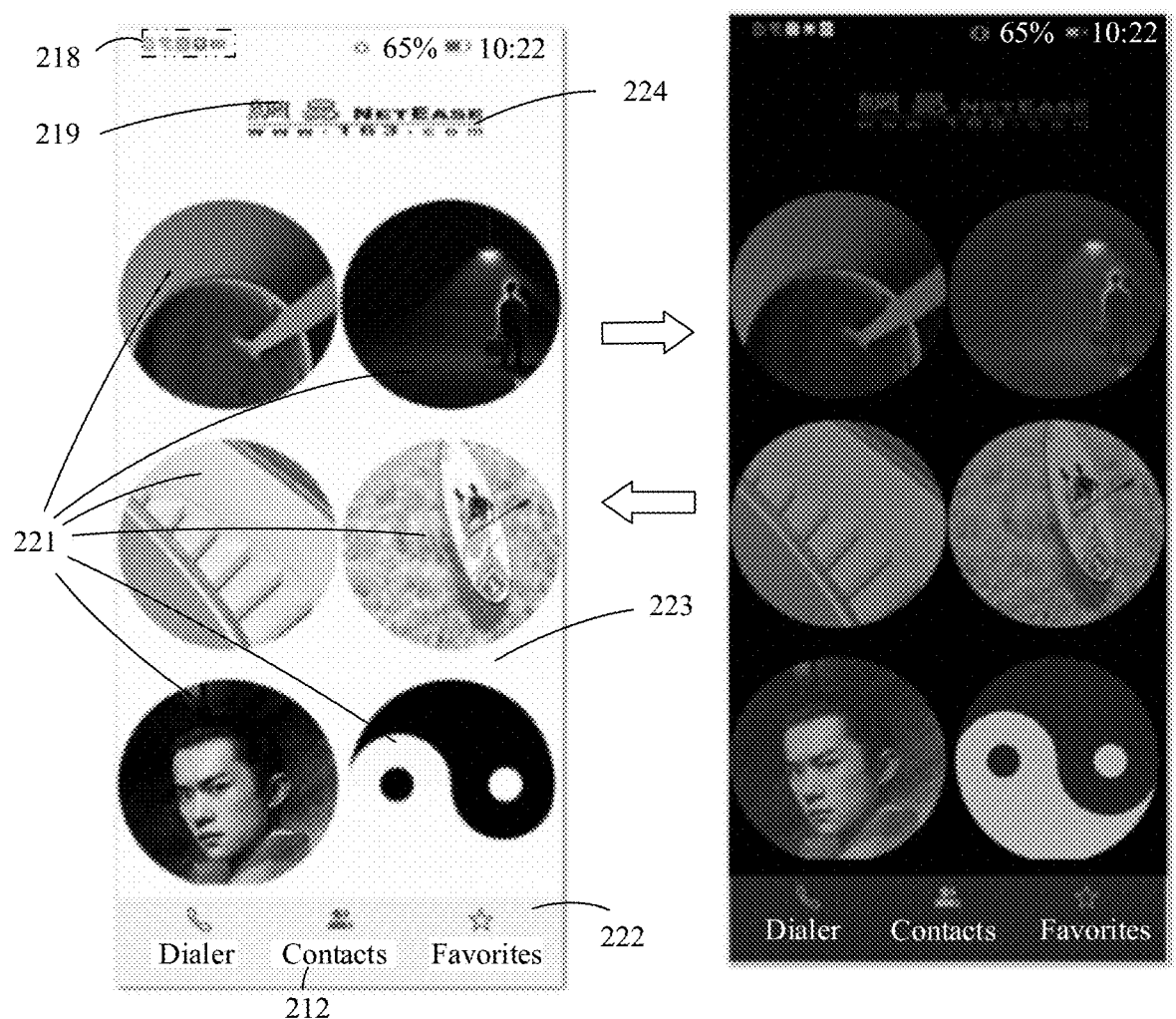
FIG. 18 is another schematic diagram of mode switching of an electronic device according to this application.

Based on the foregoing processing manner of each element, one embodiment of this application is currently described by using FIG. 17 and FIG. 18 as examples. FIG. 17 is a schematic flowchart of a dark mode display interface processing method according to this application. FIG. 18 shows a mode switching scenario.

As shown in FIG. 17, this method includes the following operations.

S1702: Obtain a to-be-displayed first display interface, where the first display interface includes a plurality of elements, the plurality of elements include a first background element and a first element displayed on the first background element through superimposing, the first background element includes at least one of a graphic and an image, and the first element includes at least one of a text, a graphic, and an image.

A left side in FIG. 18 is a schematic diagram of a first display interface in which an electronic device is in a normal mode. The first display interface includes a text, a graphic, and an image, and includes a first background element (a large white background 223) and first elements (a notification bar icon 218, a bright-color text 219, a gray text 224, circular images 221, a contacts icon 212, a background 222, and the like), and all the first elements are displayed on the large white background 223 through superimposing. In this case, the large white background 223 may include a white graphic or a white image, and each first element includes at least one of a text, a graphic, or an image.

In this case, if a user controls the electronic device to switch from the normal mode to a dark mode, or in a process of switching a page when the electronic device is in the dark mode, dark mode processing needs to be performed on all the elements in the first display interface.

S1704: Determine a target processing manner corresponding to each of the plurality of elements, where the target processing manner is used to adjust at least one of brightness, chrominance, and contrast of the element, the target processing manner is associated with attribute information of the element, and the attribute information includes at least one of type information, color information, size information, layer information, and location information.

During dark mode processing, each element displayed on the first display interface may be obtained. Because these elements are separately rendered in a renderer and displayed, in this application, communication may be performed with the renderer (or a previous-stage processor of the renderer), to obtain the attribute information (at least one piece of information in a type, a size, a color, a location, or a layer) of each element on the display interface.

After the attribute information of each element is obtained, the processing manner corresponding to each element may be determined in the foregoing manner based on the at least one piece of information in the type, the size, the color, the location, or the layer. As shown in FIG. 18, the notification bar icon 218 (one or more, without a quantity limitation) is a picture and has a relatively small size, and therefore may be used as a foreground picture for processing. The bright-color text 219 in texts is used as a bright-color foreground for color processing. The gray text 224 in the texts is used as a gray-tone foreground for color processing. The circular image 221 with a relatively large size on the display interface is used as a background picture for processing. Backboard processing is performed on the large white background 223 behind the circular image 221. The bright-color contacts icon 212 displayed on a lower part of the display interface is used as a bright-color foreground for processing. The background 222 on which the bright-color foreground is located is also in a bright color, and therefore is used as a bright-color background for processing.

S1706: Process each of the plurality of elements in the target processing manner, to obtain a rendering parameter of each element.

Based on the foregoing processing manners, color conversion processing is performed by using a color value of each element in the normal mode. This mainly relates to adjustment of brightness L, chrominance C, and contrast, to obtain a dark mode rendering parameter that is of each element and that is separately obtained after dark mode processing.

S1708: Render each of the plurality of elements based on the rendering parameter, to display a second display interface, where a second background element in the second display interface corresponds to the first background element, a second element in the second display interface corresponds to the first element, black contrast of the second element is different from black contrast of the second background element, and brightness of the second element is greater than brightness of the second background element.

In a second display interface displayed on a right side in FIG. 18, the first background element is processed into a second background element and is changed from the large white background to a large dark background, and other first elements are also separately processed into second elements in the second display interface. As shown in FIG. 18, in this application, only the rendering parameter of each element is adjusted, and a display location and a layer relationship of each element are not changed. In the dark mode, each second element has a different color and black contrast from the second background element. This ensures that the second element in the second display interface is readable relative to the second background element. In addition, the brightness of the second element is also greater than the brightness of the second background element, making it easier for the user to focus on the second element displayed on a front end.

In an example scenario, the brightness of the second element is [30, 70]; and the brightness of the second background element is less than or equal to 30.

In another example scenario, in the second display interface, the black contrast of the second element is 2.2:1 to 15.7:1. This is described in the foregoing processing manners, and details are not described herein again.

Therefore, provided that each primary color is rendered in real time based on the dark mode rendering parameter to display, on the display, the second display interface obtained after the rendering, the second display interface shown on the right side in FIG. 18, that is, the second display interface in which the electronic device is in the dark mode, can be obtained, thereby completing switching of the electronic device from the normal mode to the dark mode.

On the contrary, when the electronic device is in the dark mode, if the user controls the electronic device to switch from the dark mode to the normal mode, the mode switching can be implemented provided that each of the plurality of elements is rendered based on the color information of the plurality of elements to display the first display interface. A display interface of the electronic device is also switched from the dark mode display interface shown on the right side in FIG. 18 to the normal mode display interface shown on the left side in FIG. 18.

In this process, only a rendering parameter (a color value) used when the renderer renders the display interface is adjusted, and there is no change in software/hardware at the front end of the electronic device. Therefore, any display interface of the electronic device can be switched between the normal mode and the dark mode without any software/hardware adaptation at the front end of the electronic device. This also reduces third party adaptation difficulty, and has a relatively large application prospect.

The foregoing processing manners provided in this application are implemented based on a human factor experiment. This also controls, on a basis of ensuring readability of a display interface, each element to neither irritate eyes due to excessive brightness nor cause difficult recognition due to excessive darkness in the dark mode, to provide comfortable viewing or reading experience for the user, thereby helping reduce visual fatigue of the user.

In addition, the foregoing data processing process is simple and easy to implement, and also occupies very short duration, the duration may even be shortened to 0.5 ms, and the user may not perceive the data processing process. Therefore, for the user, this is real-time switching between the normal mode and the dark mode. This is also convenient for the user to select a display state that the user desires, thereby improving user experience.

In an actual scenario, a backlight level is unrelated to a process of rendering an image by an electronic device. Therefore, a backlight level of the electronic device is not specially limited in this application. In addition, with progress of technologies, if in a subsequent technology development process, when the electronic device uses a backlight level as one of reference dimensions for rendering an image, implementation of this solution is still not affected. This is because this application is implemented based on rendering data used by the renderer to render a normal interface. Regardless of whether the backlight level is considered in the rendering data, implementation of this solution is not affected. In addition, due to a processing manner that approximates to real-time switching in this solution, when the electronic device is in the dark mode, rendering and output of a display interface can be performed in real time following a backlight level of the electronic device.

In addition, in this application, a trigger condition of switching between the dark mode and the normal mode is not specially limited.

In one embodiment, a mode switching button may be preset in a notification bar of the electronic device, and the mode switching button can be displayed on any display interface of the electronic device provided that the user invokes the notification bar. Therefore, provided that the user taps the mode switching button, the user can control the electronic device to switch between the normal mode and the dark mode. For example, if the electronic device is currently in the normal mode, and the user taps the mode switching button, the electronic device switches from the normal mode to the dark mode; or if the electronic device is currently in the dark mode, and the user clicks the mode switching button, the electronic device switches from the dark mode to the normal mode.

Figure 19:
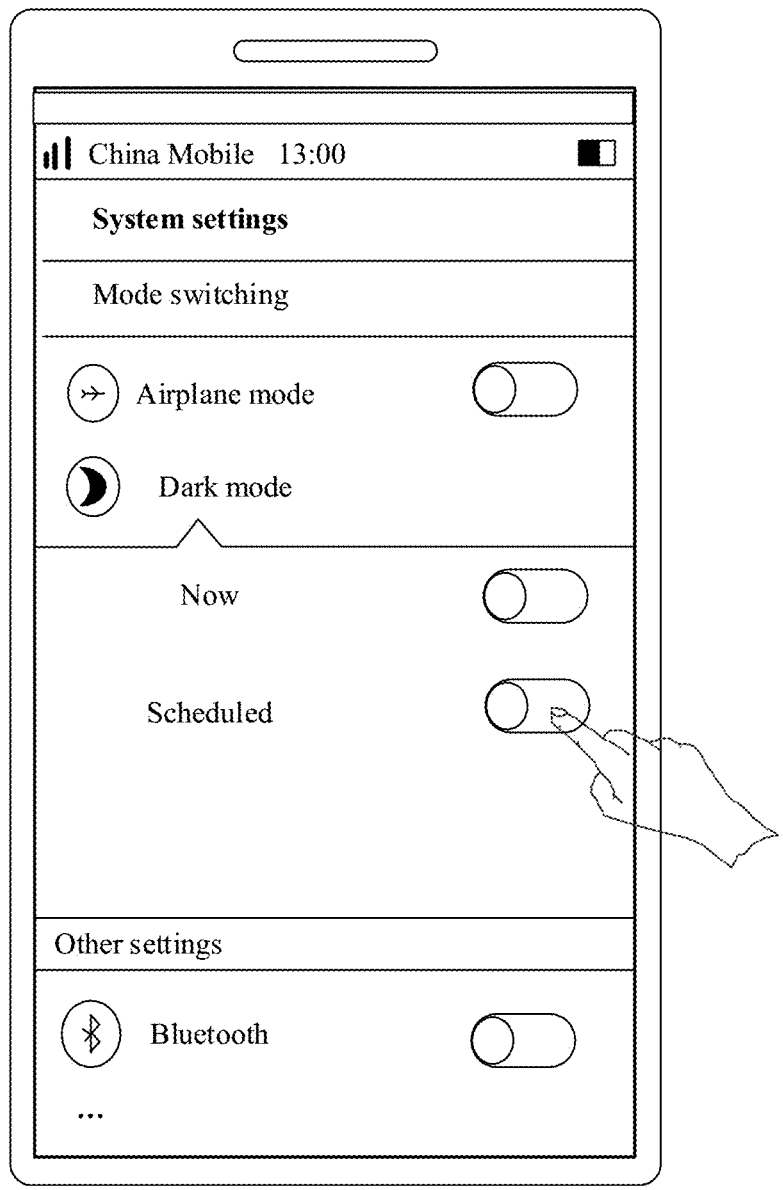
FIG. 19 is a schematic diagram of mode switching manner setting according to this application.

In one embodiment, a dark mode enabling button may be alternatively preset in settings of the electronic device. FIG. 19 shows this case. As shown in FIG. 19, a dark mode enabling button is set in settings-system settings-mode switching of an electronic device. Further, FIG. 19 further provides two enabling modes for a user: a "now" button and a "scheduled" button. If the user taps the "now" button, processing, real-time rendering, and output are immediately performed on a display interface in the foregoing manner, to switch a normal mode to a dark mode in real time. Alternatively, if the user taps the "scheduled" button, a timing selection interface is further output, and the user sets a "scheduled" time interval. Therefore, when a system moment reaches a start point of the time interval, processing, real-time rendering, and output are performed on a display interface corresponding to the start point of the time interval, to implement timed switching from the normal mode to the dark mode.

Therefore, the electronic device may be switched from the normal mode to the dark mode in response to receiving a first mode switching instruction and/or when a current moment reaches a preset first switching moment. Alternatively, the electronic device is switched from the dark mode to the normal mode in response to receiving a second mode switching instruction and/or when a current moment reaches a preset second switching moment.

The embodiments of this application may be randomly combined to achieve different technical effects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk), or the like.

In summary, the foregoing descriptions are only embodiments of the technical solutions of the present invention, but are not intended to limit the protection scope of the present invention. Any modification, equivalent replacement, and improvement made according to the disclosure of the present invention shall fall within the protection scope of the present invention.

It is clear that a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A dark mode display interface processing method comprising:
    obtaining a to-be-displayed first display interface, wherein the first display interface comprises a plurality of elements, the plurality of elements comprise a first background element and a first element displayed on the first background element through superimposing, the first background element includes at least one of a graphic or an image, and the first element includes at least one of a text, a graphic, or an image;
    determining a target processing manner corresponding to each of the plurality of elements, wherein the target processing manner is used to adjust at least one of brightness, chrominance, or contrast of the element, the target processing manner is associated with attribute information of the element, and the attribute information comprises location information and at least one of type information, color information, size information, or layer information, wherein
        the type information is used to indicate a type of the element;
        the color information is used to indicate color composition of the element;
        the size information is used to indicate a size of the element;
        the layer information is used to indicate whether the element is located at a top layer of display layers; and
        the location information is used to indicate whether the element extends from the top or the bottom in an opposite direction;
    processing each of the plurality of elements in the target processing manner to obtain a rendering parameter of each element; and
    rendering each of the plurality of elements based on the rendering parameter to display a second display interface, wherein a second background element in the second display interface corresponds to the first background element, a second element in the second display interface corresponds to the first element, black contrast of the second element is different from black contrast of the second background element, and brightness of the second element is greater than brightness of the second background element.

2. The method according to claim 1, wherein a processing manner of the element comprises foreground color processing, background color processing, sub-backboard processing, backboard processing, foreground picture processing, or background picture processing.

3. The method according to claim 1, wherein
the brightness of the second element is [30 nits, 70 nits]; and
the brightness of the second background element is less than or equal to 30 nits.

4. The method according to claim 1, wherein in the second display interface, the black contrast of the second element is 2.2:1 nits to 15.7:1 nits.

5. The method according to claim 1, wherein for any one of the plurality of elements, determining the target processing manner of the element comprises:
when type information of the element indicates that the element is a text, determining that the target processing manner of the element is foreground color processing.

6. The method according to claim 1, wherein for any one of the plurality of elements, determining the target processing manner of the element comprises:
when type information of the element indicates that the element is a first-type graphic, determining a first size interval to which a size of the first-type graphic belongs, and determining, as the target processing manner of the first-type graphic, a processing manner corresponding to the first size interval; or
when type information of the element indicates that the element is a second-type graphic, determining a second size interval to which a size of the second-type graphic belongs, and determining, as the target processing manner of the second-type graphic, a processing manner corresponding to the second size interval, wherein
the first-type graphic comprises a line and a rectangle, the second-type graphic comprises a circle, an arc, a point, and a path, and a range of the first size interval is not exactly the same as a range of the second size interval; and
the target processing manner comprises foreground color processing, background color processing, sub-backboard processing, or backboard processing.

7. The method according to claim 1, wherein for any one of the plurality of elements, determining the target processing manner of the element comprises:
when type information of the element indicates that the element is an image, color information of the element indicates that the element consists of a single color, and a size of the element belongs to a third size interval, determining that the target processing manner of the element is foreground color processing;
when type information of the element indicates that the element is an image, color information of the element indicates that the element consists of at least two colors, and a size of the element belongs to the third size interval, determining that the target processing manner of the element is foreground picture processing;
when type information of the element indicates that the element is an image, location information of the element indicates that the element extends from the top or the bottom in an opposite direction, and a size of the element belongs to a fourth size interval, determining that the target processing manner of the element is sub-backboard processing;
when type information of the element indicates that the element is an image, location information of the element indicates that the element does not extend from the top or the bottom in an opposite direction, and a size of the element belongs to the fourth size interval, determining that the target processing manner of the element is backboard processing;
when type information of the element indicates that the element is an image, color information of the element indicates that the element consists of a single color, and a size of the element belongs to neither the third size interval nor the fourth size interval, determining that the target processing manner of the element is foreground picture processing; or
when type information of the element indicates that the element is an image, color information of the element indicates that the element consists of at least two colors, and a size of the element belongs to neither the third size interval nor the fourth size interval, determining that the target processing manner of the element is background picture processing, wherein
the fourth size interval is greater than the third size interval.

8. The method according to claim 1, wherein for any one of the plurality of elements, determining the target processing manner of the element comprises:
when type information of the element indicates the element is a third-type graphic, and layer information of the element indicates that the element is located at the top layer of the display layers, determining that the target processing manner of the element is foreground color processing; or
when type information of the element indicates the element is a third-type graphic, and layer information of the element indicates that the element is located at a non-top layer of the display layers, determining that the target processing manner of the element is background color processing, wherein
the third-type graphic comprises a circle and an arc.

9. The method according to claim 1, wherein for any one of the plurality of elements, determining the target processing manner of the element comprises:
when type information of the element indicates the element is a fourth-type graphic, and layer information of the element indicates that the element is located at the top layer of the display layers, determining a fifth size interval to which a size of the element belongs, and determining, as the target processing manner, a processing manner corresponding to the fifth size interval and location information, wherein a processing manner corresponding to the fifth size interval comprises foreground color processing, background color processing, sub-backboard processing, or backboard processing; or
when type information of the element indicates the element is a fourth-type graphic, and layer information of the element indicates that the element is located at a non-top layer of the display layers, determining a sixth size interval to which a size of the element belongs, and determining, as the target processing manner, a processing manner corresponding to the sixth size interval and location information, wherein a processing manner corresponding to the sixth size interval comprises background color processing, sub-backboard processing, or backboard processing, wherein the fourth-type graphic comprises a line, a rectangle, a point, and a path.

10. The method according to claim 1, wherein for any one of the plurality of elements, determining the target processing manner of the element comprises:
when type information of the element indicates the element is an image, and layer information of the element indicates that the element is located at the top layer of the display layers, determining a seventh size interval to which a size of the element belongs, and determining, as the target processing manner, a processing manner corresponding to the seventh size interval and location information, wherein a processing manner corresponding to the seventh size interval comprises foreground picture processing, background picture processing, sub-backboard processing, or backboard processing; or
when type information of the element indicates the element is an image, and layer information of the element indicates that the element is located at a non-top layer of the display layers, determining an eighth size interval to which a size of the element belongs, and determining, as the target processing manner, a processing manner corresponding to the eighth size interval and location information, wherein a processing manner corresponding to the eighth size interval comprises background picture processing, sub-backboard processing, or backboard processing.

11. The method according to claim 1, wherein for any one of the plurality of elements, determining the target processing manner of the element comprises:
when color information of the element indicates that the element is displayed in a black transparency gradient, and endpoint transparency of the element is not 0, determining that the target processing manner is keeping the rendering parameter of the element unchanged.

12. The method according to claim 1, wherein for any one of the plurality of elements, determining the target processing manner of the element comprises:
when color information of the element indicates that the element is displayed in a white transparency gradient, and endpoint transparency of the element is not 0, determining that the target processing manner is transparent processing, wherein
the transparent processing is used to display the element in full transparency.

13. The method according to claim 1, wherein if the target processing manner of any one of the plurality of elements is foreground color processing, processing the element in the target processing manner to obtain the rendering parameter of the element comprises:
when an element color of the element is a gray-tone color, obtaining white contrast of the element color, wherein the white contrast is contrast of any color relative to white; and
when the white contrast is greater than or equal to a preset first contrast threshold, performing complementary mapping on the element color to obtain the rendering parameter, wherein black contrast is contrast of any color relative to black; or
when the white contrast is less than the first contrast threshold, reducing brightness of the element color to obtain the rendering parameter.

14. The method according to claim 13, wherein the first contrast threshold is 1.1:1 nits.

15. The method according to claim 1, wherein when the target processing manner of any one of the plurality of elements is foreground color processing, processing the element in the target processing manner to obtain the rendering parameter of the element comprises:
when an element color of the element is a bright color, obtaining black contrast of the element color; and
when the black contrast is less than a preset second contrast threshold, enhancing the black contrast of the element color to obtain the rendering parameter;
when the black contrast is greater than a preset third contrast threshold, reducing brightness of the element color to obtain the rendering parameter; or
when the black contrast falls between the second contrast threshold and the third contrast threshold, obtaining a color value of the element as the rendering parameter, wherein
the third contrast threshold is greater than the second contrast threshold.

16. The method according to claim 15, wherein the reducing brightness of the element color comprises:
when the black contrast is greater than a preset fourth contrast threshold, reducing the brightness of the element color based on preset amplitude; or
when the black contrast falls between the third contrast threshold and the fourth contrast threshold, adjusting the brightness of the element color to a preset range, wherein
when the fourth contrast threshold is greater than the third contrast threshold.

17. The method according to claim 16, wherein the second contrast threshold is 8.9:1 nits, the third contrast threshold is 15.7:1 nits, and the fourth contrast threshold is 19:1 nits; and
the preset amplitude is 9 nits, and the preset range is a dark level before 15.7:1 nits.

18. The method according to claim 1, wherein when the target processing manner of any one of the plurality of elements is foreground color processing, processing the element in the target processing manner to obtain the rendering parameter of the element comprises:
when a color of the element is a gradient color of at least one color, processing an endpoint color of the element in the foreground color processing manner, to obtain the rendering parameter of the element; or
when the element comprises a plurality of colors, using the element as a foreground picture for processing.

19. The method according to claim 1, wherein when the target processing manner of any one of the plurality of elements is background color processing, processing the element in the target processing manner to obtain the rendering parameter of the element comprises:
when chrominance carried in color information of the element is greater than a preset first chrominance threshold, obtaining black contrast of a color of the element; and
when the black contrast is greater than a preset fifth contrast threshold, reducing the black contrast of the color of the element to obtain the rendering parameter;
when the black contrast is less than a preset sixth contrast threshold, enhancing the black contrast of the color of the element to obtain the rendering parameter; or
when the black contrast falls between the fifth contrast threshold and the sixth contrast threshold, obtaining a color value of the element as the rendering parameter, wherein
the fifth contrast threshold is greater than the sixth contrast threshold.

20. An electronic device, comprising:
one or more processors;
one or more memories configured to store computer programs;
wherein the electronic device, when the computer programs are performed by the one or more processors, is caused to perform:
obtaining a to-be-displayed first display interface, wherein the first display interface comprises a plurality of elements, the plurality of elements comprise a first background element and a first element displayed on the first background element through superimposing, the first background element includes at least one of a graphic or an image, and the first element includes at least one of a text, a graphic, or an image;
determining a target processing manner corresponding to each of the plurality of elements, wherein the target processing manner is used to adjust at least one of brightness, chrominance, or contrast of the element, the target processing manner is associated with attribute information of the element, and the attribute information comprises location information and at least one of type information, color information, size information, or layer information, wherein the type information is used to indicate a type of the element;
the color information is used to indicate color composition of the element;
the size information is used to indicate a size of the element;
the layer information is used to indicate whether the element is located at a top layer of display layers; and
the location information is used to indicate whether the element extends from the top or the bottom in an opposite direction;
processing each of the plurality of elements in the target processing manner to obtain a rendering parameter of each element; and
rendering each of the plurality of elements based on the rendering parameter to display a second display interface, wherein a second background element in the second display interface corresponds to the first background element, a second element in the second display interface corresponds to the first element, black contrast of the second element is different from black contrast of the second background element, and brightness of the second element is greater than brightness of the second background element.

* * * * *